United States Patent
Partovi

(10) Patent No.: US 11,606,119 B2
(45) Date of Patent: Mar. 14, 2023

(54) METAL LAYER FOR INDUCTIVE POWER TRANSFER

(71) Applicant: Mojo Mobility Inc., Palo Alto, CA (US)

(72) Inventor: Afshin Partovi, Palo Alto, CA (US)

(73) Assignee: Mojo Mobility Inc., Palo Alto, CA (US)

( * ) Notice: Subject to any disclaimer, the term of this patent is extended or adjusted under 35 U.S.C. 154(b) by 0 days.

(21) Appl. No.: 17/562,268

(22) Filed: Dec. 27, 2021

(65) Prior Publication Data

US 2022/0123786 A1 Apr. 21, 2022

Related U.S. Application Data

(63) Continuation of application No. 13/708,584, filed on Dec. 7, 2012, now Pat. No. 11,211,975, which is a (Continued)

(51) Int. Cl.
*H04B 5/00* (2006.01)
*H02J 50/10* (2016.01)
(Continued)

(52) U.S. Cl.
CPC .......... *H04B 5/0037* (2013.01); *H01F 5/003* (2013.01); *H01F 38/14* (2013.01); *H02J 5/00* (2013.01);
(Continued)

(58) Field of Classification Search
CPC ....... H04B 5/0037; H01F 5/003; H01F 38/14; H02J 5/00; H02J 7/02; H02J 50/10; H02J 50/70; H02J 50/80
See application file for complete search history.

(56) References Cited

U.S. PATENT DOCUMENTS 3,761,641 A * 9/1973 Mlinaric .................. G11B 5/10
360/129
3,806,902 A * 4/1974 Drees ..................... G11B 5/265
360/122
(Continued)

FOREIGN PATENT DOCUMENTS

EP 2396901 B1 12/2019
JP 108000838 8/1996
(Continued)

OTHER PUBLICATIONS

WiPower, Wikipedia, the free encyclopedia, http://en.wikipedia.org/wiki/WiPower, Nov. 18, 2011, 2 pages.
(Continued)

*Primary Examiner* — Daniel R Miller
(74) *Attorney, Agent, or Firm* — NK Patent Law

(57) ABSTRACT

An inductive charging system for inductive charging of electronic devices is disclosed. In accordance with an embodiment, the system includes a substantially planar inductive charging coil parallel to the surface of the inductive charger or the electronic device. The system further includes a metallic layer positioned proximate to and substantially parallel to the inductive coil to cover a surface of the inductive coil. The metallic layer comprises multiple substantially concentric rings or polygons, with each of the concentric rings or polygons having multiple sections separated by gaps such that each concentric ring or polygon is discontinuous. Adjacent sections of each concentric ring or polygon are electrically isolated from one another to avoid eddy current generation and heating of the metallic layer during inductive power transfer.

29 Claims, 42 Drawing Sheets

Related U.S. Application Data continuation of application No. 12/769,586, filed on Apr. 28, 2010, now abandoned, which is a continuation-in-part of application No. 12/116,876, filed on May 7, 2008, now Pat. No. 8,169,185.

(60) Provisional application No. 61/317,946, filed on Mar. 26, 2010, provisional application No. 61/304,320, filed on Feb. 12, 2010, provisional application No. 61/223,673, filed on Jul. 7, 2009, provisional application No. 61/223,669, filed on Jul. 7, 2009, provisional application No. 61/184,659, filed on Jun. 5, 2009, provisional application No. 61/178,807, filed on May 15, 2009, provisional application No. 61/173,497, filed on Apr. 28, 2009.

(51) Int. Cl.
*H02J 50/70* (2016.01)
*H02J 5/00* (2016.01)
*H02J 50/80* (2016.01)
*H02J 7/02* (2016.01)
*H01F 5/00* (2006.01)
*H01F 38/14* (2006.01)
*H02J 50/00* (2016.01)
*H02J 7/00* (2006.01)

(52) U.S. Cl.
CPC ...... *H02J 7/00034* (2020.01); *H02J 7/00045* (2020.01); *H02J 7/00302* (2020.01); *H02J 7/00304* (2020.01); *H02J 7/00306* (2020.01); *H02J 7/02* (2013.01); *H02J 50/005* (2020.01); *H02J 50/10* (2016.02); *H02J 50/70* (2016.02); *H02J 50/80* (2016.02)

(56) References Cited

U.S. PATENT DOCUMENTS

| | | |
|---|---|---|
| 3,938,018 A | 2/1976 | Dahl |
| 4,311,853 A | 1/1982 | Cree |
| 4,311,953 A | 1/1982 | Fukuda |
| 4,415,959 A | 11/1983 | Vinciarelli |
| 4,720,667 A | 1/1988 | Lee et al. |
| 4,731,585 A | 3/1988 | Fox |
| 4,800,328 A | 1/1989 | Bolger et al. |
| 4,829,277 A | 5/1989 | Stahura et al. |
| 4,873,677 A | 10/1989 | Sakamoto et al. |
| 5,237,257 A | 8/1993 | Johnson |
| 5,311,973 A | 5/1994 | Tseng |
| 5,367,242 A | 11/1994 | Hulman |
| 5,396,136 A | 3/1995 | Perline |
| 5,434,493 A | 7/1995 | Woody |
| 5,455,466 A | 10/1995 | Parks et al. |
| 5,543,702 A | 8/1996 | Pfeiffer |
| 5,550,452 A | 8/1996 | Shirai |
| 5,600,225 A | 2/1997 | Goto |
| 5,642,087 A | 6/1997 | Crow |
| 5,656,917 A | 8/1997 | Theobald |
| 5,696,433 A | 12/1997 | Palino |
| 5,734,254 A | 3/1998 | Stephens |
| 5,744,933 A | 4/1998 | Inoue |
| 5,803,744 A | 9/1998 | Yen |
| 5,889,384 A | 3/1999 | Hayes et al. |
| 5,925,814 A | 7/1999 | Tsuzuki |
| 5,952,814 A | 9/1999 | Van Lerberghe |
| 5,959,433 A | 9/1999 | Rohde |
| 5,963,012 A | 10/1999 | Garcia |
| 5,991,170 A | 11/1999 | Nagai |
| 5,991,665 A | 11/1999 | Wang |
| 6,008,622 A | 12/1999 | Nakawatase |
| 6,016,046 A | 1/2000 | Kaile et al. |
| 6,028,413 A | 2/2000 | Brockmann |
| 6,040,680 A | 3/2000 | Toya et al. |
| 6,057,668 A | 5/2000 | Chao |
| 6,094,119 A | 7/2000 | Reznik |
| 6,118,249 A | 9/2000 | Brockman et al. |
| 6,178,353 B1 * | 1/2001 | Griffith .............. A61N 1/37276 607/61 |
| 6,184,651 B1 | 2/2001 | Fernandez et al. |
| 6,184,654 B1 | 2/2001 | Bachner |
| 6,208,115 B1 | 3/2001 | Binder |
| 6,301,128 B1 | 10/2001 | Jang et al. |
| 6,310,465 B2 | 10/2001 | Najima |
| 6,324,430 B1 * | 11/2001 | Zarinetchi ............ A61N 1/3787 607/61 |
| 6,331,744 B1 | 12/2001 | Chen |
| 6,389,318 B1 * | 5/2002 | Zarinetchi ............ A61N 1/3787 607/63 |
| 6,436,299 B1 | 8/2002 | Baarman |
| 6,462,509 B1 | 10/2002 | Abe |
| 6,489,745 B1 | 12/2002 | Koreis |
| 6,498,455 B2 | 12/2002 | Zink |
| 6,501,364 B1 | 12/2002 | Hui |
| 6,527,971 B1 | 3/2003 | Nakamura et al. |
| 6,573,817 B2 | 6/2003 | Gottschalk |
| 6,586,909 B1 | 7/2003 | Trepka |
| 6,625,477 B1 | 9/2003 | Wakefield |
| 6,636,017 B2 | 10/2003 | Zink et al. |
| 6,650,088 B1 | 11/2003 | Webb |
| 6,673,250 B2 | 1/2004 | Kuennen |
| 6,697,272 B2 | 2/2004 | Nanbu |
| 6,731,071 B2 | 5/2004 | Baarman |
| 6,741,064 B2 | 5/2004 | Liu |
| 6,756,656 B2 | 6/2004 | Lowther |
| 6,756,765 B2 | 6/2004 | Bruning |
| 6,765,144 B1 | 7/2004 | Wang et al. |
| 6,798,716 B1 | 9/2004 | Charych |
| 6,803,744 B1 | 10/2004 | Sabo |
| 6,803,774 B2 | 10/2004 | Park |
| 6,806,649 B2 | 10/2004 | Mollema |
| 6,812,645 B2 | 11/2004 | Baarman |
| 6,825,620 B2 | 11/2004 | Kuennen |
| 6,831,417 B2 | 12/2004 | Baarman |
| 6,831,544 B2 | 12/2004 | Patel et al. |
| 6,844,702 B2 | 1/2005 | Giannopoulos |
| 6,869,019 B1 | 3/2005 | Nagi et al. |
| 6,870,089 B1 | 3/2005 | Gray |
| 6,888,438 B2 | 5/2005 | Hui |
| 6,906,495 B2 | 6/2005 | Cheng |
| 6,913,477 B2 | 7/2005 | Dayan |
| 6,917,163 B2 | 7/2005 | Baarman |
| 6,917,182 B2 | 7/2005 | Burton |
| 6,943,733 B2 | 9/2005 | Vance |
| 6,972,543 B1 | 12/2005 | Wells |
| 6,975,198 B2 | 12/2005 | Baarman |
| 7,026,789 B2 | 4/2006 | Bozzone |
| 7,031,662 B2 | 4/2006 | Suzuki |
| 7,042,196 B2 | 5/2006 | Ka-Lai |
| 7,116,200 B2 | 10/2006 | Baarman |
| 7,118,240 B2 | 10/2006 | Baarman |
| 7,126,450 B2 | 10/2006 | Baarman |
| 7,132,918 B2 | 11/2006 | Baarman |
| 7,151,357 B2 | 12/2006 | Xian |
| 7,162,264 B2 | 1/2007 | Vance |
| 7,164,245 B1 | 1/2007 | Chen |
| 7,164,255 B2 | 1/2007 | Hui |
| 7,183,870 B2 | 2/2007 | Takagi |
| 7,184,706 B2 | 2/2007 | Someya |
| 7,209,084 B2 | 4/2007 | Lindell |
| 7,211,986 B1 | 5/2007 | Flowerdew et al. |
| 7,221,919 B2 | 5/2007 | Takagi |
| 7,239,110 B2 | 7/2007 | Cheng |
| 7,248,017 B2 | 7/2007 | Cheng et al. |
| 7,305,258 B2 | 12/2007 | Rydgren |
| 7,311,526 B2 | 12/2007 | Rohrbach et al. |
| 7,324,051 B2 | 1/2008 | Hayes |
| 7,331,793 B2 | 2/2008 | Hernandez et al. |
| 7,336,054 B2 | 2/2008 | Crisp |
| 7,342,539 B2 | 3/2008 | Rosenberg |
| 7,352,567 B2 | 4/2008 | Hotelling et al. |
| 7,355,150 B2 | 4/2008 | Baarman |
| 7,375,493 B2 | 5/2008 | Calhoon et al. |

(56) References Cited

U.S. PATENT DOCUMENTS

| | | | |
|---|---|---|---|
| 7,376,408 B2 | 5/2008 | Hayes | |
| 7,378,817 B2 | 5/2008 | Calhoon | |
| 7,382,636 B2 | 6/2008 | Baarman | |
| 7,385,357 B2 | 6/2008 | Kuennen | |
| 7,388,543 B2 | 6/2008 | Vance | |
| 7,399,202 B2 | 7/2008 | Dayan | |
| 7,415,248 B2 | 8/2008 | Andersson et al. | |
| 7,443,135 B2 | 10/2008 | Cho | |
| 7,462,951 B1 | 12/2008 | Baarman | |
| 7,477,195 B2 | 1/2009 | Vance | |
| 7,487,921 B2 | 2/2009 | Takahashi | |
| 7,495,414 B2 | 2/2009 | Hui | |
| 7,498,871 B2 | 3/2009 | Ruuswik | |
| 7,514,765 B2 | 4/2009 | Huang et al. | |
| 7,525,283 B2 | 4/2009 | Cheng | |
| 7,554,316 B2 | 6/2009 | Stevens et al. | |
| 7,576,514 B2 | 8/2009 | Hui | |
| 7,605,496 B2 | 10/2009 | Stevens | |
| D603,603 S | 11/2009 | Laine | |
| D607,879 S | 1/2010 | Ferber | |
| 7,645,143 B2 | 1/2010 | Rohrbach | |
| D611,407 S | 3/2010 | Webb | |
| D611,408 S | 3/2010 | Ferber | |
| 7,733,215 B2 | 6/2010 | Kozuma et al. | |
| 7,741,734 B2 | 6/2010 | Joannopoulos | |
| 7,781,916 B2 | 8/2010 | Boys | |
| D624,316 S | 9/2010 | Ferber | |
| 7,804,054 B2 | 9/2010 | Shalom | |
| D625,721 S | 10/2010 | Ferber | |
| 7,825,543 B2 | 11/2010 | Karalis | |
| 7,855,529 B2 | 12/2010 | Liu | |
| 7,872,445 B2 | 1/2011 | Hui | |
| 7,906,936 B2 | 3/2011 | Azancot | |
| 7,915,858 B2 | 3/2011 | Liu et al. | |
| D636,333 S | 4/2011 | Kulikowski | |
| 7,948,208 B2 | 5/2011 | Partovi | |
| 7,952,322 B2 | 5/2011 | Partovi | |
| D639,734 S | 6/2011 | Ferber | |
| 3,040,103 A1 | 10/2011 | Hui | |
| 8,035,255 B2 | 10/2011 | Kurs | |
| 3,050,068 A1 | 10/2011 | Hussmann | |
| 8,049,370 B2 | 11/2011 | Azancot | |
| 8,069,100 B2 | 11/2011 | Taylor et al. | |
| 8,234,189 B2 | 1/2012 | Taylor et al. | |
| 8,115,448 B2 | 2/2012 | John | |
| 8,169,185 B2 | 5/2012 | Partovi et al. | |
| 8,234,509 B2 | 7/2012 | Gioscia et al. | |
| 8,242,741 B2 | 8/2012 | Phelps, III | |
| 8,290,463 B2 | 10/2012 | Liu et al. | |
| 8,554,165 B2 | 10/2013 | Liu et al. | |
| 8,629,651 B2 | 1/2014 | Guccione et al. | |
| 8,688,037 B2 | 4/2014 | Chatterjee et al. | |
| 8,766,484 B2 | 7/2014 | Baarman et al. | |
| 9,084,343 B2 | 7/2015 | Waffenschmidt | |
| 9,407,327 B2 | 8/2016 | Kirby et al. | |
| 9,793,738 B2 | 10/2017 | Jacobs et al. | |
| 9,795,069 B2 | 10/2017 | Waffenschmidt | |
| 2002/0004167 A1 | 1/2002 | Jenson | |
| 2002/0023899 A1* | 2/2002 | Khater | H01J 37/321 219/121.41 |
| 2002/0067238 A1 | 6/2002 | Leu | |
| 2002/0089305 A1 | 7/2002 | Park et al. | |
| 2002/0093309 A1 | 7/2002 | Peele | |
| 2003/0025417 A1 | 2/2003 | Rose | |
| 2003/0094921 A1 | 5/2003 | Lau | |
| 2003/0103039 A1 | 6/2003 | Burr | |
| 2003/0210106 A1 | 11/2003 | Cheng | |
| 2003/0214255 A1 | 11/2003 | Baarman | |
| 2004/0113589 A1 | 6/2004 | Crisp | |
| 2004/0130915 A1 | 7/2004 | Baarman | |
| 2004/0130916 A1 | 7/2004 | Baarman | |
| 2004/0145342 A1 | 7/2004 | Lyon | |
| 2004/0145343 A1 | 7/2004 | Naskali | |
| 2004/0150934 A1 | 8/2004 | Baarman et al. | |
| 2004/0222751 A1 | 11/2004 | Mollema | |
| 2004/0232845 A1 | 11/2004 | Baarman | |
| 2005/0007067 A1 | 1/2005 | Baarman et al. | |
| 2005/0017677 A1 | 1/2005 | Burton | |
| 2005/0062567 A1 | 3/2005 | Zimmerling et al. | |
| 2005/0063488 A1 | 3/2005 | Troyk | |
| 2005/0068019 A1 | 3/2005 | Nakamura et al. | |
| 2005/0075696 A1 | 4/2005 | Forsberg | |
| 2005/0075699 A1* | 4/2005 | Olson | A61N 1/3787 607/61 |
| 2005/0093475 A1 | 5/2005 | Kuennen | |
| 2005/0116650 A1 | 6/2005 | Baarman | |
| 2005/0116683 A1 | 6/2005 | Cheng | |
| 2005/0122058 A1 | 6/2005 | Baarman | |
| 2005/0122059 A1 | 6/2005 | Baarman | |
| 2005/0127849 A1 | 6/2005 | Baarman | |
| 2005/0127850 A1 | 6/2005 | Baarman | |
| 2005/0127867 A1 | 6/2005 | Calhoon | |
| 2005/0127869 A1 | 6/2005 | Calhoon | |
| 2005/0135122 A1 | 6/2005 | Cheng | |
| 2005/0140482 A1 | 6/2005 | Cheng | |
| 2005/0162125 A1 | 7/2005 | Yu | |
| 2005/0189910 A1 | 9/2005 | Hui | |
| 2005/0257855 A1 | 11/2005 | Kim | |
| 2006/0021926 A1 | 2/2006 | Woodard | |
| 2006/0038794 A1 | 2/2006 | Schneidman | |
| 2006/0061324 A1 | 3/2006 | Oglesbee | |
| 2006/0105718 A1 | 5/2006 | Ozluturk | |
| 2006/0106965 A1 | 5/2006 | Falcon | |
| 2006/0108977 A1 | 5/2006 | Kagermeier | |
| 2006/0132045 A1 | 6/2006 | Baarman | |
| 2006/0146517 A1 | 7/2006 | Park | |
| 2006/0202665 A1 | 9/2006 | Hsu | |
| 2006/0205381 A1 | 9/2006 | Beart | |
| 2006/0238930 A1 | 10/2006 | Baarman | |
| 2006/0284593 A1 | 12/2006 | Nagy | |
| 2007/0004168 A1* | 1/2007 | Zips | G05B 15/02 455/41.2 |
| 2007/0029965 A1 | 2/2007 | Hui | |
| 2007/0069687 A1 | 3/2007 | Suzuki | |
| 2007/0103110 A1 | 5/2007 | Sagoo | |
| 2007/0109708 A1 | 5/2007 | Hussman | |
| 2007/0133156 A1 | 6/2007 | Ligtenberg et al. | |
| 2007/0138806 A1 | 6/2007 | Ligtenberg et al. | |
| 2007/0139000 A1 | 6/2007 | Kozuma | |
| 2007/0145830 A1 | 6/2007 | Lee et al. | |
| 2007/0178945 A1 | 8/2007 | Cook et al. | |
| 2007/0182367 A1 | 8/2007 | Partovi | |
| 2007/0236174 A1 | 10/2007 | Kaye | |
| 2007/0279002 A1 | 12/2007 | Partovi | |
| 2007/0296393 A1 | 12/2007 | Malpas | |
| 2008/0014897 A1 | 1/2008 | Cook | |
| 2008/0061733 A1 | 3/2008 | Toya | |
| 2008/0067874 A1 | 3/2008 | Tseng | |
| 2008/0164839 A1 | 7/2008 | Kato | |
| 2008/0164843 A1 | 7/2008 | Jang et al. | |
| 2008/0247210 A1 | 10/2008 | Hu | |
| 2008/0258679 A1 | 10/2008 | Manico | |
| 2008/0272889 A1 | 11/2008 | Symons | |
| 2008/0278264 A1 | 11/2008 | Karalis | |
| 2009/0001941 A1 | 1/2009 | Hsu et al. | |
| 2009/0015075 A1 | 1/2009 | Cook | |
| 2009/0021212 A1 | 1/2009 | Hasegawa et al. | |
| 2009/0027149 A1 | 1/2009 | Kocijan | |
| 2009/0033564 A1 | 2/2009 | Cook | |
| 2009/0043727 A1 | 2/2009 | Cohen., Jr. | |
| 2009/0045773 A1 | 2/2009 | Pandya et al. | |
| 2009/0049554 A1 | 2/2009 | Vuong | |
| 2009/0058189 A1 | 3/2009 | Cook | |
| 2009/0058361 A1 | 3/2009 | John | |
| 2009/0072627 A1 | 3/2009 | Cook | |
| 2009/0072628 A1 | 3/2009 | Cook | |
| 2009/0072629 A1 | 3/2009 | Cook | |
| 2009/0079268 A1 | 3/2009 | Cook | |
| 2009/0096413 A1 | 4/2009 | Partovi et al. | |
| 2009/0102292 A1 | 4/2009 | Cook | |
| 2009/0106567 A1 | 4/2009 | Baarman | |
| 2009/0127937 A1 | 5/2009 | Widmer | |
| 2009/0134712 A1 | 5/2009 | Cook | |
| 2009/0140692 A1 | 6/2009 | Hwang | |

(56) References Cited

U.S. PATENT DOCUMENTS

| | | |
|---|---|---|
| 2009/0167449 A1 | 7/2009 | Cook |
| 2009/0174263 A1 | 7/2009 | Baarman et al. |
| 2009/0179719 A1 | 7/2009 | Chen et al. |
| 2009/0195332 A1 | 8/2009 | Joannopoulos |
| 2009/0195333 A1 | 8/2009 | Joannopoulos |
| 2009/0212636 A1 | 8/2009 | Cook |
| 2009/0212637 A1 | 8/2009 | Baarman et al. |
| 2009/0212639 A1 | 8/2009 | Johnson |
| 2009/0213028 A1 | 8/2009 | Cook |
| 2009/0224608 A1 | 9/2009 | Cook |
| 2009/0224609 A1 | 9/2009 | Cook |
| 2009/0224856 A1 | 9/2009 | Karalis |
| 2009/0230777 A1 | 9/2009 | Baarman et al. |
| 2009/0243397 A1 | 10/2009 | Cook |
| 2009/0244836 A1 | 10/2009 | Leng et al. |
| 2009/0250574 A1 | 10/2009 | Fullerton et al. |
| 2009/0257259 A1 | 10/2009 | Leibovitz |
| 2009/0267709 A1 | 10/2009 | Joannopoulos |
| 2009/0267710 A1 | 10/2009 | Joannopoulos |
| 2009/0278494 A1 | 11/2009 | Randall |
| 2009/0284083 A1 | 11/2009 | Karalis |
| 2009/0284227 A1 | 11/2009 | Mohammadian |
| 2010/0007307 A1 | 1/2010 | Baarman et al. |
| 2010/0013431 A1 | 1/2010 | Liu |
| 2010/0038970 A1 | 2/2010 | Cook |
| 2010/0066176 A1 | 3/2010 | Azancot |
| 2010/0070219 A1 | 3/2010 | Azancot |
| 2010/0072825 A1 | 3/2010 | Azancot |
| 2010/0073177 A1 | 3/2010 | Azancot |
| 2010/0081377 A1 | 4/2010 | Chatterjee et al. |
| 2010/0081473 A1 | 4/2010 | Chatterjee |
| 2010/0096934 A1 | 4/2010 | Joannopoulos |
| 2010/0102639 A1 | 4/2010 | Joannopoulos |
| 2010/0102640 A1 | 4/2010 | Joannopoulos |
| 2010/0102641 A1 | 4/2010 | Joannopoulos |
| 2010/0109443 A1 | 5/2010 | Cook |
| 2010/0109445 A1 | 5/2010 | Kurs |
| 2010/0117454 A1 | 5/2010 | Cook |
| 2010/0117455 A1 | 5/2010 | Joannopoulos |
| 2010/0117456 A1 | 5/2010 | Karalis |
| 2010/0117596 A1 | 5/2010 | Cook |
| 2010/0123353 A1 | 5/2010 | Joannopoulos |
| 2010/0123354 A1 | 5/2010 | Joannopoulos |
| 2010/0123355 A1 | 5/2010 | Joannopoulos et al. |
| 2010/0127573 A1 | 5/2010 | Joannopoulos |
| 2010/0127574 A1 | 5/2010 | Joannopoulos |
| 2010/0127575 A1 | 5/2010 | Joannopoulos |
| 2010/0127660 A1 | 5/2010 | Cook et al. |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0141042 A1 | 6/2010 | Kesler |
| 2010/0146308 A1 | 6/2010 | Gioscia et al. |
| 2010/0148589 A1 | 6/2010 | Hamam |
| 2010/0164296 A1 | 7/2010 | Kurs |
| 2010/0164297 A1 | 7/2010 | Kurs |
| 2010/0164298 A1 | 7/2010 | Karalis |
| 2010/0171368 A1 | 7/2010 | Schatz |
| 2010/0171369 A1 | 7/2010 | Taylor et al. |
| 2010/0181841 A1 | 7/2010 | Azancot |
| 2010/0181843 A1 | 7/2010 | Schatz |
| 2010/0181845 A1 | 7/2010 | Fiorello |
| 2010/0184371 A1 | 7/2010 | Cook |
| 2010/0187911 A1 | 7/2010 | Joannopoulos |
| 2010/0190435 A1 | 7/2010 | Cook |
| 2010/0190436 A1 | 7/2010 | Cook |
| 2010/0194336 A1 | 8/2010 | Azancot |
| 2010/0201313 A1 | 8/2010 | Vorenkamp |
| 2010/0207572 A1 | 8/2010 | Kirby |
| 2010/0207771 A1 | 8/2010 | Trigiani |
| 2010/0213895 A1 | 8/2010 | Keating |
| 2010/0219183 A1 | 9/2010 | Azancot |
| 2010/0219693 A1 | 9/2010 | Azancot |
| 2010/0219697 A1 | 9/2010 | Azancot et al. |
| 2010/0219698 A1 | 9/2010 | Azancot |
| 2010/0230301 A1 | 9/2010 | Fellig |
| 2010/0235006 A1 | 9/2010 | Brown |
| 2010/0244584 A1 | 9/2010 | Azancot |
| 2010/0253281 A1 | 10/2010 | Li |
| 2010/0253282 A1 | 10/2010 | Azancot |
| 2010/0257382 A1 | 10/2010 | Azancot |
| 2010/0259401 A1 | 10/2010 | Azancot |
| 2010/0264871 A1 | 10/2010 | Matouka et al. |
| 2010/0277120 A1 | 11/2010 | Cook |
| 2010/0277121 A1 | 11/2010 | Hall et al. |
| 2010/0314946 A1 | 12/2010 | Budde |
| 2010/0327804 A1 | 12/2010 | Takahashi |
| 2011/0012556 A1 | 1/2011 | Lai |
| 2011/0050164 A1 | 3/2011 | Partovi |
| 2011/0057606 A1 | 3/2011 | Saunamaki |
| 2011/0062793 A1 | 3/2011 | Azancot |
| 2011/0090723 A1 | 4/2011 | Hu |
| 2011/0095617 A1 | 4/2011 | Cook |
| 2011/0115430 A1 | 5/2011 | Saunamaki |
| 2011/0121660 A1 | 5/2011 | Azancot |
| 2011/0157137 A1 | 6/2011 | Ben-Shalom |
| 2011/0187318 A1 | 8/2011 | Hui et al. |
| 2011/0193520 A1 | 8/2011 | Yamazaki |
| 2011/0202777 A1 | 8/2011 | Hijazi et al. |
| 2011/0217927 A1 | 9/2011 | Ben-Shalom |
| 2011/0221387 A1 | 9/2011 | Steigerwald et al. |
| 2011/0221391 A1 | 9/2011 | Won et al. |
| 2011/0222493 A1 | 9/2011 | Mangold |
| 2011/0266878 A9 | 11/2011 | Cook |
| 2012/0041843 A1 | 2/2012 | Taylor et al. |
| 2012/0043937 A1 | 2/2012 | Williams |
| 2012/0049991 A1 | 3/2012 | Baarman |
| 2012/0112552 A1 | 5/2012 | Baarman et al. |
| 2012/0119588 A1 | 5/2012 | Baarman et al. |
| 2012/0126745 A1 | 5/2012 | Partovi |
| 2012/0146576 A1 | 6/2012 | Partovi |
| 2012/0150670 A1 | 6/2012 | Taylor et al. |
| 2012/0235636 A1 | 9/2012 | Partovi |
| 2012/0259735 A1 | 10/2012 | Taylor et al. |
| 2014/0125146 A1 | 5/2014 | Azancot et al. |
| 2014/0247004 A1 | 9/2014 | Kari et al. |
| 2014/0339916 A1 | 11/2014 | Fells et al. |
| 2017/0163268 A1 | 6/2017 | Maeda et al. |

FOREIGN PATENT DOCUMENTS

| | | |
|---|---|---|
| JP | 2000068892 A * | 3/2000 |
| JP | 2000341885 | 12/2000 |
| JP | 2003045731 A1 | 2/2003 |
| JP | 2006500894 | 1/2006 |
| JP | 2006246633 | 9/2006 |
| JP | 2009200174 | 9/2009 |
| KR | 200205703 Y1 | 12/2000 |
| KR | 100836634 | 4/2008 |
| WO | 2003096361 | 11/2003 |
| WO | 2003096512 | 11/2003 |
| WO | 2003105308 | 12/2003 |
| WO | 20030105311 | 12/2003 |
| WO | 2004030176 | 4/2004 |
| WO | 2004038887 | 5/2004 |
| WO | 2004038888 | 5/2004 |
| WO | 2004055654 | 7/2004 |
| WO | 2005024865 | 3/2005 |
| WO | 2005109597 | 11/2005 |
| WO | 2005109598 | 11/2005 |
| WO | 200601557 A1 | 1/2006 |
| WO | 2008137996 | 11/2008 |
| WO | 2011081461 A2 | 7/2011 |
| WO | 20110156768 | 12/2011 |
| WO | 2012040548 A1 | 3/2012 |
| WO | 201200116054 | 8/2012 |

OTHER PUBLICATIONS

PowerbyProxi, Wireless Power Solutions, http://www.powerbyproxi.com/, Nov. 18, 2011, 2 pages.

(56) References Cited

OTHER PUBLICATIONS

Now charge your iPhone 4 and 4S with Powermat!, Wireless charging mats and receivers for your iPhone, iPod, Blackberry . . . http://www.powermat.com/, Nov. 18, 2011, 1 page.
Witricity. Wireless Electricity Delivered Over Distance, http://www.witricity.com, Nov. 18, 2011, 1 page.
ConvenientPower, ConvenientPower HK Limited, http://www.convenientpower.com/1/about.php, Nov. 18, 2011, 1 page.
Nigel Power LLC: Private Company Information—BusinessWeek, http://investing.businessweek.com/research/stocks/private/snapshot.asp? p . . . , Nov. 18, 2011, 2 pages.
Sakamoto, et al., "A Novel Circuit for Non-Contact Charging Through Electro-Magnetic Coupling", 1992, IEEE, pp. 165-174.
Abe, et al., "A Non-Contact Charger Using a Resonant Converter with Parallel Capacitor of the Secondary Coil", Apr. 2000, IEEE, vol. 36, No. 2, pp. 444-451.
Sakamoto, et al. "Large Air-Gap Coupler for Inductive Charger", Sep. 1999, IEEE, vol. 35, No. 5, pp. 3526-3528.
Sakamoto, et al. "A Novel Converter for Non-Contact Charging with Electromagnetic Coupling", Nov. 1993, IEEE, vol. 29, No. 6, pp. 3228-3230.
Kim, et al. "Design of a Contaclless Battery Charger for Cellular Phone", Dec. 2001, IEEE, vol. 48, No. 6, pp. 1238-1247.
Hui, et al. "Careless Printed-Circuit Board Transformers for Signal and Energy Transfer", Electronics Letters, May 1998, vol. 34, No. 11, pp. 1052-1054.
Hui, et al. "Optimal Operation of Careless PCB Transformer-Isolated Gate Drive Circuits with Wide Switching Frequency Range", May 1999, IEEE Transactions of Power Electronics, vol. 14, No. 3, pp. 506-514.
Tang, et al. "Characterization of Careless Printed Circuit Board (PCB) Transformers", Nov. 2000, IEEE Transactions of Power Electronics, vol. 15, No. 6, pp. 1275-1282.
Tang, et al. "Careless Printed Circuit Board (PCB) Transformers with Multiple Secondary Windings for Complementary Gate Drive Circuits", May 1999, IEEE Transactions of Power Electronics, vol. 14, No. 3, pp. 431-437.
Tang, et al. "Careless Printed Circuit Board (PCB) Transformers with High Power Density and High Efficiency", May 2000, Electronics Letters, vol. 36, No. 11, pp. 943-944.
Borenstein, "Man Tries Wirelessly Boosting Batteries", Nov. 2006, USA Today, http://www.usatoday.com/tech/wireless/data/2006-11-16-wireless-recharging_x.htm, 5 pages.
Murph, "WildCharger Charges Your Gadgetry Sans Wires", Dec. 2006, Misc. Gadgets, 2 pages.
Gizmo Watch, "Pitstop: A Table Top Recharging Solution by Belkin", http://www.gizmowatch.com/entry/pitstop-a-table-top-recharging-solution-by-belkin, Dec. 2006, 5 pages.
Unknown Author, "Cutting the Cord", Apr. 2007, The Economist, 1 page.
Bishop, "Microsoft Surface Brings Computing to the Table", May 2007, http://seattlepi.nwsource.com/business/317737 msftdevic30.html, 7 pages.
Wildcharge, "The Wire-Free Power Revolution is Only Days Away, and WildCharge, Inc. is Leading the Charge", Sep. 2007, 3 pages.
Economist.com Science Technology Quarterly, "Wireless Charging", http://www.economist.com/science/tq/PrinterFriendly.cfm?story_id=13174387, Apr. 15, 2009, 4 pages.
United States Patent and Trademark Office, Office Action for U.S. Appl. No. 13/708,548, filed Nov. 20, 2013, 5 pages.
United States Patent and Trademark Office, Office Action for U.S. Appl. No. 13/115,811, filed Sep. 23, 2013, 17 pages.
United States Patent and Trademark Office. Office Action for U.S. Appl. No. 13/708,584, filed Sep. 13, 2013, 16 pages.
United States Patent and Trademark Office, Office Action for U.S. Appl. No. 13/158,134, filed Jan. 22, 2014, 43 pages.
United States Patent and Trademark Office, Office Action for U.S. Appl. No. 13/708,827, filed Feb. 5, 2014, 28 pages.
United States Patent and Trademark Office, Office Action for U.S. Appl. No. 13/708,520, filed Feb. 5, 2014, 8 pages.
United States Patent and Trademark Office, Office Action for U.S. Appl. No. 13/115,811, filed Mar. 4, 2014, 15 pages.
United States Patent and Trademark Office, Office Action for U.S. Appl. No. 13/709,983, filed Feb. 27, 2014, 10 pages.
United States Patent and Trademark Office, Office Action for U.S. Appl. No. 13/710,062, filed Feb. 27, 2014, 9 pages.
United States Patent and Trademark Office, Office Action for U.S. Appl. No. 13/710,017, filed Feb. 27, 2014, 11 pages.
Office Action in connection with U.S. Appl. No. 13/708,520 dated May 24, 2013, 7 pages.
Office Action in connection with U.S. Appl. No. 13/158,134 dated Jun. 12, 2013, 15 pages.
United States Patent and Trademark Office, Office Action for U.S. Appl. No. 13/708,838, filed Mar. 14, 2014, 30 pages.
Office Action in connection with U.S. Appl. No. 13/709,983 dated Jun. 7, 2013, 7 pages.
International Search Report dated Jun. 14, 2013, International Application No. PCT/US2013/033352 filed Mar. 21, 2013, 3 pages.
International Searching Authority, International Search Report and Written Opinion for PCT/US2012/021729, Aug. 31, 2012, 9 pages.
Office Action in connection with U.S. Appl. No. 13/710,017 dated Jun. 11, 2013, 7 pages.
European Search Report and Search Opinion in connection with Europe Application 08747863.2 (European National Stage application of PCT/US2008/063084) dated Apr. 2, 2013, 7 pages.
Office Action in connection with Chinese Application 200880023854.4 (Chinese National Stage application of PCT/US2008/063084) dated Aug. 28, 2012, 18 pages.
Office Action in connection with Japanese Application JP/2010-50766 (Japanese National Stage application of PCT/US2008/063084) dated Dec. 3, 2012, 4 pages.
Office Action in connection with U.S. Appl. No. 13/709,937 dated Sep. 12, 2013, 7 pages.
Office Action in connection with U.S. Appl. No. 12/769,586 dated Dec. 13, 2012, 19 pages.
Office Action in connection with U.S. Appl. No. 13/708,827 dated Jun. 26, 2013, 22 pages.
Office Action in connection with U.S. Appl. No. 13/708,838 dated Jun. 24, 2013, 27 pages.
PCT International Search Report in connection with PCT Application No. PCT/US2011/040062 dated Feb. 17, 2012, 9 pages.
Office Action in connection with U.S. Appl. No. 13/708,548 dated Jun. 7, 2013, 5 pages.
Office Action in connection with U.S. Appl. No. 13/115,811 dated Mar. 28, 2013, 13 pages.
PCT International Search Report in connection with PCT application No. PCT/US2007/61406, 8 pages, dated Feb. 14, 2008.
PCT International Search Report in connection with PCT application No. PCT/US2008/63084, 8 pages, dated Aug. 3, 2008.
Office Action in connection with U.S. Appl. No. 13/442,698 dated Sep. 13, 2012, 6 pages.
Office Action in connection with U.S. Appl. No. 12/116,876 dated May 2, 2011, 5 pages.
Office Action in connection with U.S. Appl. No. 11/669,113 dated May 13, 2010, 20 pages.
Office Action in connection with U.S. Appl. No. 11/669,113 dated Aug. 25, 2009, 17 pages.
Office Action in connection with U.S. Appl. No. 11/669,113 dated Oct. 29, 2008, 11 pages.
Office Action in connection with U.S. Appl. No. 13/113,977 dated Nov. 9, 2012, 9 pages.
International Search Report and Written Opinion of the International Searching Authority, Korean Intellectual Property Office, in re International Application No. PCT/US2010/032845 dated Dec. 13, 2010, 10 pages.
WildCharge Life unplugged!. http://www.wildcharg.com/4/17/2009, 2 pages.
Powermat "the Future of Wireless Power has Arrived", http://www.pwrmal.com,Apr. 15, 2009, 2 pages.
ECoupled Wireless Power Technology Fulton Innovation, http://www.ecoupled.com, Apr. 15, 2009, 5 pages.

(56) References Cited

OTHER PUBLICATIONS

Qualcomm Products and Services—Wirelss Airlink Technologies, http://www.qualcomm.com/products_services/airlinks, Apr. 15, 2009, 4 pages.
Office Action in connection with U.S. Appl. No. 11/757,067 dated Jan. 26, 2009, 14 pages.
Office Action in connection with U.S. Appl. No. 11/757,067 dated Oct. 19, 2009, 14 pages.
Office Action in connection with U.S. Appl. No. 11/757,067 dated May 10, 2010, 15 pages.
Japanese Patent Office, Office Action for Japanese Patent Application No. 2010-507666, dated Mar. 9, 2015, 8 pages.
Japanese Patent Office, Office Action for Japanese Patent Application No. 2014-104181, dated Mar. 23, 2015, 14 pages.
United States Patent and Trademark Office, Office Action for U.S. Appl. No. 13/830,161, dated Apr. 16, 2015, 24 pages.
Japanese Patent Office, Examiner's Reconsideration Report for Japanese Patent Application No. 2010-507666, dated Jul. 17, 2014, 1 page.
The Patent Office of the People's Republic of China, 2nd Office Action for Chinese Patent Application No. 200880023854.4, dated Apr. 15, 2013, 4 pages.
Unknown Author, System Description Wireless Power Transfer, vol. 1: Low Power Part 1: Interface Definition, Version 1.0, Jul. 2010, 83 pages.
United States Patent and Trademark Office, Office Action for U.S. Appl. No. 13/829,346, dated Feb. 12, 2015, 10 pages.
United States Patent and Trademark Office, Office Action for U.S. Appl. No. 13/829,186, dated Jan. 23, 2015, 12 pages.
United States Patent and Trademark Office, Office Action for U.S. Appl. No. 13/828,933, dated Feb. 5, 2015, 11 pages.
United States Patent and Trademark Office, Office Action for U.S. Appl. No. 13/352,096, dated Aug. 18, 2014, 14 pages.
United States Patent and Trademark Office, Office Action for U.S. Appl. No. 13/708,584, dated Jan. 23, 2015, 25 pages.
United States Patent and Trademark Office, Office Action for U.S. Appl. No. 12/769,586, dated Jun. 2, 2014, 23 pages.
United States Patent and Trademark Office, Office Action for U.S. Appl. No. 13/708,520, dated Aug. 14, 2014, 9 pages.
United States Patent and Trademark Office, Office Action for U.S. Appl. No. 13/115,811, dated Aug. 20, 2014, 20 pages.
United States Patent and Trademark Office, Office Action for U.S. Appl. No. 14/135,082, dated Dec. 5, 2014, 14 pages.
United States Patent and Trademark Office, Office Action for U.S. Appl. No. 13/708,520, dated Mar. 11, 2015, 10 pages.
International Searching Authority at the U.S. Patent and Trademark Office, International Search Report and Written Opinion for PCT International Patent Application No. PCT/US2013/078534, dated May 13, 2014, 11 pages.
International Searching Authority and Written Opinion From the U.S. Patent and Trademark Office, International Search Report and Written Opinion for PCT International Application No. PCT/US2013/069270, dated Apr. 4, 2014, 9 pages.
Hui, "A New Generation of Universal Contactless Battery Charging Platform for Portable Consumer Electronic Equipment", IEEE Transactions on Power Electronics, vol. 20, No. 3, May 2005, pp. 620-627, 8 pages.
Tang, et al., "Evaluation of the Shielding Effects on Printed-Circuit-Board Transformers Using Ferrite Plates and Copper Sheets", IEEE Transactions on Power Electronics, vol. 17, No. 6, Nov. 2002, pp. 1080-1088, 9 pages.
Liu, et al., "An Analysis of a Double-Layer Electromagnetic Shield for a Universal Contactless Battery Charging Platform", Department of Electronic Engineering City University of Hong Kong, IEEE, 2005, pp. 1767-1772, 6 pages.
Liu, et al., Equivalent Circuit Modeling of a Multilayer Planar Winding Array Structure for Use in a Universal Contactless Battery Charging Platform, IEEE Transactions on Power Electronics, vol. 22, No. 1, Jan. 2007, pp. 21-29, 9 pages.
Liu, et al., "Simulation Study and Experimental Verification of a Universal Contactless Battery Charging Platform with Localized Charging Features", IEEE Transactions on Power Electronics, vol. 22, No. 6, Nov. 2007, pp. 2202-2210, 9 pages.
Liu, et al., "Optimal Design of a Hybrid Winding Structure for Planar Contaclless Battery Charging Platform", IEEE Transactions on Power Electronics, vol. 23, No. 1, Jan. 2008, pp. 455-463, 9 pages.
Karalis, et al., "Efficient Wirelss Non-Radiative Mid-Range Energy Transfer", ScienceDirect, Annals of Physics 323, 2008, pp. 34-48, 15 pages.
Su, et al., "Mutual Inductance Calculation of Movable Planar Coils on Parallel Surfaces", IEEE Transactions on Power Electronics, vol. 24, No. 4, Apr. 2009, pp. 1115-1124, 10 pages.
Hui, et al., "Careless Printed Circuit Board (PCB) Transformers—Fundamental Characteristics and Application Potential", IEEE Circuits and Systems, Vo. 11, No. 3, Third Quarter 2000, pp. 1-48, 48 pages.
Sekitani, et al., "A Large-Area Flexible Wireless Power Transmission Sheet Using Printed Plastic MEMS Switches and Organic Field-Effect Transistors", IEEE, Quantum-Phase Electronics Center, School of Engineering, The University of Tokyo, 2006, 4 pages.
Choi, et al., "A New Contactless Battery Charger for Portable Telecommunication/Compuing Electronics", IEEE, School of Electronic and Electrical Engineering, Kyungpook National University, Taegu, Korea, 2011, pp. 58-59 2 pages.
Hui, et al., "Careless Printed Circuit Board (PCB) Transformers for Power MOSFET/IGBT Gate Drive Circuits", IEEE Transactions on Power Electronics, vol. 14, No. 3, May 1999, pp. 422-430, 9 pages.
Tang, et al., "Careless Planar Printed-Circuit-Board (PCB) Transformers—A Fundamental Concept for Signal and Energy Transfer", IEEE Transactions on Power Electronics, vol. 15, No. 5, Sep. 2000, pp. 931-941, 11 pages.
Hatanaka, et al.. "Power Transmission of a Desk with Cord-Free Power Supply". IEEE Transactions on Magnetics. vol. 38. No. 5, Sep. 2002, pp. 3329-3331, 3 pages.
Fernandez, et al., "Design Issues of a Core-less Transformer for a Contact-less Application", IEEE, Universidad Politecnica de Madrid, 2002, pp. 339-345, 7 pages.
Office Action in connection with Application No. 113/155,811 dated Mar. 8, 2013, 13 pages.
Liu, et al., "Optimal Design of a Hybrid Winding Structure for Planar Contactless Battery Charging Platform", IEEE, Department of Electronic Engineering, City University of Hong Kong, 2006, pp. 2568-2575, 8 pages.
Topfer, et al., "Multi-Pole Magnetization of NdFeB Sintered Magnets and Thick Films for Magnetic Micro-Actuators", ScienceDirect, Sensor and Actuators, 2004, pp. 257-263, 7 pages.
Topfer, et al., "Multi-Pole Magnetization of NdFeB Magnets for Magnetic Micro-Actuators and Its Characterization with a Magnetic Field Mapping Device", ScienceDirect, Journal of Magnetism and Magnetic Materials, 2004, 124-129, 6 pages.
Sakamoto, et al., "A Novel High Power Converter for Non-Contact Charging with Magnetic Coupling", IEEE Transactions on Magnetics, vol. 30, No. 6, Nov. 1994, pp. 4755-4757, 3 pages.
Hui, et al., "Some Electromagnetic Aspects of Careless PCB Transformers", IEEE Transactions on Power Electronics, vol. 15, No. 4, Jul. 2000, pp. 805-810, 6 pages.
Waffenschmidt, et al., "Limitation of Inductive Power Transfer for Consumer Applications", 13th European Conference on Power Electronics and Applications, Barcelona, 2009. EPE '09. pp. 1-10, 10 pages.
Stokes, "Palm Strikes Back with new OS, Pre Handset at CES, http://arstechnica.com/news.ars/post/20090101-palm-laundhes-new-handset-pre-operating", Jan. 8, 2009, 6 pages.
Sullivan, Visteon to Sell Wireless Gadget Charger, "Wire-Free Technology will Lets Consumers Dump Cords and Chargers", Red Herring, Dec. 29, 2006, 2 pages.
Kim, "Wireless Charger for New Palm Phone", San Francisco Chronicle and SFGate.com, May 11, 2009, 2 pages.

(56) References Cited

OTHER PUBLICATIONS

Compeau, Red Zen Marketing, "Could This be the Mojo Behind the Palm Pre's Touchstone Charger?", http://redzenmarketing.posterous.com/could-this-be-the-mojo-behind-the-palm-pres-t, Jun. 5, 2009, 3 pages.
Fulton Innovation LLC, "The Big Story for CES 2007: The Public Debut of eCoupled Intelligent Wireless Power", ecoupled, Dec. 27, 2006, 2 pages.
Miller, "Palm May Make Pre Scarce", The San Jose Mercury News, Apr. 29, 2009, 1 page.
Murakami et al., "Consideration on Cordless Power Station Contactless Power Transmission System", IEEE Transactions on Magnets, vol. 32, No. 5, Sep. 1996, 3 pages.
Epson Air Trans "Wireless Power Transfer", http://www.2k1.co.uk/components/epson_airtrans.asp, Dec. 8, 2008, 2 pages.
Choi, et al., "A New Contactless Battery Charger for Portable Telecommunication/Compuing Electronics", IEEE, School of Electronic and Electrical Engineering, Kyungpook National University, Taegu, Korea, 2001, pp. 58-59 2 pages.
PCT International Preliminary Reporton Patentability dated Nov. 10, 2011 in re International Application No. PCT, US2010/032845, 7 pages.
USPTO; Non-Final Action for U.S. Appl. No. 17/492,083 dated Dec. 8, 2021, 22 pages.
USPTO; Non-Final Action for U.S. Appl. No. 17/507,351 dated Feb. 2, 2022, 21 pages.
USPTO; Ex parte Quayle Action for U.S. Appl. No. 17/507,351 dated Feb. 24, 2022, 8 pages.
USPTO; Ex parte Quayle Action for U.S. Appl. No. 17/555,303 dated Mar. 7, 2022, 8 pages.
USPTO; Non-Final Action for U.S. Appl. No. 17/522,506 dated Mar. 10, 2022, 8 pages.
USPTO; Ex parte Quayle Action for U.S. Appl. No. 17/555,293 dated Apr. 18, 2022, 7 pages.
USPTO; Non-Final Action for U.S. Appl. No. 17/492,083 dated Apr. 11, 2022, 29 pages.
USPTO; Notice of Allowance for U.S. Appl. No. 17/677,572 dated May 5, 2022, 10 pages.
USPTO; Non-Final Action for U.S. Appl. No. 17/522,367 dated Jun. 23, 2022, 21 pages.
USPTO; Final Action for U.S. Appl. No. 17/492,083 dated Aug. 15, 2022, 29 pages.
USPTO; Final Action for U.S. Appl. No. 17/522,367 dated Oct. 13, 2022, 25 pages.

* cited by examiner

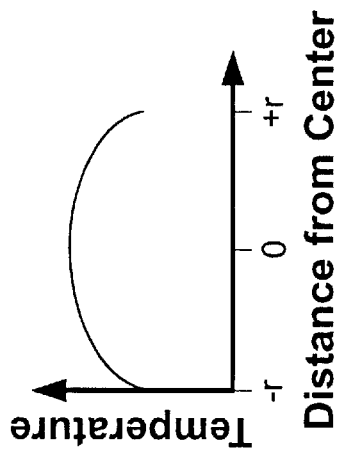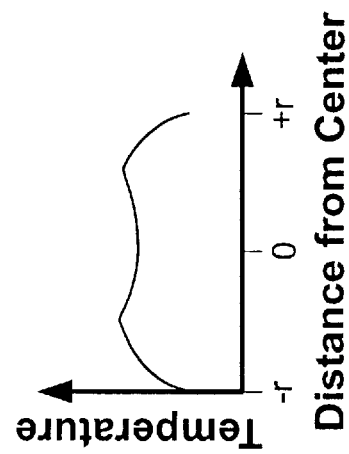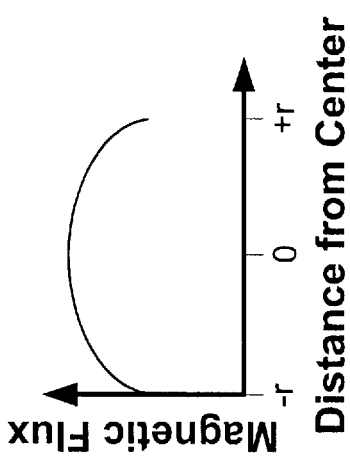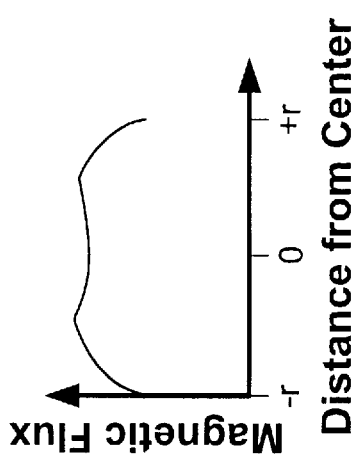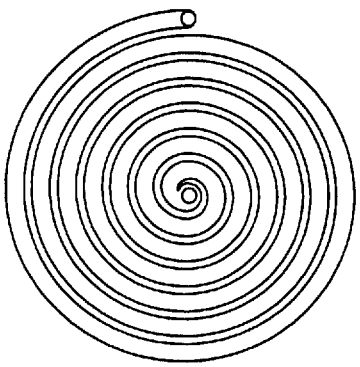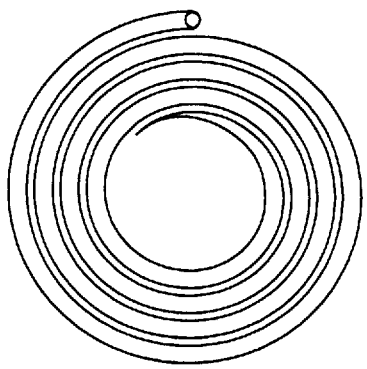
FIG. 8
FIG. 9

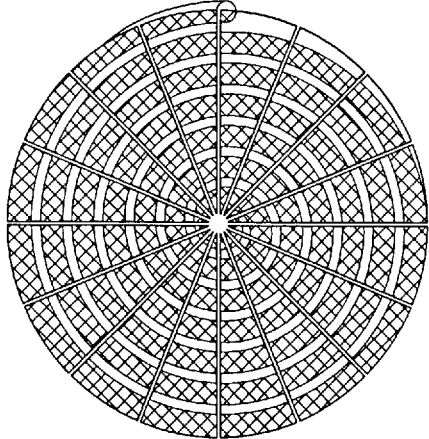
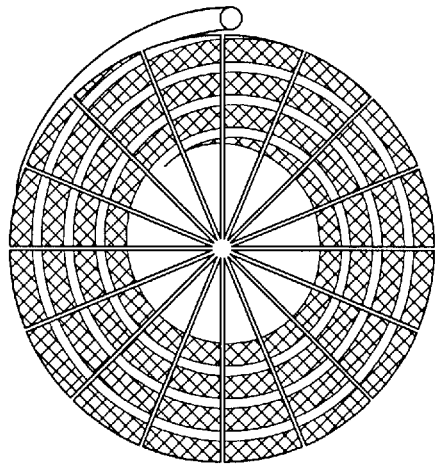
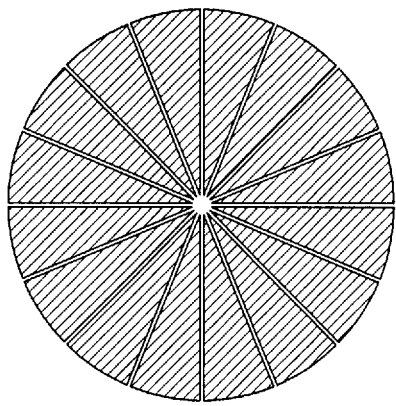
FIG. 12
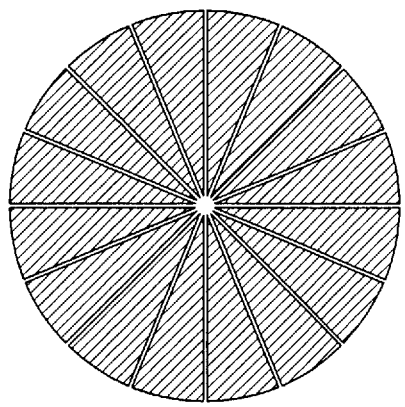
FIG. 13
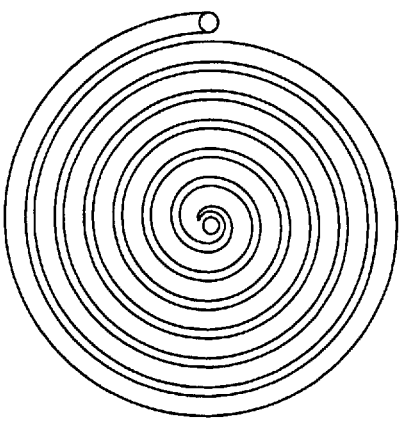
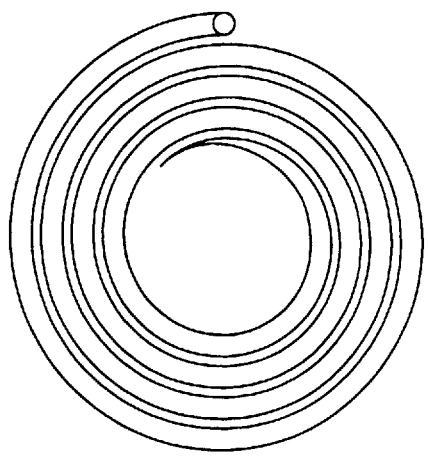

(a)

(b)

720

730

METAL LAYER FOR INDUCTIVE POWER TRANSFER

CLAIM OF PRIORITY AND CROSS-REFERENCE TO RELATED APPLICATIONS

This application is a continuation of U.S. patent application Ser. No. 13/708,584, titled CONTEXTUALLY AWARE CHARING OF MOBILE DEVICES, filed Dec. 7, 2012; which is a continuation of U.S. patent application Ser. No. 12/769,586, titled SYSTEM AND METHODS FOR INDUCTIVE CHARGING, AND IMPROVEMENTS AND USES THEREOF", filed Apr. 28, 2010; which application is a continuation-in-part of U.S. patent application Ser. No. 12/116,876, titled "SYSTEM AND METHOD FOR INDUCTIVE CHARGING OF PORTABLE DEVICES", filed May 7, 2008; which application claims the benefit of priority to U.S. Provisional Patent Applications Application No. 61/173,497, titled "CONTEXTUALLY AWARE POWER AND COMMUNICATION FOR USE WITH MOBILE DEVICES", filed Apr. 28, 2009; Application No. 61/178,807, titled "CONTEXTUALLY AWARE POWER AND COMMUNICATION FOR USE WITH MOBILE DEVICES", filed May 15, 2009; Application No. 61/184,659, titled "SYSTEM AND METHOD FOR IMPROVED WIRELESS CHARGING AND POWER TRANSFER", filed Jun. 5, 2009; Application No. 61/223,673, titled "SYSTEM AND METHOD FOR IMPROVED WIRELESS CHARGING AND POWER TRANSFER", filed Jul. 7, 2009; Application No. 61/223,669, titled "SYSTEM AND METHOD FOR WIRELESS CHARGING OF DEVICES AND BATTERIES", filed Jul. 7, 2009; Application No. 61/304,320, titled "SYSTEM AND METHOD FOR PROVIDING WIRELESS POWER CHARGERS, RECEIVERS AND BATTERIES", filed Feb. 12, 2010; and Application No. 61/317,946, titled "SYSTEMS AND METHODS FOR PROVIDING OR FOR USE WITH WIRELESS POWER CHARGERS, RECEIVERS AND BATTERIES", filed Mar. 26, 2010; which application is related to U.S. Patent Applications Application No. 60/763,816, titled "PORTABLE INDUCTIVE POWER SOURCE", filed Jan. 31, 2006; Application No. 60/810,262, titled "MOBILE DEVICE, CHARGER, AND POWER SUPPLY", filed Jun. 1, 2006; Application No. 60/810,298, titled "MOBILE DEVICE, BATTERY, CHARGING SYSTEM, AND POWER SUPPLY SYSTEM", filed Jun. 1, 2006; Application No. 60/868,674, titled "SYSTEM AND METHOD FOR PROVIDING AND USING A PORTABLE INDUCTIVE POWER SOURCE", filed Dec. 5, 2006; application Ser. No. 11/669,113, titled "INDUCTIVE POWER SOURCE AND CHARGING SYSTEM", filed Jan. 30, 2007; application Ser. No. 11/757,067, titled "POWER SOURCE, CHARGING SYSTEM, AND INDUCTIVE RECEIVER FOR MOBILE DEVICES", filed Jun. 1, 2007; Application No. 60/916,748, titled "SYSTEM AND METHOD FOR CHARGING AND POWERING MOBILE DEVICES, BATTERIES, AND OTHER DEVICES", filed May 8, 2007; Application No. 60/952,835, titled "SYSTEM AND METHOD FOR INDUCTIVE CHARGING OF PORTABLE DEVICES", filed Jul. 30, 2007; Application No. 61/012,922, titled "WIRELESS CHARGER WITH POSITION INSENSITIVITY TO PLACEMENT OF MOBILE DEVICES", filed Dec. 12, 2007; Application No. 61/012,924, titled "SYSTEM AND METHOD FOR PROVIDING CONTROL, REGULATION, AND COMMUNICATION IN CHARGERS AND POWER SUPPLIES", filed Dec. 12, 2007; Application No. 61/015,606, titled "WIRELESS CHARGER WITH POSITION INSENSITIVITY TO PLACEMENT OF MOBILE AND ELECTRONIC DEVICES", filed Dec. 20, 2007; and application Ser. No. 12/116,876, titled "SYSTEM AND METHOD FOR INDUCTIVE CHARGING OF PORTABLE DEVICES", filed May 7, 2008; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is related generally to power supplies and other power sources and chargers and particularly to inductive charging, and to improvements, systems and methods for use thereof, such as improved transfer of wireless power to mobile devices and batteries.

BACKGROUND

With the increased use of mobile devices, many methods and protocols for wireless and wired connectivity and communication between nearby devices (several centimeters to meters) and also between devices and the wider network of farther devices (tens of meters to thousands of kilometers) are proliferating. For near devices, Bluetooth, WiFi, Wireless USB, Zigbee, Near Field Communication (NFC), HDMI, USB, Firewire, RS232, GPIB, etc., and other specialized device or application specific protocols are common, while for larger distances devices may include wireless technologies such as 2G, 3G, 4G, GSM, Edge, WiMAX, EVDO, Satellite, Optical, or GPS etc. or wired technologies such as Ethernet, Dial up modem, DSL, Fiber, Power Line, etc. may coexist in a single device.

While these technologies provide huge advantages to users in connectivity and communication, the vast majority of electronics have so far been powered or charged through traditional use of wired power supplies and chargers.

Recently, there has been an interest in providing a universal wireless method for powering or charging one or several mobile devices, batteries, or electronics devices in general simultaneously. These "wireless power" methods can be generally divided into conductive and inductive methods. While the conductive methods use flow of current from a charger and/or power supply into the mobile devices to provide power and therefore are not strictly speaking wireless, they offer geometries where a user can place a device on a pad or similar object and receive power through matching contacts on the back of a device and the pad without 'plugging in' the device. The inductive methods (including variations such as magnetic resonance) utilize coils or wires in a charger and/or power supply to create a magnetic field in the vicinity of the surface. A coil or wire in a receiver embedded into or on a device or battery that is in the vicinity of the surface can sense the magnetic field. Power from the charger and/or power supply can be transferred to the receiver without any wired connection through air or other media in between.

However, despite advances in "wireless power", both with the conductive and inductive approaches, little progress has been made in terms of increasing efficiency, such as improved transfer of wireless power, and new uses and applications for such systems. This is the general area that embodiments of the invention are intended to address.

SUMMARY

Described herein are various systems and methods for use with power supplies and other power sources and chargers and particularly those that use inductive charging, including systems and methods for use thereof, such as improved transfer of wireless power to mobile devices and batteries.

In accordance with some embodiments described herein, various methods are described by which the wired and/or wireless power devices and chargers or power supplies can provide additional connectivity and communications capabilities. In this way, in addition to charging, during the charging or docking process, other activities that are useful to the user can be implemented.

In accordance with some embodiments described herein, features can be provided that overcome several shortcomings of previous approaches, including methods by which the wireless power devices and chargers or power supplies can provide better thermal performance, better detection of external objects, and better power transfer efficiencies, and can enable operation at greater distance between charger and receiver coils.

In accordance with some embodiments described herein, a wireless charger system or system for transfer of power wirelessly can be provided in several different geometries and/or modes.

In accordance with some embodiments described herein, a device is described by which the wireless charger and/or power supply is a device that is powered by a power source from another device such as the power available from the USB or PCMCIA port or similar from a laptop computer or a peripheral hub or consumer electronic or communication device such as a music player, TV, video player, stereo, or car stereo USB or other outlets which include power.

In accordance with some embodiments described herein, features can be provided to improve charging efficiency, usage, and other features, and can be used in combination with systems and methods described, for example, in U.S. patent application Ser. No. 11/669,113, filed Jan. 30, 2007 (published as U.S. Patent Publication No. 20070182367); U.S. patent application Ser. No. 11/757,067, filed Jun. 1, 2007 (published as U.S. Patent Publication No. 20070279002); and U.S. patent application Ser. No. 12/116,876, filed May 7, 2008, (published as U.S. Patent Publication No. 20090096413), each of which applications are incorporated by reference herein.

In accordance with some embodiments described herein, an inductive charger for inductive power transfer to an electronic device using an alternating magnetic field at an operating frequency is disclosed. The inductive charger includes a substantially planar inductive charging coil positioned substantially parallel to a top surface of the inductive charger that faces the electronic device for inductive power transfer. The inductive charger further includes an electrically conductive shield layer comprising metal. The shield layer is positioned proximate to and substantially parallel to the inductive charging coil to cover a surface of the inductive charging coil. The shield layer includes multiple substantially concentric metallic rings, with each of the metallic rings having multiple sections. Radially adjacent sections of the metallic ring are electrically isolated from one another. The sections of each of the metallic rings are separated by gaps such that each metallic ring is electrically discontinuous to impede eddy current generation in the metallic rings and the shield layer and to impede heating of the shield layer by the alternating magnetic field during inductive power transfer.

In accordance with some embodiments described herein, an electronic device for receiving inductive power transfer from an inductive charger using an alternating magnetic field at an operating frequency is disclosed. The electronic device includes an inductive charging receiver. The inductive charging receiver includes a substantially planar inductive charging receiver coil positioned substantially parallel to a bottom surface of the electronic device that faces the inductive charger for inductive power transfer. The inductive charging receiver further includes an electrically conductive shield layer comprising metal. The shield layer is positioned proximate to the inductive charging receiver coil to cover a surface of the inductive charging receiver coil. The shield layer includes multiple substantially concentric metallic rings, with each of the metallic rings having multiple sections. Radially adjacent sections of the metallic rings are electrically isolated from one another. The sections of each of the metallic rings are separated by gaps such that each metallic ring is electrically discontinuous to impede eddy current generation in the metallic rings and the shield layer and to impede heating of the shield layer by the alternating magnetic field during inductive power transfer.

In accordance with some embodiments described herein, an inductive charging system that uses an alternating magnetic field for inductive power transfer is disclosed. The inductive charging system includes a substantially planar inductive coil. The inductive charging system further includes a substantially planar shielding means for reducing electromagnetic interference or heat distribution form the inductive coil during inductive power transfer. The shielding means is positioned proximate to and substantially parallel to the inductive coil to cover a surface of the inductive coil. The shielding means comprises electrically conductive metal. The shielding means includes multiple substantially concentric metallic rings, with each of the metallic rings having multiple sections. Radially adjacent sections of the metallic ring are electrically isolated from one another. The sections of each of the metallic rings are separated by gaps such that each metallic ring is electrically discontinuous to impede eddy current generation in the metallic rings and the shielding means and to impede heating of the shielding means by the alternating magnetic field during inductive power transfer.

In accordance with some embodiments described herein, an inductive charging system that uses an alternating magnetic field for inductive power transfer is disclosed. The inductive charging system includes an inductive coil having an annular spiral shape with an inner radius that is 5/16 or more of an outer radius. The inductive charging system further includes a shielding means for reducing electromagnetic interference or heat distribution from the inductive coil during inductive power transfer. The shielding means is positioned proximate to the inductive coil to cover a surface of the inductive coil. The shielding means includes electrically conductive metal having a thickness of 100 micrometers or less. The shielding means includes radially arranged electrical gaps to impede eddy current generation in the shielding means and to impede heating of the shielding means by the alternating magnetic field during inductive power transfer.

BRIEF DESCRIPTION OF THE FIGURES

FIG. 8 shows an illustration of a helical coil and a representative shape for the generated magnetic flux by this coil, in accordance with an embodiment.

FIG. 9 shows an illustration of a coil designed to have an annular shape with no winding in the middle, in accordance with an embodiment.

FIG. 12 shows an illustration of an embodiment wherein a metal or other thermally conductive layer is used for heat removal from the coil.

FIG. 13 shows an illustration of an embodiment including the use of heat distribution away from the coil with a metal layer below the coil.

DETAILED DESCRIPTION

Figure 1:
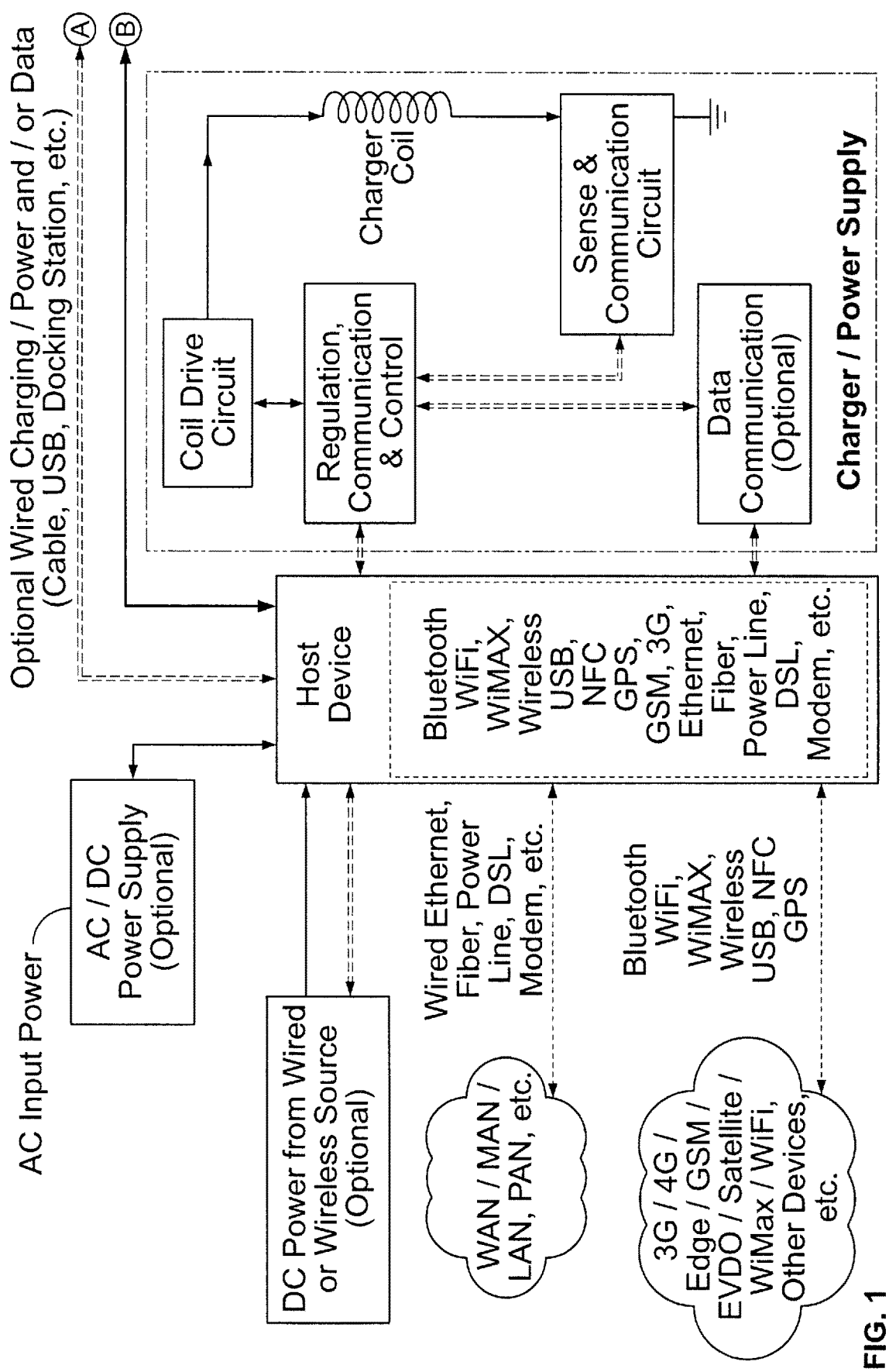
FIG. 1 shows an illustration of a circuit in accordance with an embodiment.
Figure 1:
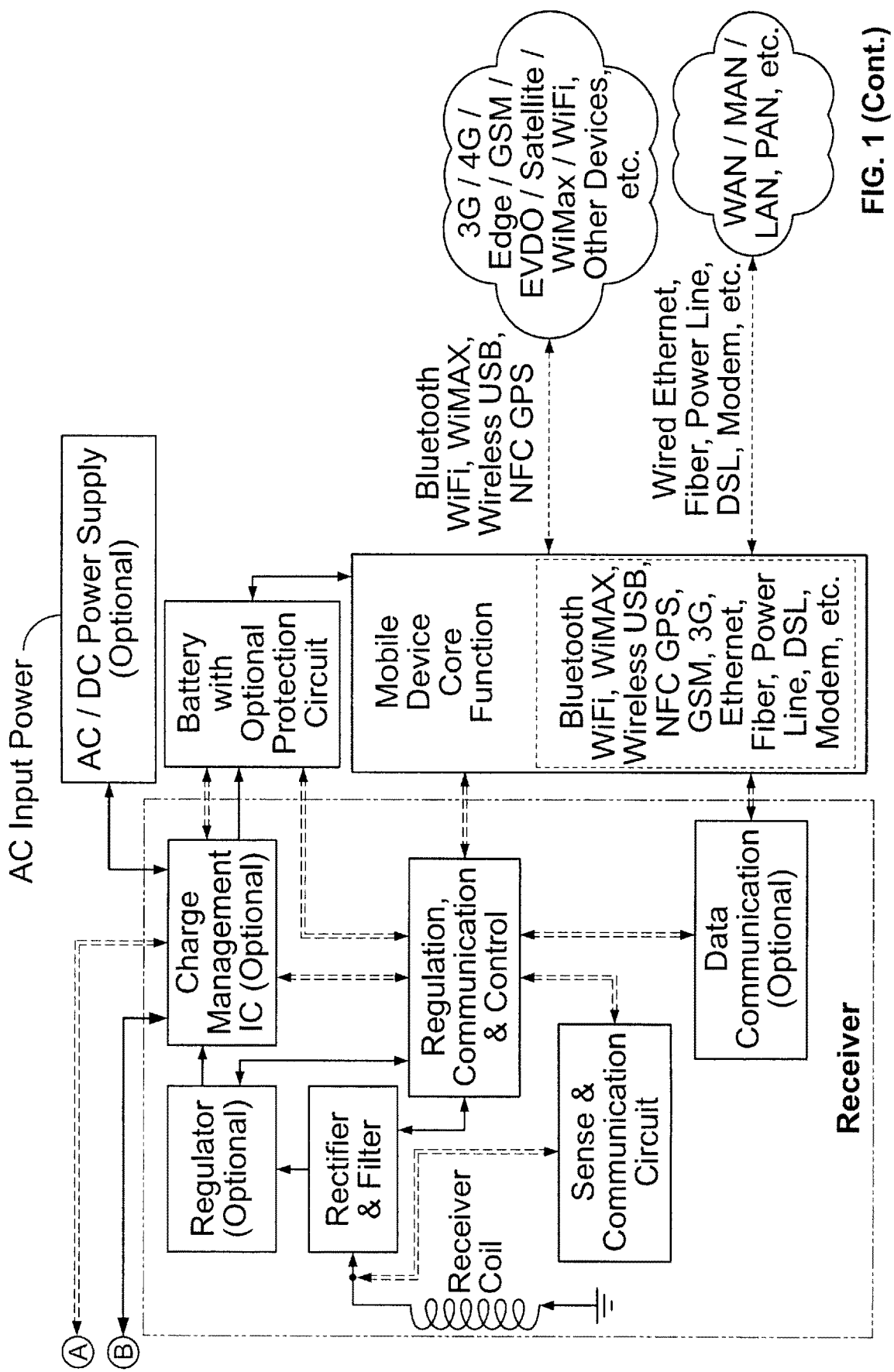

With the proliferation of mobile devices in recent years, the area of powering and charging these devices has attracted more attention. The vast majority of the electronic devices in use today are powered and/or charged through conduction of electricity through wires from a power supply or charger to the device. While this method has proven to be efficient for most stationary devices, recently, there has been an interest in providing wireless methods for powering or charging one or several mobile devices, batteries, or electronics devices. The advantages include the ability to eliminate a charger and/or power supply cord and the possibility of implementing a universal charger/power supply that can be able to charge/power multiple devices one at a time or simultaneously. The so called "wireless power" methods can also be generally divided into conductive and inductive methods. While the conductive methods use flow of current from a charger into the mobile devices and/or battery to provide power and therefore are not strictly speaking wireless, they offer geometries where a user can place a device on a pad or similar object and receive power through matching contacts on the back of a device or an after-market cover or 'skin' and the pad without 'plugging in' the device. Methods based on an array of connectors or strips of metal in a pad that can power mobile devices conductively have been proposed.

The inductive methods utilize coils or wires near the surface of a charger and/or power supply to create a magnetic field in the vicinity of the surface. A coil or wire in a receiver embedded into a device that is in the vicinity of the surface can sense the magnetic field. Power from the charger can be transferred to the receiver without any wired connection through air or other media in between. By using a higher Quality Factor (Q) resonant circuit, the distance between a wireless charger and/or power supply and receiver coil has been where, in general, larger distances are achieved at the expense of efficiency increased. These so called magnetic resonance techniques for wireless power transfer are a variation on the inductive power transfer and will be considered in that category in the discussion here.

The inductive method has several advantages over the conductive approach, such as:

Connectors that are a major failure point in electronics are eliminated.

Environmentally hermetic devices can be developed that are immune to moisture or liquids.

The receiver can be built directly on the battery so the battery can be charged through the outside shell of the device by induction. This enables changing the battery of any existing product after-market with a similar sized and shaped battery to enable inductive charging.

With a properly designed charger and/or power supply pad, the charging/powering is independent of position and does not require placement of device in any particular location or orientation.

As described herein, powering or charging of a mobile or electronic device or battery may be used interchangeably. Many mobile devices incorporate rechargeable batteries and require external DC power to charge these batteries for operation. However, in case of some devices such as a computer laptop, while the device is connected to DC power to charge its internal battery, the device may also be using the DC power to operate simultaneously. The ratio of power used for charging the internal rechargeable battery to operating the device depends on the degree to which the battery is discharged, the power necessary to operate the device, and what the device is doing at any given time. In the extreme, a laptop with its battery removed may only use the DC power to operate. In this case no charging occurs and 100% of the provided DC power is used to operate the device.

Contextually Aware Inductive Charger/Receiver

In accordance with some embodiments described herein, various methods are described by which the wired and/or wireless power devices and chargers or power supplies can provide additional connectivity and communications capabilities. In this way, in addition to charging, during the charging or docking process, other activities that are useful to the user can be implemented. While most of the description below is based on wired and/or the inductive method, the embodiments described here can be implemented with traditional wired charging and/or power and wireless charging and/or power through the inductive method or the conductive method or the magnetic resonance method, optical, or other methods for power transfer some of which have been described above. Inductive methods of power transfer are described below as an example of the more general wireless power transfer.

With the proliferation of the wireless charging and/or power and communications technologies, many new embodiments of products and services can be implemented that can provide user convenience. Especially, the combination of wireless power and wireless communications technologies provides a seamless convenient user experience that is very attractive in the mobile environment. In this embodiment, several architectures and methods for combining charging/power transfer with data/signal communication to provide additional functionality and use cases that are contextually aware' are described. By contextually aware charging or power and communication, we mean that the mobile device or the charging platform adapts to the location or use model of interest to the user and environment and provides different functionalities, applications and features depending on preset or ad hoc conditions.

FIG. 1 is a high-level view 100 of a mobile device and/or battery in communication with a host device that is also being powered and/or charged. The host device may be a charging pad or docking station, or can be a laptop, kiosk, car, train, airplane, computer, data gateway, set top box, game station, speakers, video monitor, music or video system, a piece of furniture such as a desk, chair, etc. The mobile device and/or the host can itself be connected to the Personal Area Network (PAN), Local Area Network (LAN), Wide Area Network (WAN), Metropolitan Area Network (MAN), Satellite, or cellular networks (3G, 4G, GSM, Edge, etc.) or specific navigation or other networks through wired methods, wireless methods, fiber optics, DSL, WiMAX, WiFi, dial up modem, etc. Also, the host and the mobile device can communicate through a variety of wired or wireless methods such as USB, Bluetooth, WiFi, WiMAX, Wireless USB, etc. The means for the charging and/or powering of the mobile device and/or the host can be wired (through an AC/DC adaptor, USB or mini-usb connector, etc.) or wireless (through induction, conduction, magnetic resonance techniques, microwave, optical, solar cells, etc.). In the figure, only a subset of potential protocols and methods for connectivity and communication and charging/power have been shown but the extension to other protocols including specific protocols for control of devices in the home and/or car or other specific situations is clear for the persons in the field.

In FIG. 1, as an example, the basic components of an inductive wireless charging system are shown. In accordance with an embodiment, the system comprises the power paths and power control signals shown in solid lines. Data lines are in dashed lines. Double dashed lines represent connections that can be data or charger and/or power supply signals. The charger and/or power supply comprises a drive circuit for exciting the charger coil. This can be a field effect transistor (FET) or other transistor for generating the alternating current to drive the coil. The regulation/communication and control section is responsible for controlling the frequency/pulse duration, or other characteristics of the drive to control the transferred power or to communicate a signal or data to the receiver. In addition, the circuit can contain a sense circuit that is used to sense the proximity of the receiver and/or as a component for data or signal transfer between the charger and/or power supply and the receiver. In the general geometry shown in FIG. 1, the regulation/communication and control portion or a separate circuit can also provide a communication channel for data to and from a host device such as a laptop or other mobile device or an environment such as a car or other vehicle or home or office computer or other device where the charger/power supply is located or is connected to or nearby. By being near each other, we mean that 2 devices are within a distance such that they can interact through a wireless, wired, optical, or other method or protocol within a Personal Area Network (PAN) or Local Area Network (LAN). The mobile device and/or the host can contain additional communication systems such as Bluetooth, WiFi, WiMAX, Wireless USB, Zigbee, NFC, GPS, or wired communications such as USB, Ethernet, DSL, Modem, Fiber optics, Optical, HDMI, Power Line Communication (PLC), or other protocols for communications and control between devices and internet or systems such as in the house, car, etc. The charging and/or power for the mobile device may be through induction, conduction, resonant magnetic power transfer, optical power, etc. and/or traditional wired technologies.

In the description provided herein, data is defined as information or file or signals that are exchanged that are not necessarily directly involved in the charging/power supply operation. Another example of information being exchanged between components for charging/power supply function is charger signal (CS). Examples of data can be name, address, phone number, or calendar information, music, video, TV, podcasts, or image files or application files. In addition data can be information related to amount of charge in a battery, presence of a mobile device on a charger, type of device being charged, information about the user of the mobile device and their preferences, location or status of the mobile device, battery, charger or host, etc. In FIG. 1, the data lines have been shown in dotted line while the solid lines represent connections for charging function. Some connections such as the one from the sense circuit to the regulation, communication and control can be for data or charging signal depending on whether any data exchange is implemented or the sense circuit is strictly used for charger and/or power supply signal functions. Similarly, for example, the connection from the mobile device to the regulation, communication, and control circuit in the receiver can be either for data or charger and/or power supply signal. These signals are shown with double dotted lines in FIG. 1. The breakdown between CS and data shown is as an example and many other situations where the signals may be interpreted as belonging to either group may occur.

In FIG. 1, a general schematic which can include bi-directional data and CS transfer is shown. However, the flow of information can be uni-directional as well. In this case, for example, if the CS and data is from receiver to charger and/or power supply, only a sense circuit in the charger and/or power supply may be implemented. In the block diagram shown in FIG. 1, the data from the charger and/or power supply to the receiver can be transferred by low or high frequency modulation of the amplitude of the power signal (the drive signal for power transfer) or frequency modulation and filtering or synching in the receiver. These techniques are often used in communication circuits and can be applied here. Data or CS information can be transferred from receiver to charger and/or power supply by techniques such as modulating the load impedance of the receiver, or other techniques, as described for example in U.S. patent application titled "SYSTEM AND METHOD FOR INDUCTIVE CHARGING OF PORTABLE DEVICES", application Ser. No. 12/116,876, filed May 7, 2008, (published as U.S. Patent Publication No. 20090096413), which is incorporated by reference herein. In this way, any data or CS in the receiver appears as a change in the load of the charger and/or power supply output and can be sensed by the charger and/or power supply sense circuitry. The data exchanged between the charger and/or power supply and the receiver can be exchanged in analog or digital format and many options for this exchange exist.

In accordance with other embodiments, it is possible to have the data and/or charge signal data transferred through another mechanism separate from the power signal. In the embodiment shown in FIG. 2, a wireless channel for data and CS is shown where the wireless channel can be a dedicated special channel between the charger and/or power supply and the receiver or can be based on an existing protocol such as Bluetooth, WiFi, WiMAX, Wireless USB, Zigbee, NFC, etc. or a custom or proprietary protocol.

Figure 2:
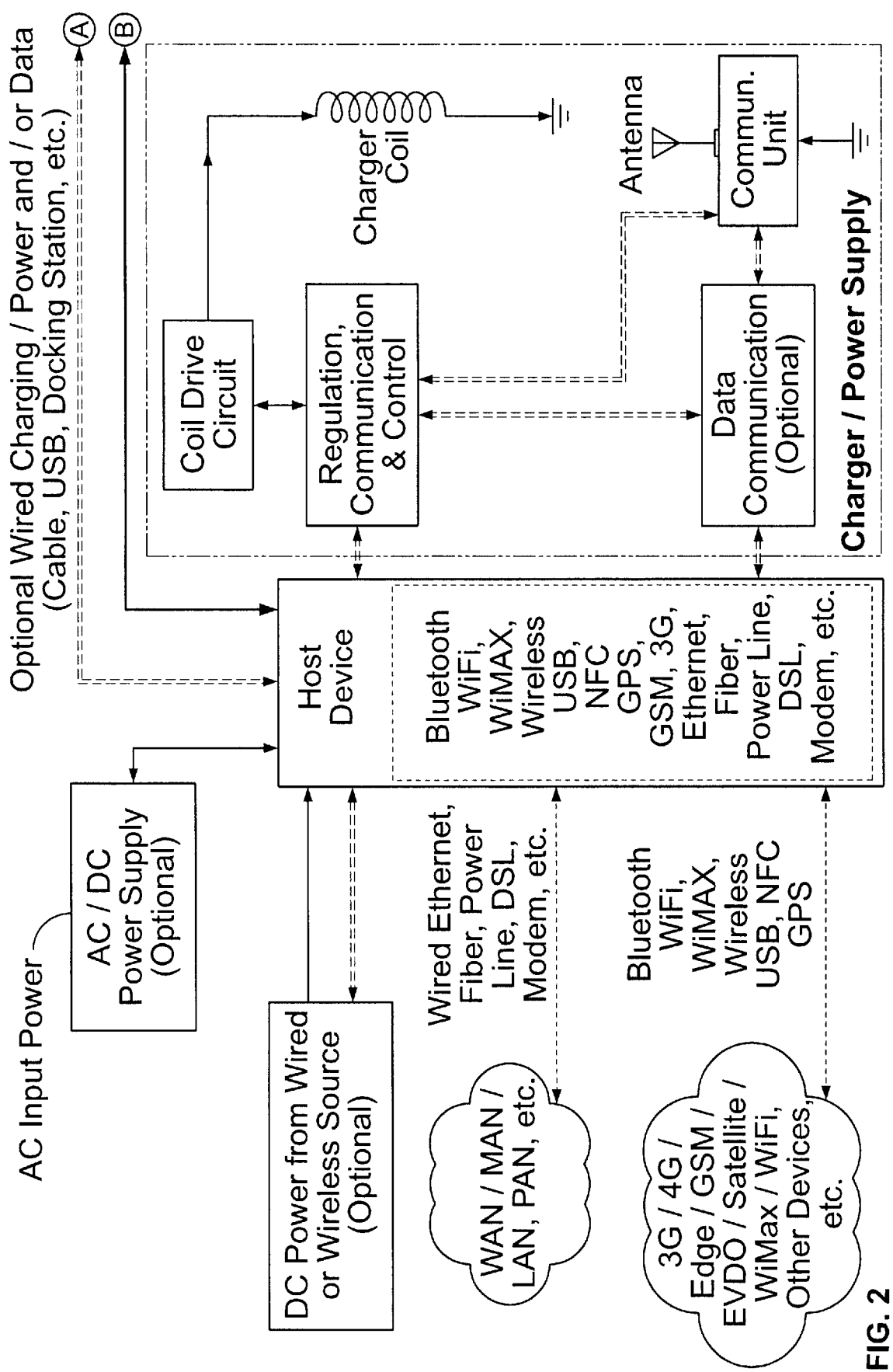
FIG. 2 shows an illustration of a circuit in accordance with an embodiment.
Figure 2:
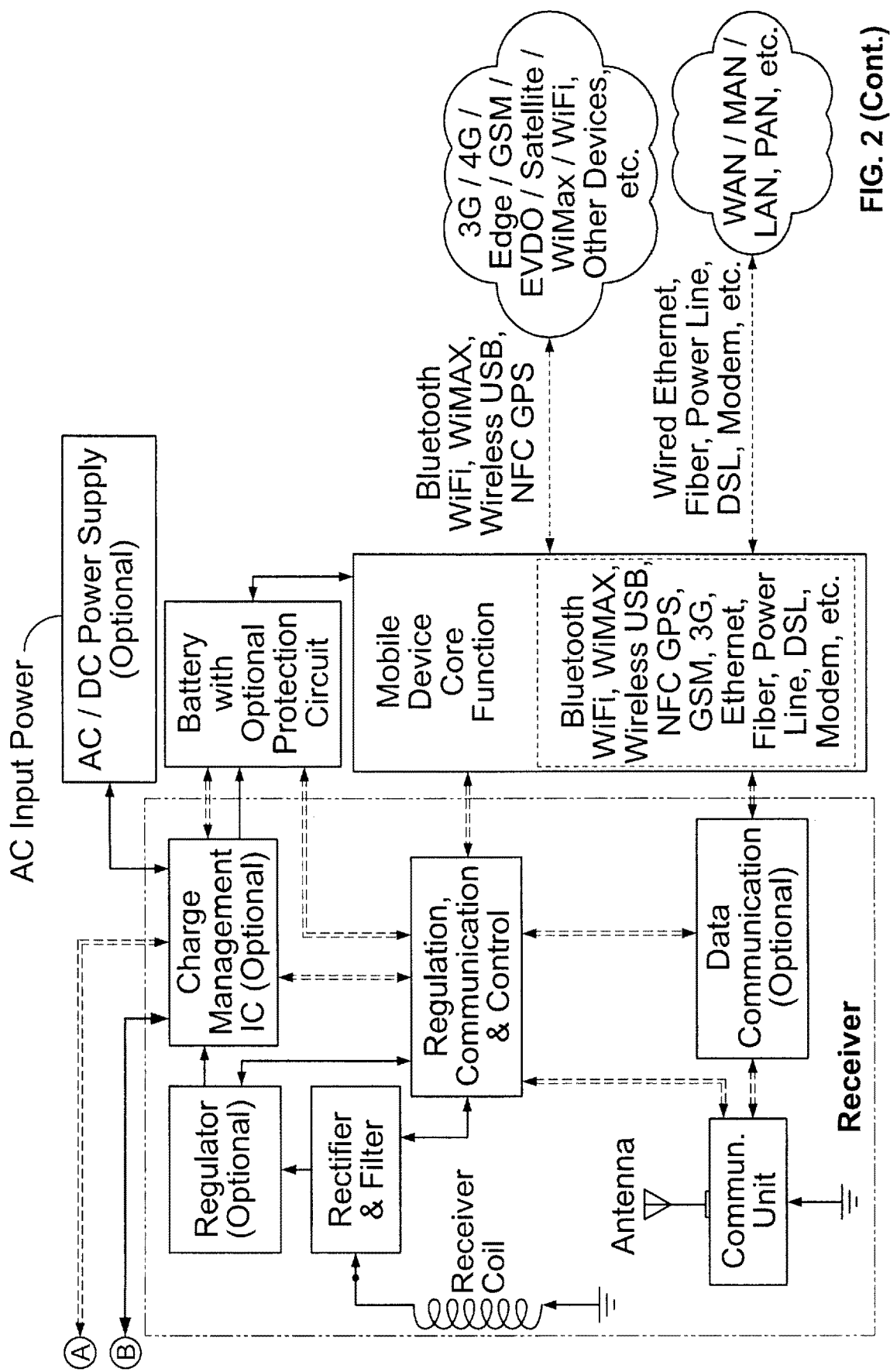

FIG. 2 shows a wired and/or wireless charger and/or power supply and receiver architecture 130 with a separate wireless connection for data and/or charger and/or power supply signal information. In accordance with another embodiment, it is also possible for this channel to be through another set of coils.

Figure 3:
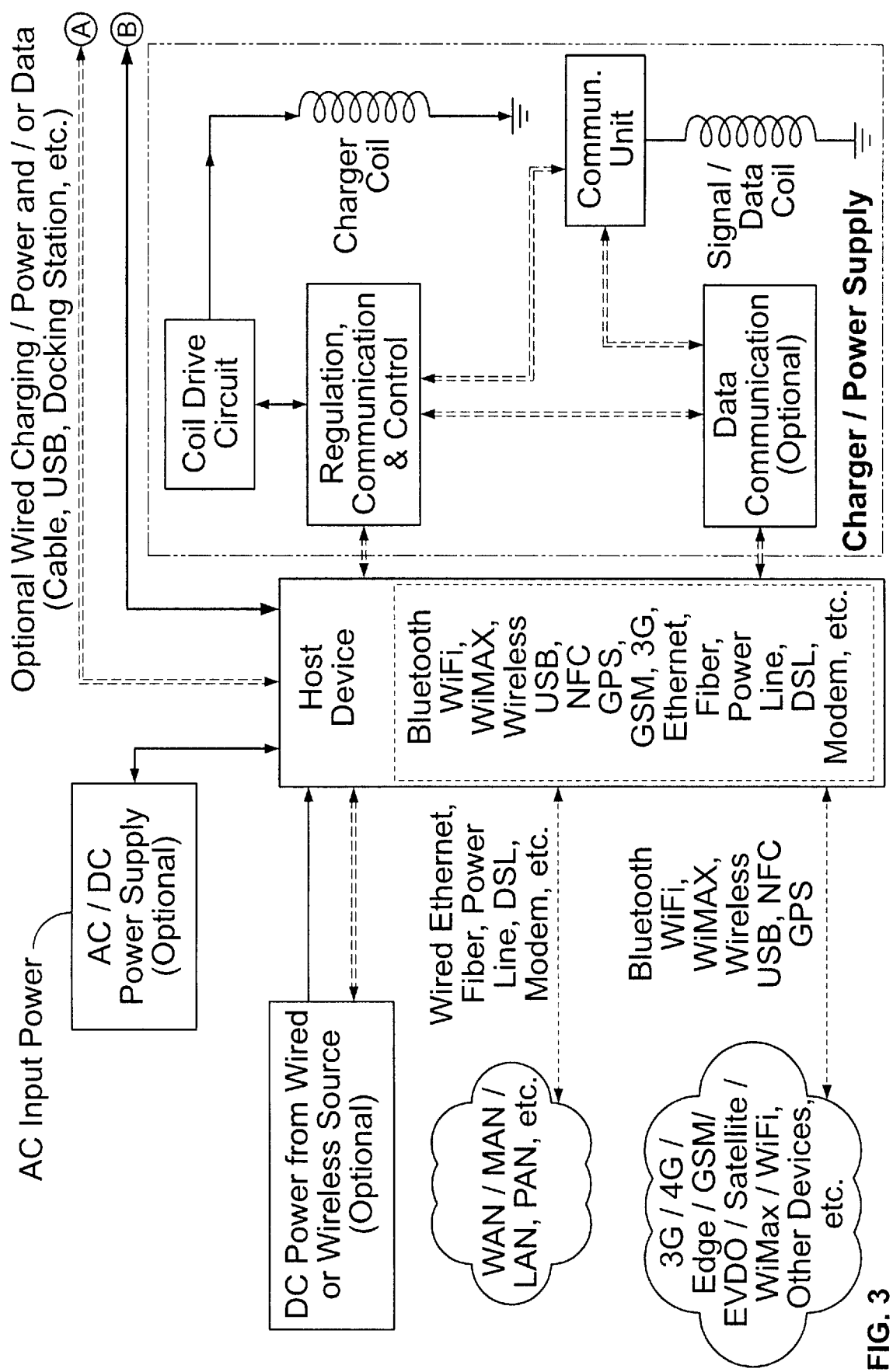
FIG. 3 shows an illustration of a circuit in accordance with an embodiment.
Figure 3:
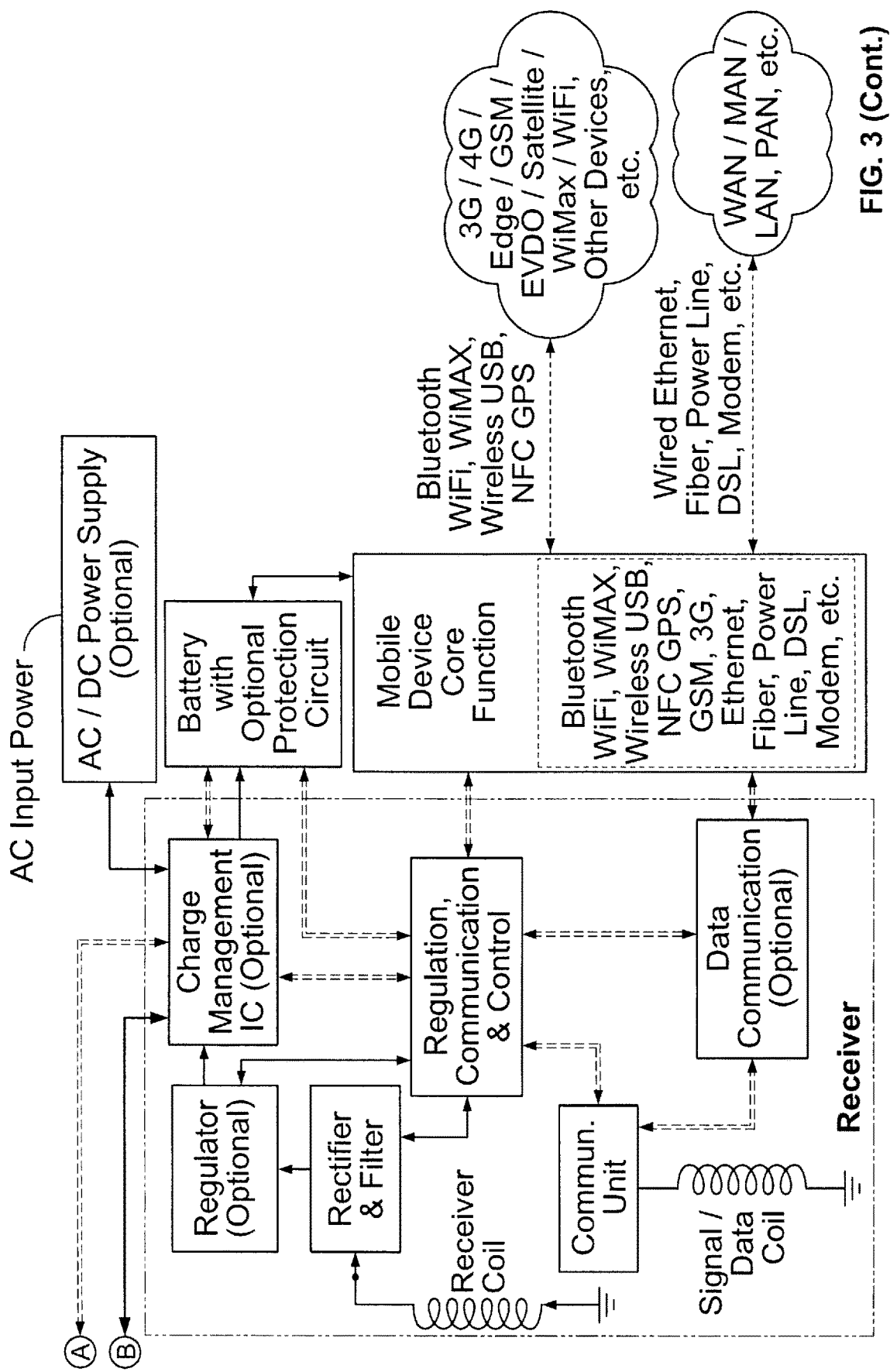

FIG. 3 shows a wired and/or wireless charger and/or power supply and receiver architecture 160 with a separate inductive connection for data and/or charger and/or power supply signal information in accordance with another embodiment. In FIG. 3, the CS and/or data is communicated through a second set of coils that may be separate from the power transfer set of coils. The two sets of coils can be physically separate or be wound wires or PCB coils that are manufactured to be flat or curved and be on the same plane or close to each other. The different coils for power and CS and/or data in FIG. 3 can be operated at different frequencies to avoid interference or be at the same frequency but physically separated to provide isolation.

Figure 4:
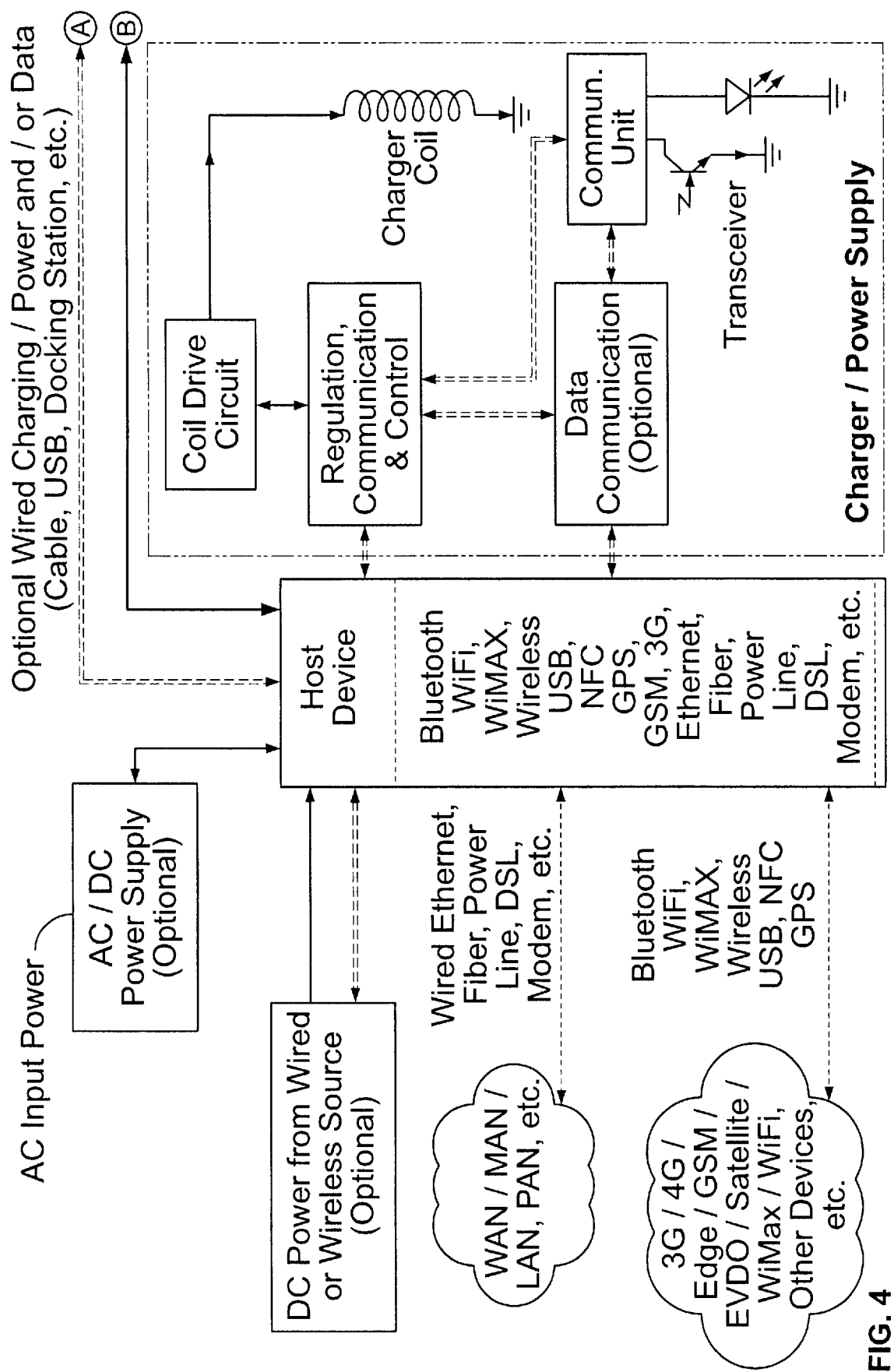
FIG. 4 shows an illustration of a circuit in accordance with an embodiment.
Figure 4:
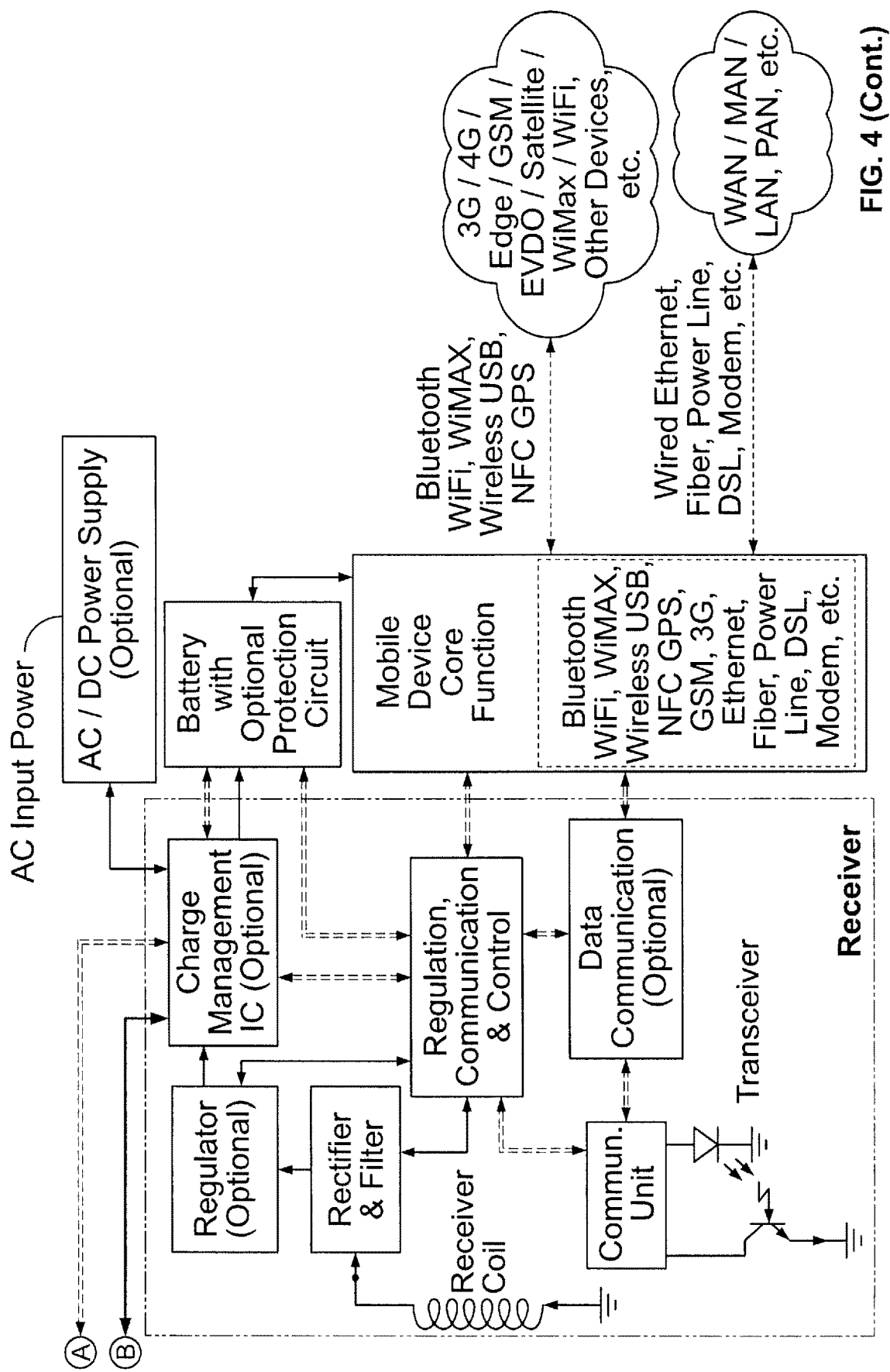

FIG. 4 shows a wired and/or wireless charger and/or power supply and receiver architecture 190 with a separate optical transceiver or opto-coupler for data and/or charger and/or power signal information in accordance with an embodiment. In FIG. 4, the CS and/or data is communicated through an optical transceiver or opto-coupler comprising an optical source such as LED or laser, etc. and detector. The transceivers can be physically separate from the coils or can occupy the same space for space saving and/or alignment. For example, they can be placed at the center of flat coils.

In accordance with an embodiment, the receiver shown in FIGS. 1-4 can be built into or on a mobile device such as a mobile phone, MP3 player, camera, GPS device, Bluetooth headset, laptop, speakers, video monitors, stereo systems, mobile storage device, etc. The receiver may be integrated into or on a device or battery or into or on a factory or after-market mobile device battery cover or outside sleeve or skin or carrier for the device and/or battery. In the case that the receiver can be integrated in or on a mobile device battery cover or a skin or case, sufficient electrical connections between the mobile device battery cover or back or a skin or a case and the mobile device for carrying power and any charging signal and/or data should be implemented. For example, in FIG. 1, the partition between the parts integrated into or on a mobile device battery cover or back or a skin or case and inside the mobile device can be along any of the lines shown.

Figure 5:
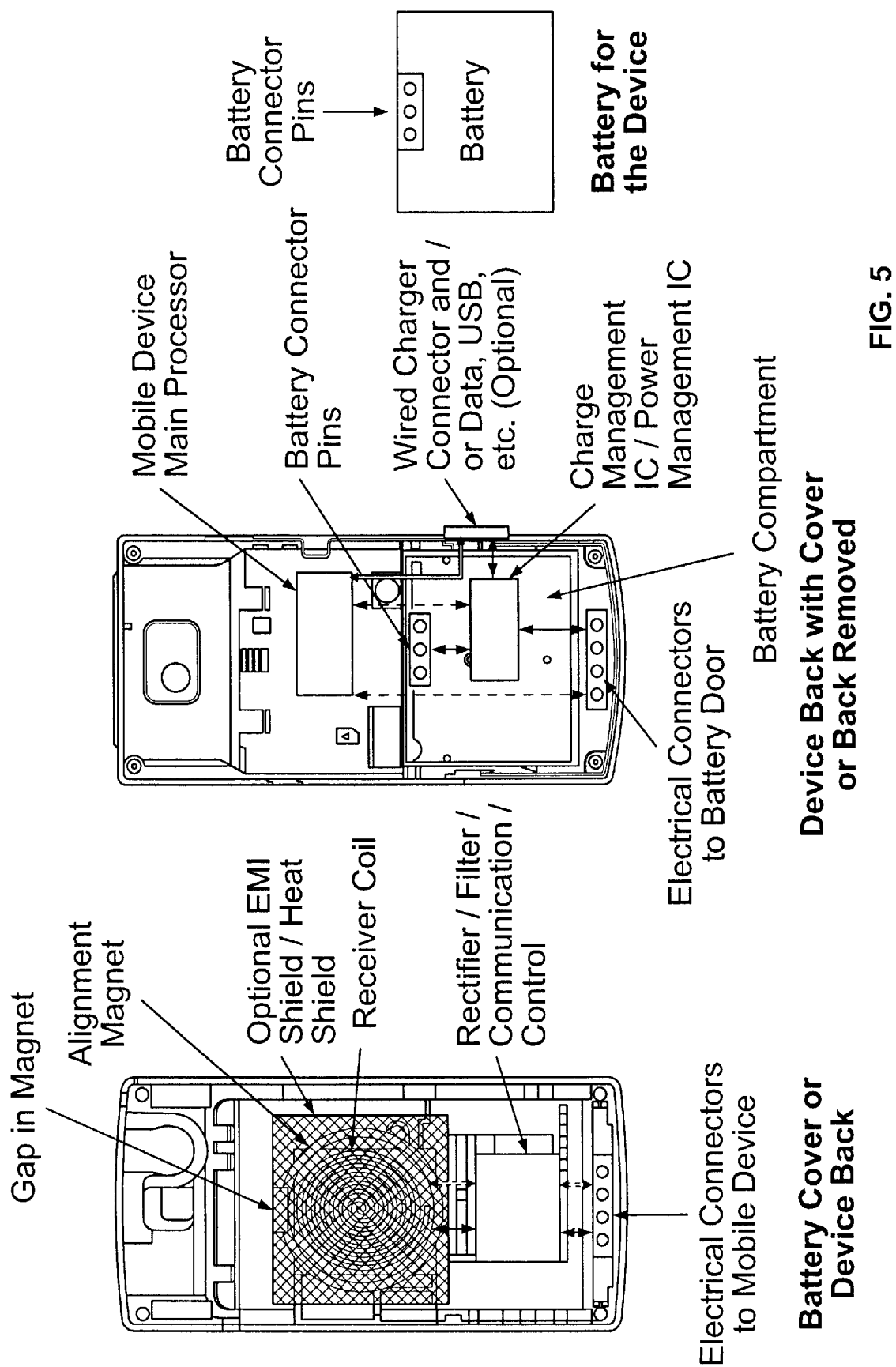
FIG. 5 shows an illustration of a wireless charger and/or power receiver integrated into a mobile device battery cover or back cover in accordance with an embodiment.

FIG. 5 shows a design 210 for integration of a wireless charger and/or power receiver into a mobile device battery cover or back cover in accordance with an embodiment. The battery can also be powered/charged by conventional wired connection from an AC/DC adaptor or USB or mini-USB connector, etc. The circuitry after the receiver coil shown in FIGS. 1-4 can be partitioned into a part on the back cover or mobile device battery cover and a section integrated into the mobile device and/or the battery. The two parts transfer power/signal/data with electrical connectors/pins in the mobile device back cover or battery cover and corresponding mating ones in the mobile device and/or battery. The mobile device in this case may also be charged/powered by a wired charger/USB cable connection. It may be desirable from a mechanical and size point of view to have the minimum amount of parts of the receiver on the mobile device battery cover or a skin or a case (such as only the receiver coil) and the rest of the circuit may reside inside the mobile device. On the other hand, for signal integrity purposes and for lower noise levels, it may be desirable to have many of the parts near the receiver coil and the resulting dc voltage and any other data lines to be connected to the mobile device. Thus the connection between the mobile device battery cover or back or a skin or a case and the rest of the mobile device and/or battery may comprise 1 or 2 to many connector pins that may carry power and/or charging signals and/or data including information about battery temperature, battery verification, etc. This is somewhat atypical of mobile device battery covers or covers or skins or cases for mobile devices currently used which are typically passive parts made of plastic, metal, or leather, etc., and have no electrical functionality.

In FIG. 5, in accordance with an embodiment, the receiver coil and/or receiver circuit section can also include additional electromagnetic shield layers such as absorbers and/or metal layers and/or ferrite layers and/or heat spreading/and/or heat shield layers to provide better performance and reliability.

In addition, to align the receiver coil with the charger and/or power supply coil, one or a number of magnets can be used. These magnets can be placed on or around the coil and mounted to be aligned and attract corresponding ones in the charger and/or power supply to align the coils laterally to allow maximum efficiency and power transfer. As an example, in FIG. 5, a ring magnet is shown on or around the receiver coil. This ring magnet can be magnetized perpendicular to the plane and can attract a corresponding and similar magnet in or around the charger and/or power supply coil to align the two parts. In FIG. 5, an optional gap or break in the ring is also shown. This gap can serve to limit or eliminate the eddy currents generated in the magnet due to the time varying magnetic field of the charger and/or power supply coil or receiver coil, and has been found experimentally to be quite effective in eliminating wasted power and heating of the magnet due to the eddy current effect. The ring magnet is shown as an example and other magnet geometries or other methods for alignment can be used for alignment of the coils. These may include straight magnets, arc magnets, square magnets, or one or more magnetic discs or other shapes attached to the receiver coil or mobile device battery cover or back of the device, skin, case, etc. and similarly incorporated in the charger and/or power supply. The magnets may be mounted such that they allow rotation of the receiver coil and thus the mobile device and/or battery with respect to the charger and/or power supply while maintaining charging capability. Use of the magnets is especially beneficial in cases where the charger and/or power supply is integrated or attached to a moving platform such as in a car where it is important to keep the mobile device stationary while the car is moving.

In order for a mobile device battery cover or back of a device to have the connectivity to the mobile device and/or battery required, the cover or back may use pins or connectors that can mate with corresponding ones in the mobile device or directly on to the battery of the mobile device. These pins may be of the type that connect when the two parts are slid against each other or make an electrical connection when pressed together or alike.

Inside the mobile device, the power and charging signal or data from the connector pins are carried to the rest of the charging/regulation/charge or power management circuit or IC and may also be connected to the main processor or other circuitry inside the mobile device to provide or receive data or other information. In the example geometry shown in FIG. 4, power from the power management IC (PMIC) inside the mobile device is applied to the battery connectors and used to charge the battery.

Figure 6:
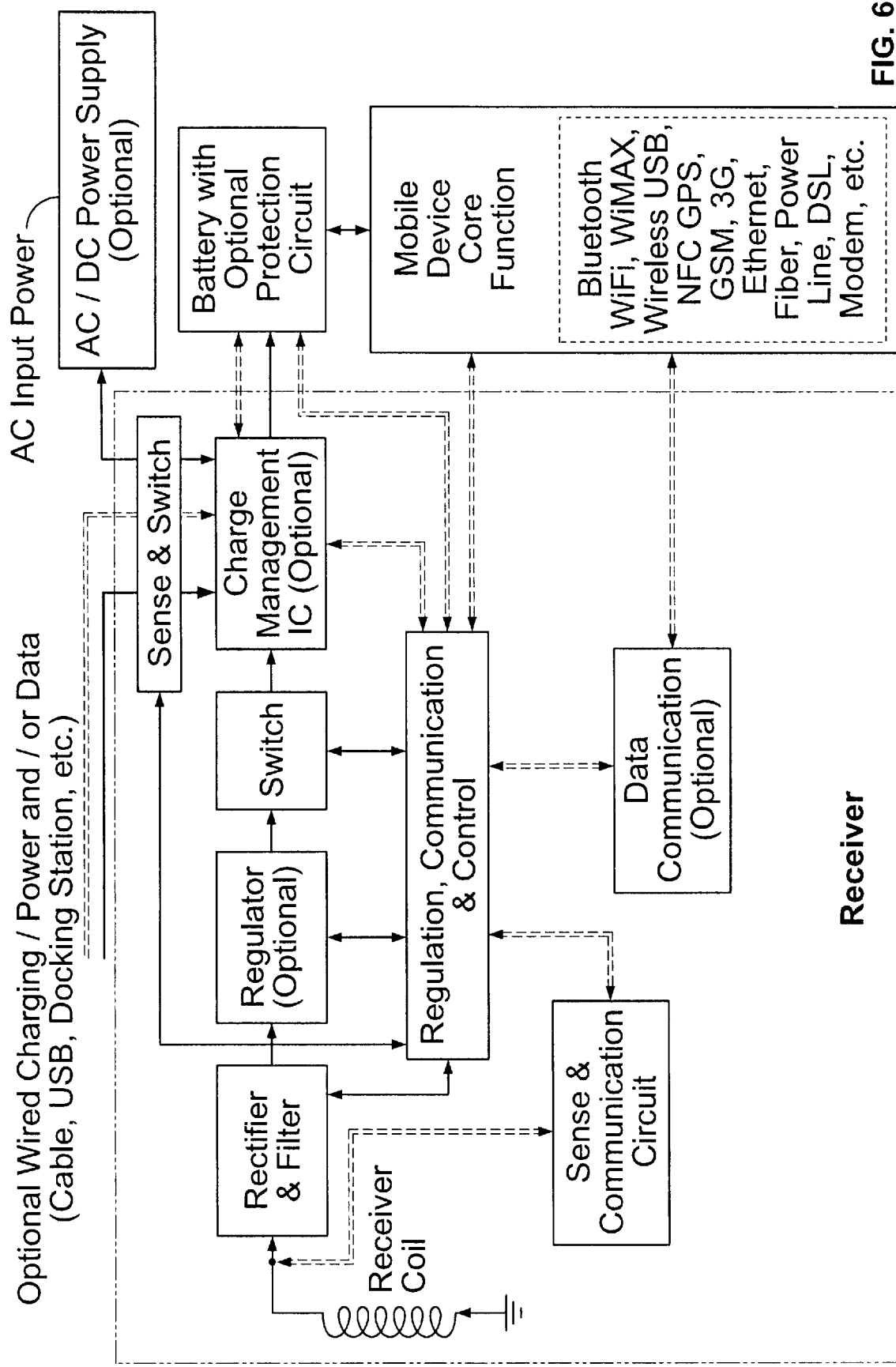
FIG. 6 shows an illustration of a receiver integrated into a mobile device and/or battery, in accordance with an embodiment.

FIG. 6 shows a receiver 230 integrated into a mobile device and/or battery which has the capability to be charged wirelessly or by traditional wired power from an AC/DC adaptor or power supply and/or USB, or another device or other means.

If the mobile device has both means of wireless and wired charging/powering of the mobile device and/or battery as shown in FIG. 1-6 above, the power from the wired connector may be connected to the same battery charger or PMIC in the mobile device and/or the battery and the PMIC or the mobile device or the regulation, or separate switching circuitry. The communication and control circuit may have an algorithm for deciding which one to over-ride if power is simultaneously available from wired and wireless sources. Switches in the path of power from either or both sources may cut off or reduce power from each power source. In addition, the receiver may provide signaling to the wired charger and/or power supply and/or wireless charger and/or power supply circuit to shut down so only one source of power to the mobile device and/or battery is operating and providing power. Similarly, this signaling path can provide additional signals to combine power or other functions if needed. Other methods for enabling or disabling charging from either source are possible and should be implemented to avoid any issues in simultaneous charging from two sources.

Additional connections can provide information on the validity and type of battery, Identification verification, its temperature, state of health, amount of charge or other information. These data can also be shown on the mobile device screen or activate an LED or audible signal or alike through the interface with the main processor in the mobile device or other circuitry.

As an example, in a mobile phone, the amount of charge of the battery and whether it is being charged wirelessly or in a wired manner may be indicated on the main phone display.

In the above example, the power from the receiver and any additional data and/or charging signals are carried through connectors between the battery cover/back cover and the mobile device. It is also possible to have the connector directly on the battery in the device and the receiver can connect to it in a similar way. The circuitry of the receiver necessary to charge the battery and/or perform any CS or data communication and any possible alignment magnets and heat or EMI shield layers can be partially placed on the back cover and partially on or in the battery as appropriate.

In accordance with an embodiment, when the mobile device or battery is placed on or close to the wireless charger and/or power supply, the charger and/or power supply and the mobile device or battery may exchange a code or verification and charging or transfer of power commences. The mobile device and/or battery can also check to see if simultaneously power is being received from the wired power connection and decide which one to accept or even to in some circumstances to accept power from both sources to charge faster. The charging process may then in turn activate other functions directly or through the main processor in the mobile device or the host or nearby devices or devices connected through the internet or other communication methods such as wireless 3G, GSM, WiMAX, etc. There may also be LEDs, indicators, etc. in the cover or back or case or skin or mobile device display screen or in the charger and/or power supply and/or host device where the charger and/or power supply is included or connected to (car, train, laptop computer, other mobile device storage device, kiosk, clothing, or briefcase, purse, etc.) or audible signals to provide further information to the user.

In accordance with an embodiment, the data or CS exchanged between various devices can: Show start of charging and/or end of charge; Show battery temperature; Show state and level of battery charge indicator; Communicate data to and from mobile device; Communicate device presence to charger and/or power supply (or device that the charger and/or power supply is built into or connected to such as laptop) or nearby devices or devices connected by internet or other communication methods; Communicate type of charger and/or power supply/environment (wired/or wireless charging and/or power) and from what device (being charged and/or powered from laptop, car, etc.); Communicate device battery status/state of charge, etc. to charger and/or power supply or device charger and/or power supply is built into or connected to such as laptop or nearby devices or devices connected by internet or other communication methods; Charge and/or power mobile device wirelessly at a different rate or speed depending on the charging platform and location/type; Perform synchronization or download or upload of data. Synchronization or upload or download can include calendar, contacts, to do lists, new downloaded programs, pictures, movies, music, other data, files, date, time, etc.; Show a list of movies/video/music/pictures that are available on the device. etc. on host device or nearby devices or devices over the internet or WAN connection; Verify a mobile device user identity or credit card, ATM, or other financial information; Charge or bill user for services such as charging or powering and/or other services such as use of internet, phone or video calls or download or upload of data, movies, music, ringtones, pictures, or computer or mobile applications or services or online purchases, etc.; Show battery charge/status on mobile device or host a nearby devices or devices connected by internet or other communication methods; Show amount of memory used or free on mobile device on host or nearby devices or devices connected by internet or other communication methods; Show any tasks to be accomplished or emails received or calendar items that the device has received on a host or nearby devices or connected by internet or other communication methods; Connect the mobile device and host so the memory in either one is seen as a directory on the other one and is accessible; Enable access to the files and directory of the mobile device over the internet or by nearby devices; Duplicate the mobile device screen on the host, a nearby device, or laptop or nearby devices or devices connected by internet or other communication methods; Use the broadband or other connection of host or a nearby device to provide communication for the mobile device or vice versa; Use Power Line communication from host and/or mobile device to provide communication for to each other or to other nearby devices or other devices or servers over the internet, etc.; Use the mobile device as a remote controller for the charger and/or power supply or the host or a nearby device or devices connected by internet or other communication method; Use the charger and/or power supply host or a nearby device or devices connected by internet or other communication methods as a remote controller or interface for the mobile device being charged or powered; Use the mobile device to change temperature, lighting, shades, etc. in a home, office, or car environment; and/or any combination of the above.

In addition, the charging of the mobile device can activate a number of functions in the mobile device and or the host or charger and/or power supply or nearby devices or devices connected by internet or other communication method. For example, assume a mobile smart phone/MP3 player/camera such as an iPhone or a Blackberry phone is being charged on a wireless and/or wired charger and/or power supply. Recognizing that the mobile device is being charged, the device can, for example: Indicate the wireless or wired charging on its screen; Activate Bluetooth transmitter so that calls coming in can be connected to a Bluetooth headset without picking up the phone from the charger and/or power supply; Activate the speaker phone when calls come in; Rotate the images on the phone according to how the phone is placed on the Charger and/or power supply to allow easy viewing; and/or Activate WiFi, Bluetooth, Wireless USB or WiMAX connectivity to connect wirelessly to a nearby computer, data gateway, kiosk, or laptop to transfer or sync data/images/video/music/files/calendars/phone book, etc.

Exchanging a code and/or data between the charger and/or power supply and the mobile device, the two parts can recognize each other and take actions that may be pre-programmed by the manufacturer or programmable by the user or can depend on other factors such as day/time/location of charging/priority list, etc. This "Contextually Aware" charging may have many uses and can reconfigure the mobile device or the host (laptop, car, kiosk, other mobile device, etc.) or nearby devices to act differently depending on ID received from charger and/or power supply and/or mobile device.

For example, a mobile device can be programmed to recognize a charger and/or power supply at home or office and act differently in each situation and configure itself to connect to a variety of devices at home or office through appropriate wireless or wired connections such as Bluetooth, WiFi, WiMAX, Wireless USB, etc. depending on the preferred characteristics and options for the charger and/or power supply and even connect with the home or office's computer or stereo or video entertainment systems to: Log on and authenticate user in the office or home environment when entering into each area and charging on the appropriate charger and/or power supply commences; Automatically log on to the appropriate WiFi/Wireless USB network; Connect and play music through home or office stereo or nearby speakers; Play movies, etc. through home video system; Synch with computer/download/upload content/music/video, etc.; Act as a wireless modem for connectivity of computers or cell phones nearby; Become the wireless modem for a home Voice Over IP (VoIP) system; Place the phone on mute in case of a call or ring louder or use a different ring tone, etc.; Transfer all incoming calls to the home or office (depending on location) landline or VoIP phone automatically; Connect phone with wired broadband Home WiFi system so calls or Data received or sent go through the wired WiFi system and the wired Broadband network. This may provide more clear calls or save on calling charges or provide faster download or upload of Data and files; Initiate or activate incoming or outgoing Video calls through the mobile phone connection (GSM, 3G, WiMAX, etc.) using external home or computer screen or TV and external speakers and microphone; Route incoming or outgoing Video calls through the home or office WiFi/WiMAX and or fixed DSL, Fiber or other communication system; Duplicate the phone's screen or functions on a home computer so it can be controlled from another location. Users may be able to access music or pictures and play/stop/shuffle from a nearby computer or other mobile device or make outgoing calls or control other functions. The functions available may also depend on the mobile device being charged and the range of functions/software interface may change based on the device. For example, with a smartphone with many available functions, the interface can have many available options while for a simple phone, these can be more limited; Activate a Bluetooth headset or external or internal speaker and microphone if a call comes in; and/or Use the charger and/or power supply host or a device nearby or laptop to dial the phone number on the mobile phone.

Similarly, in a car environment, identification of the mobile device on a charger and/or power supply in a car can: Activate the mobile device to connect to car Bluetooth system automatically so incoming calls are connected to speakerphone or car speakers and a microphone if call comes in or initiated by user to allow hands free driving; Connect the mobile device to car entertainment system wirelessly to: Play music or movies in car; Play different films for different people in car; Play different music to different Bluetooth headsets; Allow watching TV, podcasts, etc. received through the mobile device; Route video calls to in car video system; Have the mobile device synchronize and download or upload music or other information to storage device in car for entertainment or diagnostics; Enable mobile device to notify emergency crew in case of accident or emergency; Start GPS view or program on the mobile device, etc.; and/or Allow the phone to be the broadband modem that can then connect to other mobile devices within car with Bluetooth or WiFi, wireless USB, etc. and authenticate with these devices.

Also, the mobile device presence and wired or wireless charging can trigger a series of reconfigurations in the car, such as: Set the temperature to pre-programmed mobile user desired level; Set the car seat to the right position for the mobile device user; Adjust mirrors to the right position for mobile device user; Turn on the radio/stereo to specific favorite station/music; Change driving conditions of car (performance/speed vs. comfort, etc.); Can automatically switch the control for various features on phone to controls available in car or on steering wheel or a remote controller to: Dial phone numbers, Turn volume up/down on voice or video calls or music or video/TV, Switch music/movie, Fast forward/back/stop, pause, playback, etc.; and/or if charger and/or power supply is at an angle or different locations, through either recognition between device and charger and/or power supply/or through accelerometer, change device display orientation/function.

In other settings, the authentication can trigger other pre-programmed functions. For example in public chargers and/or power supplies, the verification of the presence of mobile device on a charger and/or power supply can trigger connection to public WiFi or WiMAX systems or on a public charging kiosks, can authenticate the user and allow download or upload of movies, pictures, music, etc. and even provide method for billing and charging of the customer for services used.

One will note that many of the functions above (watching TV using the mobile device as a receiver, GPS, etc.) and connectivity through WiFi, etc. are quite power hungry and without the simultaneous charging or powering of the mobile device occurring, cannot be sustained for a long period. As another example, downloading or uploading pictures or videos from a camera or mobile phone, etc. may take a very long time and drain the battery without simultaneous charging or powering of the mobile device/camera occurring.

In addition, in accordance with various embodiments the charger and/or power supply and the mobile device may have the following characteristics: Charger and/or power supply pad or stand has one or more magnets to align with similar magnets in or around the receiver to align the coils and to keep the device in place; Charger and/or power supply or stand that is tilted so the user can view the device screen better when device is placed on the charger and/or power supply pad or stand; The charger and/or power supply or pad that has a nonslip surface to allow better grip of mobile device when it is placed on the pad or stand; and/or the charger and/or power supply pad or stand that has an adhesive, magnetic, nonslip, or surface with suction cup on the back so it can be attached at an angle, vertically, or horizontally on a surface.

Improvements in Thermal Performance and Efficiency

In accordance with some embodiments described herein, features can be provided that overcome several shortcomings of previous approaches, including methods by which the wireless power devices and chargers or power supplies can provide better thermal performance, better detection of external objects, and better power transfer efficiencies, and can enable operation at greater distance between charger and receiver coils.

While most of the description below is based on the inductive method, the embodiments described here can be implemented with either the inductive method or the magnetic resonance method for power transfer some of which have been described above. Inductive methods of power transfer are described below as an example of the more general wireless power transfer.

There are several issues that are important in design of a practical wireless charging system. The charger and receiver for the wireless charger system include wound wire coils, PCB or flexible PCB coils, or stamped or etched free-standing coils or deposited on a substrate. The coils create and detect the AC magnetic field that is used for power transfer and communication.

As described in "Coreless Printed Circuit Board (PCB) Transformers—Fundamental Characteristics and Application Potential", Ron Hui, S. C. Tang, H. Chung, Vol. 11, P. 3, 2000), a magnetic flux pattern can be generated when, e.g. a 1 cm diameter coil is excited at 8 MHz. When viewed in the horizontal cross section or plane of the coil, the pattern shows the high concentration of the magnetic flux at the center decreasing to towards the edge. The resistive heating of the coil due to current and the high amount of the flux at the center and any associated generated eddy currents create a hot spot at the center.

Experimentally, the inventors have found that for a 10 turn 4 Oz. Copper PCB coil on a 0.2 mm FR4 PCB backing with 32 mm outside coil diameter and Inside diameter of 1 mm, operating with 0.5 mm spacing between the Charger and Receiver coils and 2.5 W output power at 5 V (0.5 A). Without any thermal management, the center of the coil can be 20 degrees over room temperature due to resistive heating of the coil. The situation is exacerbated by the fact that this center will be a hot spot where heat is generated within a small surface area and cannot dissipate laterally or vertically due to low thermal conductivity FR4 substrate.

While the increase in temperature is not too high for many applications, it is desirable to improve this especially for the receiver that is placed inside or on a mobile device or battery. The lifetime and reliability of a battery depends on its operating temperature and lower operating temperatures are highly preferred.

U.S. Patent Publication No. 20090096413, which is incorporated herein by reference, describes use of several methods for reducing this temperature rise. Two methods described therein involve use of a thermal conductive layer attached or incorporated near the receiver and/or charger coils to rapidly spread or dissipate any generated heat. An example of such a material can be high heat conductivity ceramic material. In addition, we have described the use of metal layers around the coil that will further rapidly conduct any heat away from the coil and spread over a larger surface area to dissipate through convection or heat sinking in other ways. These methods can of course be combined to further reduce any effect.

Experimentally, the inventors have found that attachment of a 0.25 or 0.5 mm thick ceramic layer to the charger and receiver coil in the configuration above reduced the maximum temperature rise at the center of the coil to 6 to 14° C. depending on whether there was additional air gap between the coils and the power transferred. Addition of high conductivity layers to the coils, however, can increase their thickness and also increase the manufacturing complexity of the parts which is not desirable especially inside mobile devices or batteries. In an embodiment, two other methods are provided for reducing this temperature increase without increasing the thickness and cost or complexity of the parts.

Another aspect of an embodiment of the invention herein deals with foreign object detection. If a metal object such as a coin is placed on the charger coil, the charger can begin to heat the object to very high degrees that can cause burn for the user or failure of the device.

The inductive coils can carry one or more amps. For example. U.S. Patent Publication No. 20080164839 describes the thermal performance of coils with foreign objects on the surface of the charger. In this example, it was found that with wire wound helical coils and a metal object such as a coin placed on the charger, the surface temperature of the charger coil can reach 150.degree. C. and higher at the center within 90 seconds. Different locations on the coil experience different temperature increases. In this example, temperature detection sensors were placed behind the charger coil and monitored this temperature to detect foreign objects and to ensure that unsafe temperatures were not reached. 75.degree. C. was chosen as the threshold and used to cut off power to the charger coil. While this strategy is practical, it is best to avoid any power being delivered to the foreign object altogether.

As disclosed herein, a method is described so that, in accordance with some embodiments, power would not be delivered in such circumstances. Another feature of some embodiments are methods for achieving higher power transfer efficiencies and distances between the coils.

Recently, by using a higher Quality Factor (Q) resonance circuit, the distance between a wireless charger and receiver has been increased, as described, for example, in U.S. Patent Publication Nos. 20090015075 and 20090033564, and in "Efficient wireless non-radiative mid-range energy transfer" Aristeidis Karalis, John D. Joannopoulos, and Marin Soljacic. Annals of Physics Vol. 323, p. 34, (2008). In general, larger distances are achieved at the expense of efficiency. The above references describe a geometry for a magnetic resonance system where a charger coil loop is used to excite a high Q coil and capacitor resonant antenna that get excited by the charger coil loop and emit RF power in resonance with a receiver resonant antenna that couples power to a Receiver coil loop and to a load. This geometry allows larger coil to coil distance for operation.

However, some of the drawbacks of the geometry are that: a) The voltage in the LC resonant antenna can reach over 1000 V according to the inventors. This is a high voltage and requires large components that are especially not desirable in the receiver; b) The system has relatively low efficiencies of 30% or lower or even 10%; c) Since the distance between the coils can be several cm and possibility of human exposure to the field exists, the maximum magnetic field for such a device in use is limited by regulatory limits on safe exposure limits; d) Due to the larger travel distance of the fields in this geometry, the magnetic fields extend beyond the receiver when integrated into a mobile device or battery and can affect the performance of the mobile device or battery. In addition, any metal layer or wires in this area can affect the operation. Ideally, one would prefer the fields not to extend beyond the receiver coil.

As disclosed herein, in accordance with an embodiment, methods are provided for using resonance to achieve larger operating distance between the coils while overcoming some of the issues with geometry described above.

Figure 7:
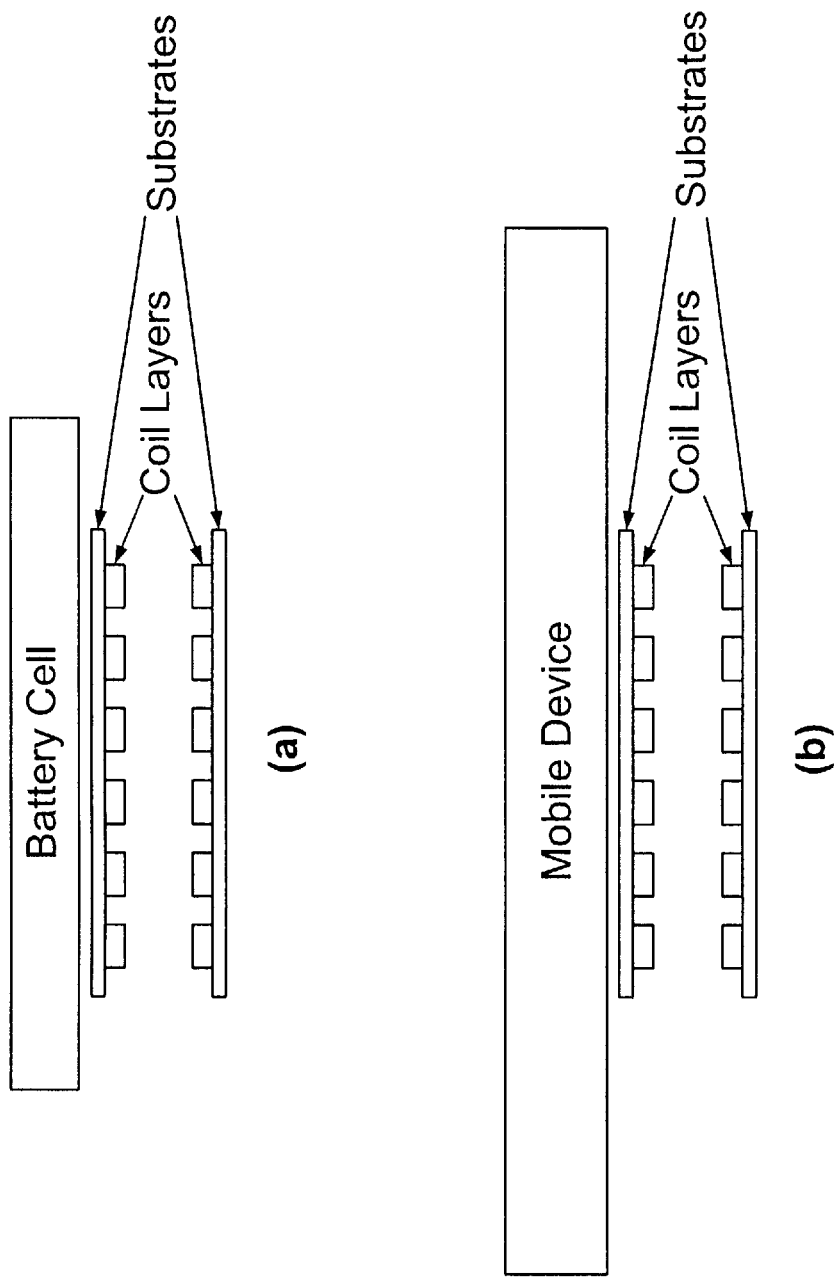
FIG. 7 shows an illustration of an inductive charging system where the receiver coil (top coil and its substrate) is integrated into or on a rechargeable battery, or into or on a mobile, electronic, or electric device, in accordance with an embodiment.

FIG. 7 shows an inductive charging system 250 where the receiver coil (top coil and its substrate) is integrated into or on a rechargeable battery (FIG. 7*a*) or into or on a mobile, electronic, or electric device (FIG. 7*b*). In these configurations, the coil can be a wound wire coil or a Printed Circuit Board (PCB) coil.

In the configurations shown in FIG. 7, the magnetic field generated by the bottom charger coil may extend beyond the coil on the top and interfere with the operation and performance of the battery or the device. In addition, any metal layer in the packaging of the battery cell or in the mobile device may affect the field pattern and magnitude. The time varying magnetic field can also set up eddy currents in metal layers or wires and can cause excessive voltages or heat generation. In addition, the coils may generate heat during transfer of power due to the current in the windings and the heat may have undesirable effects on the battery or the device electronics. As disclosed herein, methods are described to improve the power transfer efficiency, effect of metal layers nearby, and thermal and Electromagnetic Interference issues related to design of Inductive and resonant magnetic wireless chargers.

FIG. 8 shows a helical coil 260 and a representative shape for the generated magnetic flux by this coil. The temperature distribution would similarly have a peak at the center. This is caused by the higher Flux at this point as well as the geometric situation where a high heat build up at the center would be radiating outward to spread in the plane of the coil and would create a hot spot at the center. To address the issue of thermal heat build-up at the center of the coils, two methods are discussed here. In the first method, the coil is designed so that it does not terminate at the center of the circle. FIG. 8 shows a helical coil pattern where a peak at the center of the coil for magnetic flux exists. The resulting temperature distribution will similarly have a peak at the center due to this high flux and also due to the symmetry of the geometry and high heat generation at this center which will be spreading in 2 dimensions in the plane. The coil is designed to terminate before reaching the center so the coil has an annular shape and the magnetic flux (center) does not have a maximum at the center. The flux does not create a hot spot. Therefore, the resulting temperature profile (right) is lower at the center and lower overall.

In accordance with an embodiment 270, the coil is designed to have an annular shape with no winding in the middle so that the magnetic flux is more flat or even lower at the central portion (see FIG. 9). The central area also has very small length of wire and therefore contributes little to the inductance of the overall coil. With an annular shape coil, large amounts of heat are not generated at the center and the center does not become a peak temperature area. This design results in a lower overall temperature for the coil area and a more distributed temperature profile at the center (see the right figure in FIG. 9).

The inductance of a helical coil pattern is well approximated by:

$$L = r^2 N^2 / ((2r + 2.8d) \times 10^5)$$

where r is the mean radius of the coil in meters. For an evenly distributed helical coil, this is equivalent to (outer radius+inner radius)/2. d is the inner radius of the coil. d is the depth of coil in meters which is equivalent to the outer radius minus the inner radius. N is the number of turns.

Therefore, for an example, for a 10-turn coil starting at the center and ending in radius of 16 mm, the calculated inductance is 1 microhenry which is similar to measured values.

To design for the same inductance and outer radius, it can be shown that 7 turns with the inside loop starting at radius of 5 mm would provide a similar inductance.

Due to more uniform Flux profile and lower and smoother temperature profile, such an annular shaped coil would be preferable in practice.

Therefore, in accordance with an embodiment it is preferred to use inductive coils that have annular shapes with the center area without any winding in the center area to reduce the heat generation there.

The inventors have earlier shown methods such as use of metal layers around the coil to further remove heat from the coil.

Figure 10:
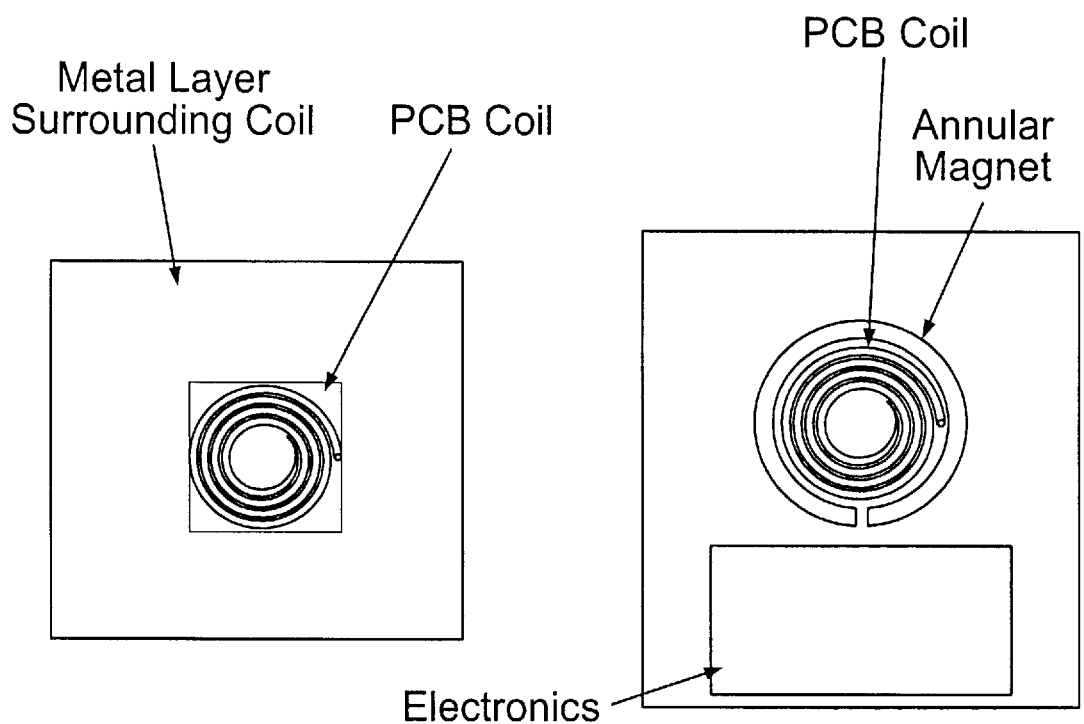
FIG. 10 shows an illustration of the integration of the wire wound or PCB or stand-alone coil on a metal layer surrounding the coil, in accordance with an embodiment.

FIG. 10 shows the integration 290 of the wire wound or PCB or stand-alone coil on a metal layer surrounding the coil to remove any heat further. The metal layer can be a layer on a PCB and if the coil is also a PCB coil, the two parts can be made on the same PCB either on the same layer or different layers to make the manufacturing simple. In addition, alignment magnets to pull the charger and receiver coil into alignment can be used. In the right figure in FIG. 10, integration of electronics and an annular alignment magnet is shown on the same PCB board to allow further simple integration.

In the configurations shown in FIG. 10, the magnetic field from the coil may set up unwanted eddy currents in the surrounding metal layer and shown annular magnet. To overcome these effects, the annular magnet may be cut or be discontinuous in one or more places as shown in FIG. 8 on the right to prevent the carriers to circulate around the ring due to the magnetic field and create unwanted loss and heating.

Similarly, the metal layer can be cut at one or several places to avoid the possibility of creation of circulating currents in the metal surrounding the coil. This is shown 300 in FIG. 11. Experimentally, it is found that placing some cuts in this layer and any alignment magnet such as the annular one shown prevents undesirable eddy currents and associated heating of the metal layer.

However, it is still important to distribute the heat generated in the coil laterally efficiently to avoid local hot spot formation and heating at the coil. In accordance with an embodiment a method for efficient heat distribution from the coil is provided, without the undesirable effects of eddy currents.

FIG. 12 shows an embodiment 320 wherein a metal or other thermally conductive layer is used for heat removal from the coil. In this configuration, the metal layer that is under the coil layer has a pattern that has diametrical cuts that prevent circular movement of carriers and therefore reduce eddy currents. Other patterns can also be used. In this case, for PCB coils, the coil pattern and the metal pattern can be on different layers with a thin layer of PCB material such as FR4, Polyimide, or other dielectric in between to create electrical isolation. Ideally, the layers would be separated with a dielectric material that has high thermal conductivity and low electrical conductivity. The heat that is pulled away and distributed from the coil can be further distributed laterally by other metal layers such as in FIG. 8 around the coil or by combining this with dielectric or ceramic layer, etc. or other heat sinking methods.

FIG. 13 illustrates the use of heat distribution away from the coil with a metal layer below the coil 330. The left figure shows an annular coil layer, the center figure shows the heat distribution metal layer. On the right, the metal layer on the coil layer is shown. The 2 layers typically would have a thin electrically non-conductive layer in between. This can be easily created in PCB production by having the coil layer and the metal layer in different layers of a PCB. To avoid eddy current generation, the metal layer is discontinuous so carriers cannot complete a circular motion round the center of the coil. In this example, diametrical cuts in the metal layer prevent the circular motion of carriers while the metal layer effectively distributes heat away from the center to the edges where it can be dissipated by convection or conduction or other methods.

In the other embodiments as shown in FIG. 13, the annular coil pattern can be combined with the discontinuous metal layer to further reduce any thermal effects.

Figure 14:
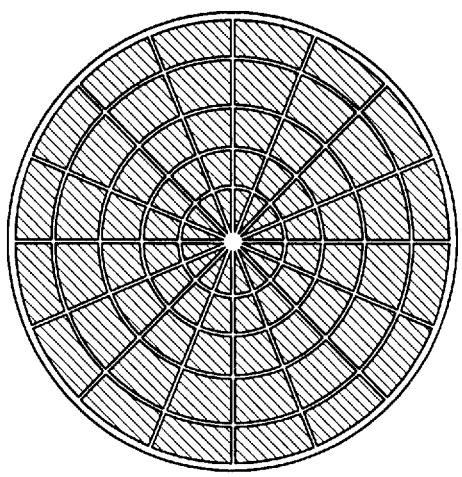
FIG. 14 shows an illustration of an embodiment which uses use heat distribution away from the coil with a metal layer below the coil.

FIG. 14 illustrates the use heat distribution away from the coil with a metal layer below the coil 340. The figure shows the heat distribution metal layer. To avoid eddy current generation, the metal layer is discontinuous so carriers cannot complete a circular motion round the center of the coil. In this example, diametrical cuts in the metal layer prevent the circular motion of carriers. Additional circular cuts further reduce the area that could potentially create eddy currents. The metal layer effectively distributes heat away from the center to the edges where it can be dissipated by convection or conduction or other methods.

In FIG. 14, another embodiment is shown where further circular cuts in the metal layer reduce any possible eddy currents further compared to geometries in FIGS. 12 and 13.

In any of these geometries, the heat would have to cross the area between the metal layers that is discontinuous. This transmission could occur through the substrate material such as PCB that the metal layer is attached to, a ceramic layer or other layer that may be electrically nonconductive.

Figure 15:
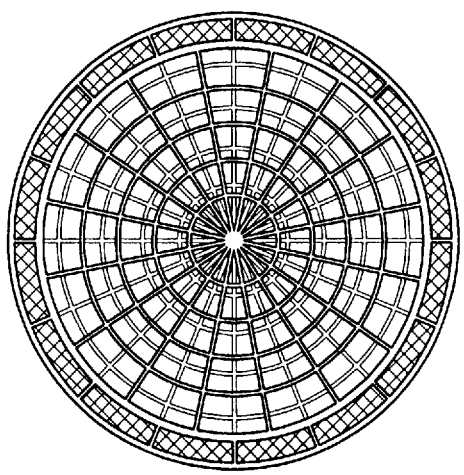
FIG. 15 illustrates the use of heat distribution away from the coil with a metal layer below the coil, in accordance with an embodiment.

FIG. 15 illustrates the use of heat distribution away from the coil with a metal layer below the coil 350. The figure shows the heat distribution metal layer. To avoid eddy current generation, the metal layer is discontinuous so carriers cannot complete a circular motion round the center of the coil. In this example, diametrical cuts in the metal layer prevent the circular motion of carriers. Additional circular cuts further reduce the area that could potentially create eddy currents. To bridge the thermally resistive gap in the metal layer that would affect effective heat transmission, a second metal layer that is electrically separated from the first heat transmission layer can also be incorporated. This layer can have metal layers that cover the gaps in the first metal layer so it can bridge the thermal gap effectively. If the thickness of dielectric layer between the metal layers is thinner than the gap in the pattern in the metal layer, this technique could be quite effective in bridging the thermal gap. The metal layers effectively distribute heat away from the center to the edges where it can be dissipated by convection or conduction or other methods.

For the thermal dissipation layers shown here, the minimum gap between sections are given by the limits of the PCB process used. It may be important to electrically isolate the sections to avoid eddy current generation. However, this gap in the metal layer also causes a thermal barrier to effective heat transmission. One method to improve this is to bridge the thermally resistive gaps with another metal layer that is fabricated on another layer and electrically isolated from the first thermal distribution layer. An example is shown in FIG. 12 where the other layer separated by a thin dielectric such as used in PCB manufacture bridges the gaps in the first metal layer to improve thermal distribution.

The patterns and embodiments shown above are shown as examples and in practice, a combination of the above methods or other geometries are used to achieve the goals discussed. The heat distribution layers shown are also examples and other patterns that can pull the heat away from the coil without affecting or minimally affecting the performance of the charger can be used.

An additional benefit of the methods described here is that the magnetic field generated by the coil will not extend beyond the metal layer and will therefore not affect any electronics or other metals beyond this. This can be important in the design of the charger and the integration of the receiver into a battery, mobile device, or its skin, carrier, battery compartment cover, etc. This technique also reduces extraneous EMI generation.

Figure 16:
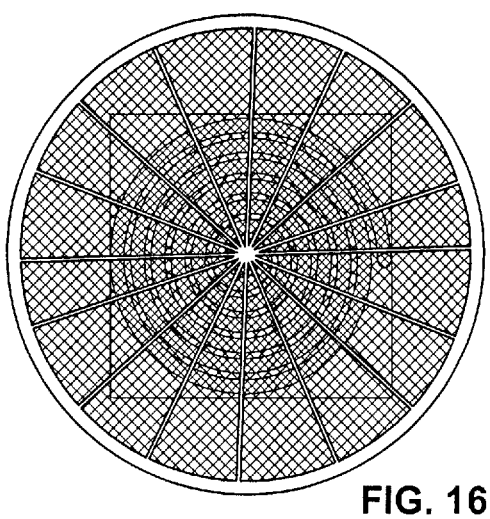
FIG. 16 illustrates the use of heat distribution away from the coil with a metal layer below the coil, in accordance with an embodiment.

FIG. 16 illustrates the use of heat distribution away from the coil with a metal layer below the coil 360. The figure shows the heat distribution metal layer as slices in a circle pattern. The helical coil for inductive power transfer is also shown. To avoid eddy current generation, the metal layer is discontinuous so carriers cannot complete a circular motion round the center of the coil. In this example, diametrical cuts in the metal layer prevent the circular motion of carriers. The metal layer is extended beyond the coil to provide removal of heat further from the heat generating coil.

FIG. 16 shows that the metal layer in heat removal can be extended beyond the inductive coil pattern so the heat is pulled away from this center and then can be dissipated away through conduction or convection in contact with other thermally conductive layers. These could include ceramic, polymer, plastic, or even metal layers if attached to the metal layer appropriately to reduce any eddy current effects or can simply be through convection of air in contact with the large surface area of the metal.

The extended metallic layer patterns shown in FIGS. 12-16 can be applied to any coil geometry shown above and combined with other ideas and geometries presented here to further reduce any heating or EMI effects.

A method for reducing the EM fields behind the coil to minimize interference with an electronic device operation or any metal layers in a mobile device or a battery is to use a magnetic material in between a coil such as a receiver coil and any metal directly behind the coil. Use of such materials is common with Near Field Communication (NFC) or Felice receivers in mobile devices. An example is FSF-200 material sold by Maruwa Corporation which is designed to have a high permeability with both a real and imaginary part.

Figure 17:
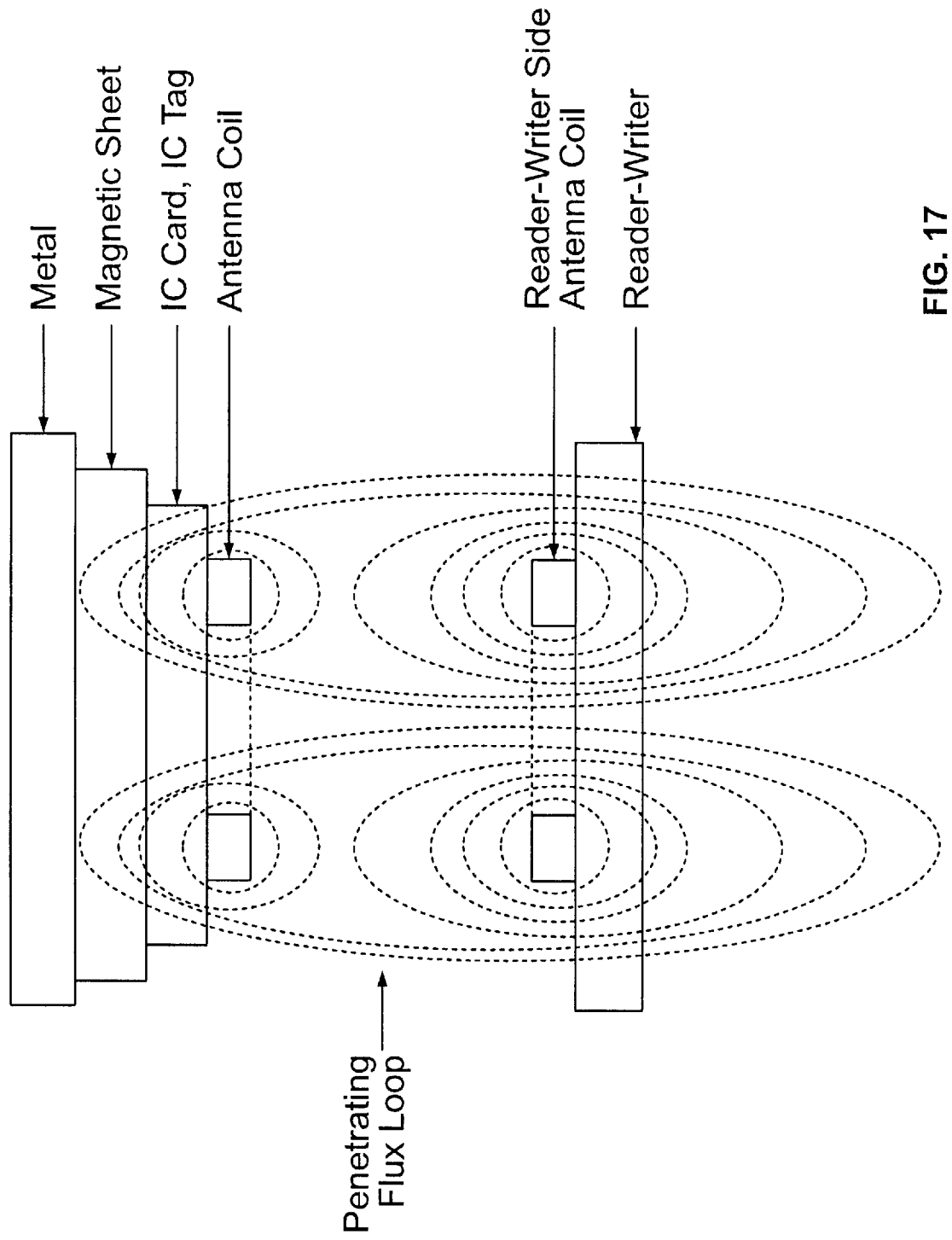
FIG. 17 illustrates the placement of a material between the substrate for the antenna coil (marked IC card, IC tag) for the NFC or RFID card and a metal backing material such as a battery case or in case the RFID is attached to a metallic material, in accordance with an embodiment.

In accordance with an embodiment, an appropriate material for use as a shield is FSF200 from Maruwa Corp. which is designed for shielding of Near Field Communication (NFC) or RFID tags that are in contact with a metal backing. The material has high real and significant imaginary (loss component) permeability at the operating frequency of 13.6 MHz. FIG. 17 shows 370 the placement of this material between the substrate for the antenna coil (marked IC card, IC tag) for the NFC or RFID card and a metal backing material such as a battery case or in case the RFID is attached to a metallic material.

In this case, the material has large $\mu'$ (real part of permeability) and significant $\mu''$ (imaginary part of permeability—related to loss) at the operating frequency of 13.6 MHz. Therefore the magnetic field is highly concentrated in the magnetic sheet that is also lossy. In this way, use of a thin layer of magnetic shield of 1 mm to 0.2 mm and below significantly reduces the effect of the metal behind the receiver or antenna coil in this example. Depending on the characteristics needed, one can also engineer material that only have significant real permeability values without being lossy at the region of interest to allow strong guidance and focusing of the magnetic field without suffering loss. This may be useful for achieving higher inductances and efficiencies in certain designs. For example, for the FSF200 material shown in FIG. 17, operation at lower frequencies such as 1 MHz would allow concentration of magnetic field in the magnetic shield without the loss component. As mentioned above, these materials can be engineered to have the desired µ' and µ" values at desired thicknesses to optimize efficiency and shielding necessary.

It is clear from the above description that the use of such magnetic material in combination with metal layers described above can provide better thermal and electromagnetic performance.

Figure 18:
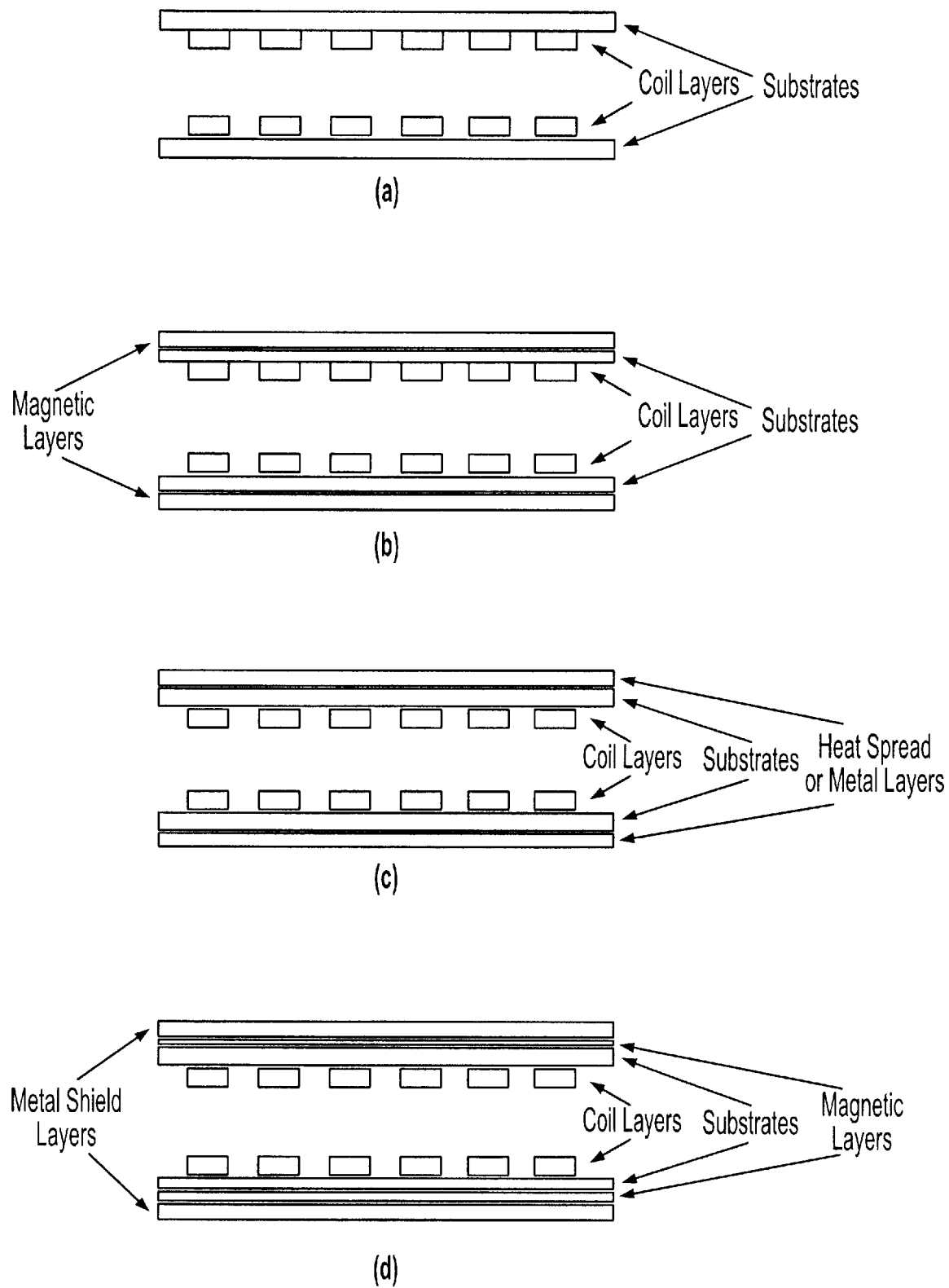
FIG. 18 is an illustration of several geometries.

FIG. 18 shows several geometries 380 discussed above. In FIG. 18*a*, the basic coil structure is shown. In FIG. 18*b*, the use of magnetic layers to shield the areas above and below the coils form the magnetic field is demonstrated. FIG. 18*c* shows use of a heat spreader layer that could be nonelectrically conductive such as ceramic or a metal layer designed to minimize eddy current effects such as the method outlined in FIGS. 12-16 and other similar embodiments. FIG. 18*d* shows how magnetic layers and metal shields can be combined to provide thermal and electrical shielding. Other combinations of structures are also possible that for example combine metal and ceramic layers to conduct heat and/or provide electromagnetic shielding. The choice of the geometry would be dictated by space, cost, weight, design characteristics, desired thermal and electrical performance and other criteria.

Figure 11:
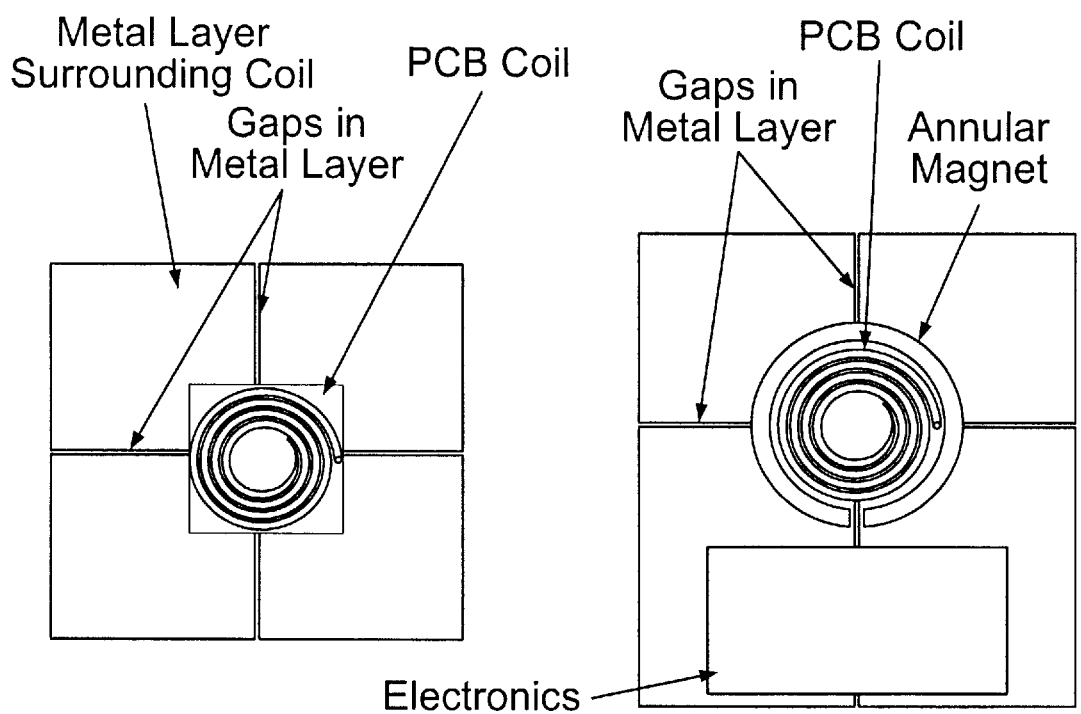
FIG. 11 shows an illustration of a metal layer cut at one or several places to avoid the possibility of creation of circulating currents in the metal surrounding the coil, in accordance with an embodiment.

In any of the geometries discussed here, use of alignment magnets such as shown in FIGS. 10 and 11 or other geometries are compatible with the geometries for improved thermal and electromagnetic interference performance and even when magnetic layers are used, the magnets can be placed outside of the area covered by magnetic layers and therefore not be affected by them.

Figure 19:
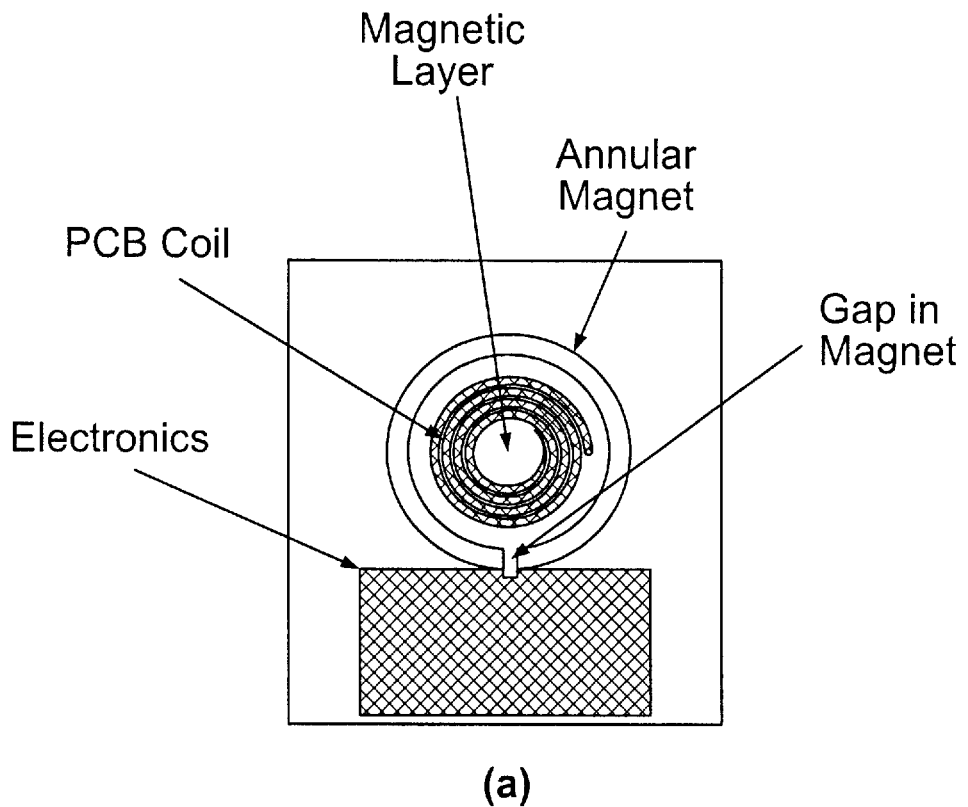
FIG. 19 illustrates a charger and receiver for inductive wireless power transmission with magnetic layer shielding and annular magnet outside of the magnet shield layer area, in accordance with an embodiment.
Figure 19:
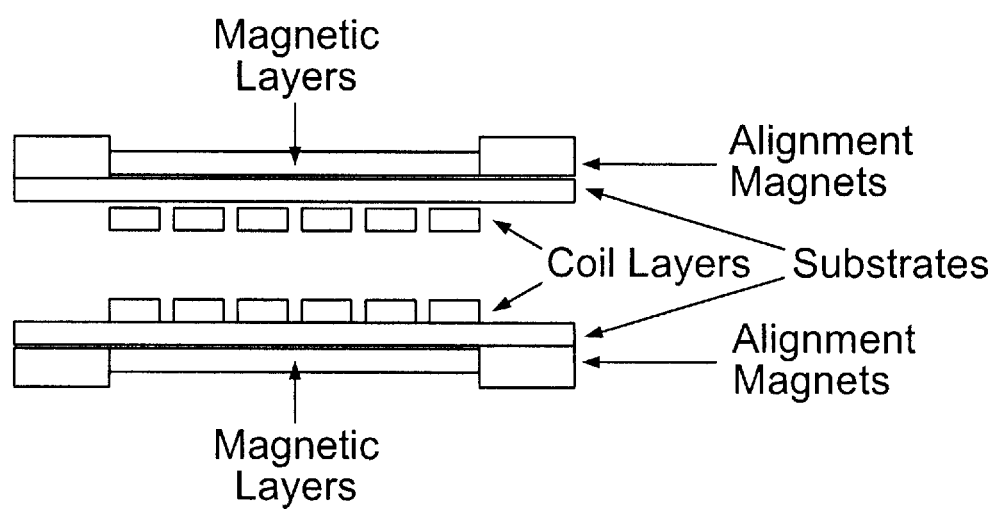

FIG. 19 illustrates 390 a charger and receiver for inductive wireless power transmission with magnetic layer shielding and annular magnet outside of the magnet shield layer area.

In FIG. 19, use of a magnetic shield with an annular magnet is shown as an example. Note that the magnet is not covered by the magnetic layer and can provide alignment pull to align the charger and coil magnets while the magnetic layer provides shielding of the areas above and below the top and bottom coils (respectively) to reduce electromagnetic interference and/or to enhance power transfer efficiency. The top view and side view are shown in FIGS. 19*a* and 19*b*.

Other geometries shown above can be combined with magnets to provide the desired temperature and shielding behavior while providing alignment of the coils with the magnets.

Improvements in Charging Devices and/or Batteries

In accordance with some embodiments described herein, a wireless charger system or system for transfer of power wirelessly can be provided in several different geometries and/or modes.

Figure 20:
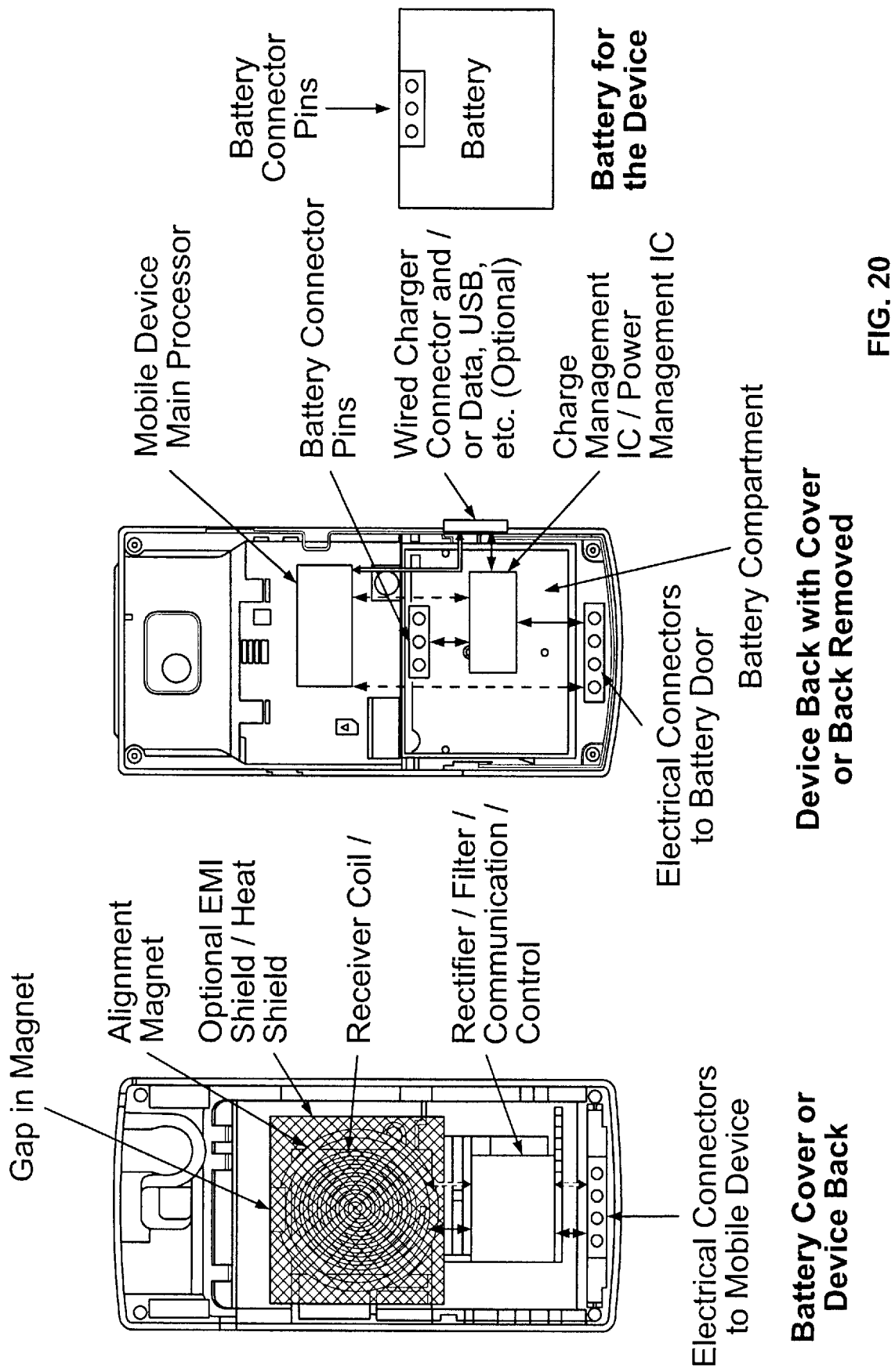
FIG. 20 shows an illustration of a design for integration of a wireless charger and/or power receiver into a mobile device battery cover or back cover, in accordance with an embodiment.

In accordance with an embodiment 400, the Receiver in the mobile device or battery to be charged inductively can be integrated by the manufacturer in to the device, an example of which is shown in FIG. 20. FIG. 20 shows a design for integration of a wireless charger and/or power Receiver into a mobile device battery cover or back cover in accordance with an embodiment. The battery can also be powered/charged by conventional wired connection from an AC/DC adaptor or USB or mini-USB connector, etc. The circuitry after the receiver coil shown can be partitioned into a part on the back cover or mobile device battery cover and a section integrated into the mobile device and/or the battery. The two-parts transfer power/signal/data with electrical connectors/pins in the mobile device back cover or battery cover and corresponding mating ones in the mobile device and/or battery. The mobile device in this case can also be charged/powered by a wired charger/USB cable connection.

It may be desirable from a mechanical and size point of view to have the minimum amount of parts of the receiver on the mobile device battery cover or a skin or a case (such as only the receiver coil) and the rest of the circuit can reside inside the mobile device. On the other hand, for signal integrity purposes and for lower noise levels, it may be desirable to have many of the parts near the receiver coil and the resulting dc voltage and any other data lines to be connected to the mobile device. Thus, the connection between the mobile device battery cover or back or a skin or a case and the rest of the mobile device and/or battery can comprise 1 or 2 to many connector pins that can carry power and/or charging signals and/or data including information about battery temperature, battery verification, etc. This is somewhat atypical of mobile device battery covers or covers or skins or cases for mobile devices currently used which are typically passive parts made of plastic, metal, or leather, etc. and have no electrical functionality.

In FIG. 20, in accordance with an embodiment, the receiver coil and/or receiver circuit section can also include additional electromagnetic shield layers such as absorbers and/or metal layers and/or ferrite layers and/or heat spreading/and/or heat shield layers to provide better performance and reliability.

In addition, to align the receiver coil with the charger and/or power supply coil, one or a number of magnets can be used. These magnets can be placed on or around the coil and mounted to be aligned and attract corresponding ones in the charger and/or power supply to align the coils laterally to allow maximum efficiency and power transfer. As an example, in FIG. 20, a ring magnet is shown on or around the receiver coil. This ring magnet can be magnetized perpendicular to the plane and would attract a corresponding and similar magnet in or around the charger and/or power supply coil to align the two parts. In FIG. 20, an optional gap or break in the ring is also shown. This gap can serve to limit or eliminate the eddy currents generated in the magnet due to the time varying magnetic field of the charger and/or power supply coil or receiver coil and has been found experimentally to be quite effective in eliminating wasted power and heating of the magnet due to the eddy current effect. The ring magnet is shown as an example and other magnet geometries or other methods for alignment can be used for alignment of the coils. These may include straight magnets, arc magnets, square magnets, or one or more magnetic discs or other shapes attached to the receiver coil or mobile device battery cover or back of the device, skin, case, etc. and similarly incorporated in the charger and/or power supply. The magnets can be mounted such that they allow rotation of the receiver coil and thus the mobile device and/or battery with respect to the charger and/or power supply while maintaining charging capability. Use of the magnets is especially beneficial in cases where the charger and/or power supply is integrated or attached to a moving platform such as in a car where it is important to keep the mobile device stationary while the car is moving.

In order for a mobile device battery cover or back of a device to have the connectivity to the mobile device and/or battery required, the cover or back can use pins or connectors that mate with corresponding ones in the mobile device or directly on to the battery of the mobile device. These pins can be of the type that connect when the two parts are slid against each other or make an electrical connection when pressed together or alike.

Inside the mobile device, the power and charging signal or data from the connector pins are carried to the rest of the charging/regulation/charge or power management circuit or IC and may also be connected to the main processor or other circuitry inside the mobile device to provide or receive data or other information. In the example geometry shown 420 in FIG. 21, power from the power management IC (pmic) inside the mobile device is applied to the battery connectors and used to charge the battery.

Figure 21:
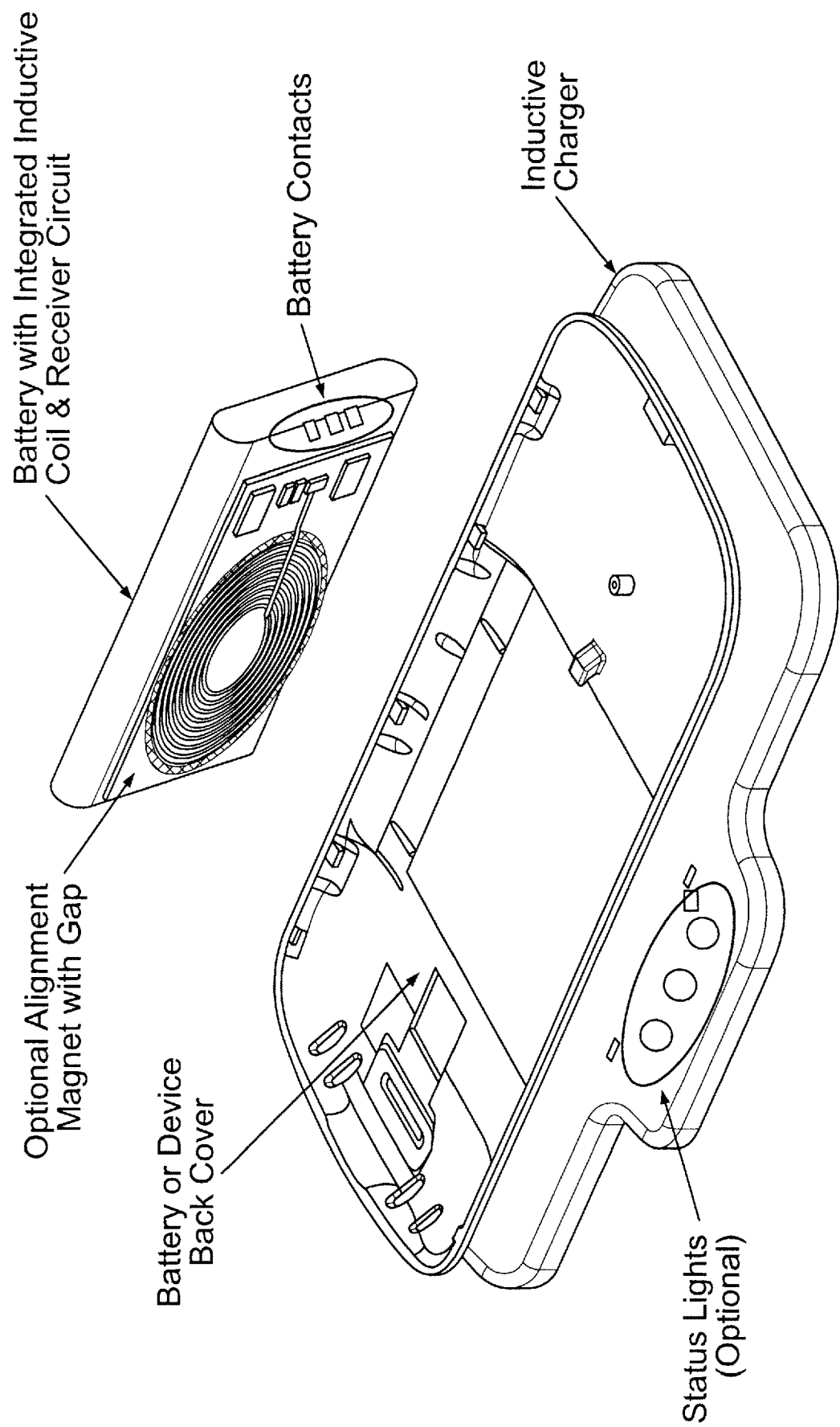
FIG. 21 shows an illustration of another embodiment, in which the inductive coil and receiver is integrated into or on a battery.

In accordance with another embodiment shown in FIG. 21, the inductive Coil and Receiver is integrated into or on a battery. In this case, the battery can be charged directly when placed on the charger or placed inside the device behind a battery cover or door. One or more alignment magnets can also be integrated into or on the battery to help in alignment of the Receiver coil with a corresponding charger coil in the charger. In the case shown, a round magnet is shown that allows alignment of the charger and battery while the two parts are at any rotational angle with respect to each other. The magnet can be one piece or multiple pieces and can include a gap to avoid heating created by the magnetic field of the inductive charger. The battery in this case can be an after-market or original manufacturer battery that would allow wireless inductive charging. The battery contacts make contact with corresponding contact points in the device to power the device and/or provide other charging or communication information. The contact can for example provide information on the battery temperature, whether it is charged wirelessly or by wired power, state of battery, data communication, or other information. Such a battery can also be charged through conventional wired charger or power supplies through these connectors. The receiver circuit inside or on the battery can also include switches so the battery would switch between wired and wireless charging paths and can also signal the charger to shut off if a wired charger for the battery (through battery contacts) is present.

In accordance with embodiments the receiver can communicate non-charging data (communication such as contact list, calendar or other information) with the charger base. In these cases, the data can be transferred to the device being charged through other connectors on the battery with appropriate corresponding connectors in the device.

The battery and/or the charger can in addition include layers for heat spreading, dissipation or thermal or electromagnetic barriers or layers to increase the efficiency or other feature of the system. These layers can be metallic, ceramic, magnetic, plastic, conductive layers, etc. that have appropriate properties for achieving performance improvements. The coil in this embodiment can be flat or curved and/or multi-layered and created on a Printed Circuit Board (PCB) or Flexible PCB, or be stamped or cut from a metal or other type of material film or formed or manufactured in the appropriate shape and be free-standing (no backing). The coil can be integrated inside or on the outside or surface of the battery pack.

It may also be desirable for the wireless charger to include additional capabilities. For example, the wireless receiver circuit (in or on the battery in this embodiment) can include WiFi capabilities that the device itself lacks. If the battery can communicate with the device through provisioned connector points, then it is capable of enabling the device to communicate wirelessly through WiFi.

Another example is that of a mobile phone that has Bluetooth capability but not WiFi. In accordance with embodiments the battery can have appropriate circuitry to communicate with external devices wirelessly through WiFi and transfer the data to the mobile device through Bluetooth. In this way, the wireless receiver can provide a transmission protocol translation to enable seamless communication between the mobile device and other devices or networks or the charger. Implementation of such additional features is possible in each of the implementations discussed here.

In accordance with an embodiment, the charger shown in FIG. 21 can be powered through an external power source such as an AC or DC supply or can itself include a one-time use or rechargeable battery or other methods such as solar cells or fuel cells or hand crank, etc. to provide power to it. The charger can also include one or more status indicators that show power being applied to the charger, charging occurring, and charge complete or other features.

Figure 22:
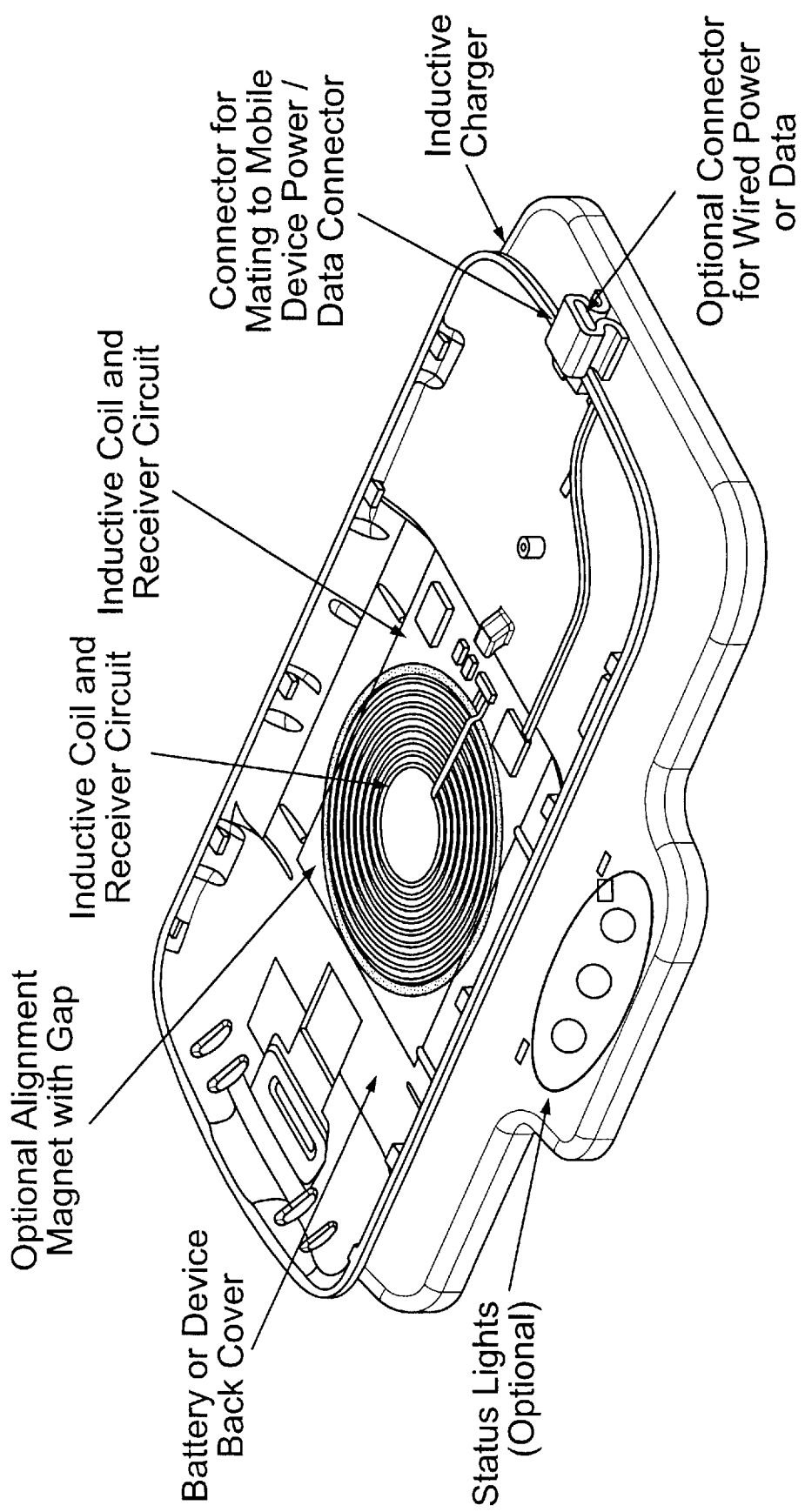
FIG. 22 shows an illustration of another embodiment, in which the receiver circuit is integrated in the inside or outside of the device back or battery door.

In accordance with another embodiment 430, shown in FIG. 22, the receiver coil and/or the receiver circuit is integrated in the inside or outside of the device back or battery door. The receiver coil and/or the circuit can also be integrated into the device back or battery door during production and be for example inside the injection molded battery door part. In this embodiment, the power and/or data received by the receiver circuit can be routed to the input power and/or data connector of the device through wires that would terminate in a connector or similar part. The user can enable the device to charge wirelessly by snapping the cover or battery door in place and plugging the connector into the device connector plug. Similar to above embodiments, the receiver circuit and coil can include additional layers of material to reduce electromagnetic interference, heat, or other undesired effects.

There are several issues that are important in design of a practical wireless charging system. The charger and receiver for the wireless charger system include wound wire coils, PCB or flexible PCB coils, or stamped or etched free-standing coils or deposited on a substrate. The coils create and detect the AC magnetic field that is used for power transfer and communication.

In addition, the connector for the mobile device can, as an option, include an additional connector to allow wired connection of a wired charger and/or wired communication. For example, for a device with a female Universal Serial Bus (USB) connector, the connector can have a male USB connector to plug into the device connector to provide power and/or communication to the device and a female USB or other connector on the other side or nearby to enable a cable to be plugged in to charge or power the device wirelessly or to communicate with the device without removing the cable from the device. The receiver circuit and/or the connector may include appropriate switching circuits to switch between wired and wireless charging or power. The receiver circuit and/or the external connector may also enable other functions such as data connectivity through additional protocols (WiFi, WiMax, NFC, Bluetooth, Wireless USB, etc.) or provide communication protocol translation (Bluetooth to WiFi, etc.) or provide additional functionality (AM, FM or satellite radio tuner or transmitter, TV tuner, data storage on additional memory, expanded processing capability, flashlight, bar code scanner, laser display, extra battery power, GPS, external speaker, microphone, etc.) that is desirable by user. As such the receiver circuit can include additional antennas and/or transmitters and/or receivers.

In accordance with embodiments, the receiver coil and/or circuit can be inside, outside or in a layer (inside an injection molded part for example) of a cover or door or skin of the device. It can also be integrated into an external skin or protective cover for a material such as Neoprene, plastic, leather, cloth or other material covering a device.

In accordance with another embodiment, the receiver and/or the coil are attachable or stick-on parts that are attached or stuck on the outside or inside of the device cover or battery door and routed to the connector. Such an embodiment can allow the same receiver coil and/or circuit to be used for multiple devices without the need to integrate into model specific back covers or battery doors. With a thin receiver coil and circuit or a small circuit placed inside the connector plug, such a receiver may be 0.1 mm or thinner and not add much to the device thickness and may be attached to the inside or outside of the cover or battery door with adhesive or other methods.

Figure 23:
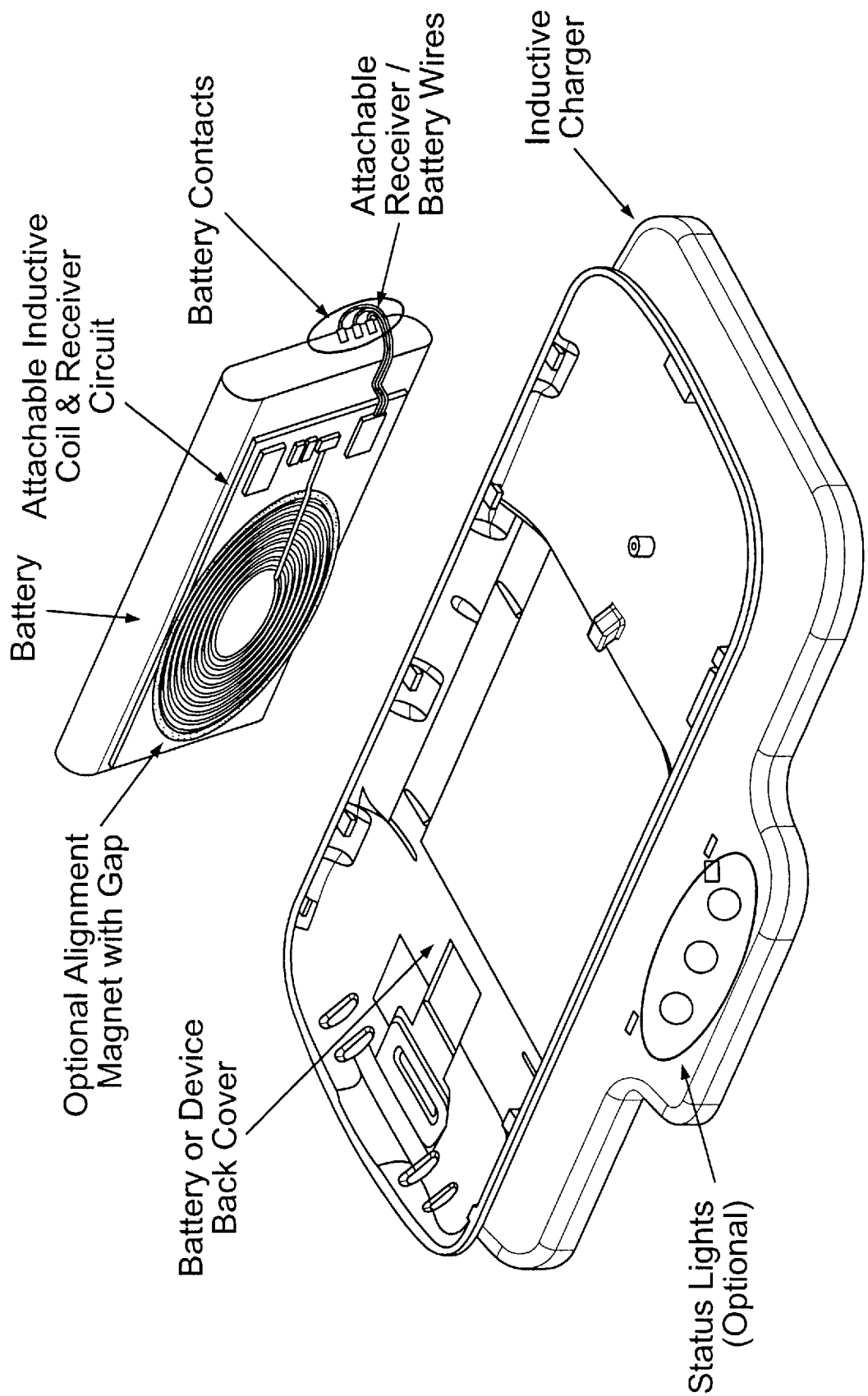
FIG. 23 illustrates an embodiment including a wireless inductive charger and Inductive receiver coil and circuit.

FIG. 23 illustrates 440 a wireless inductive charger and inductive receiver coil and circuit. In this case, the receiver and/or the receiver circuit are attached to the battery surface and routed and connected to the battery contacts with attachable wires or cable. In accordance with the embodiment shown in FIG. 23, the receiver coil and/or the receiver circuit are attachable or stick-on parts that are directly attached the battery exterior and the charging power for the battery is routed and connected to the battery terminals with attachable wires or connectors that make electrical contact with these connectors through pressure or electrically conductive adhesive. The receiver can include magnets for alignment between the receiver and the charger coil and other layers for thermal or electromagnetic properties as described above. In addition, the attachable circuit on the battery may provide additional communication or other capabilities as described above. This method allows any manufactured battery to be changed to recharge wirelessly. The required battery voltage for typical batteries and/or maximum capacity or other requirements are pre-programmed into the receiver circuit eliminating the need for any change by the user. For example, a large number of mobile device batteries use single cell Li-Ion batteries that require a specific charging routine that charges the battery to a maximum of 4.2 V. The receive circuit can have this algorithm pre-programmed or contain a charger IC with a Li-Ion charger to enable any single cell Li-Ion battery to be recharged and can be used by a variety of battery sizes and capacities.

Such a method for enabling wireless charging of batteries can also be applied to batteries with round or other shapes. For example NiMH or NiCd or Li-Ion batteries in AA, AAA, C, D, or 9 V size can be enabled to charge wirelessly with stick on thin chargers shown above. In the case of round body batteries, the receiver coil can be manufactured in a curved shape to be able to attached or incorporated into or on the body of the battery. Another method for enabling charging of cylindrical batteries is shown 450 in FIG. 24.

Figure 24:
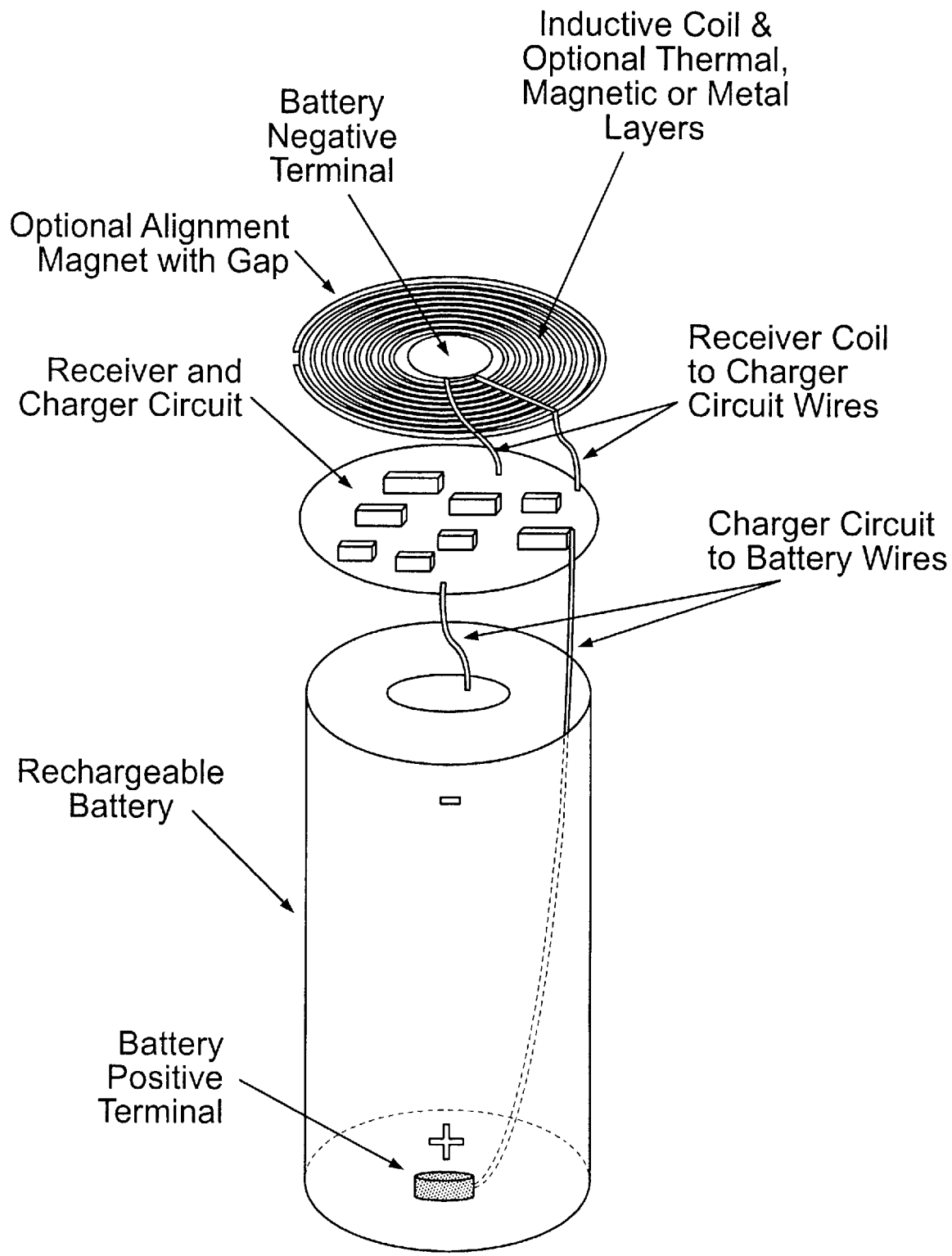
FIG. 24 is an illustration of another embodiment for enabling charging of cylindrical batteries.

In accordance with the embodiment shown in FIG. 24 for cylindrical batteries, the Receiver coil can be integrated into one of the end terminals of the battery and the receiver circuit can be placed inside the body of the battery (shown at bottom in this case) and internally connected to the battery terminals to charge the battery. Placement of the battery vertically with the coil in proximity to a corresponding active charger coil can transfer power to the receiver circuit and charge the battery. In this geometry, the center of the receiver coil can be connected to a metal contact which serves as the negative terminal of the battery.

Figure 25:
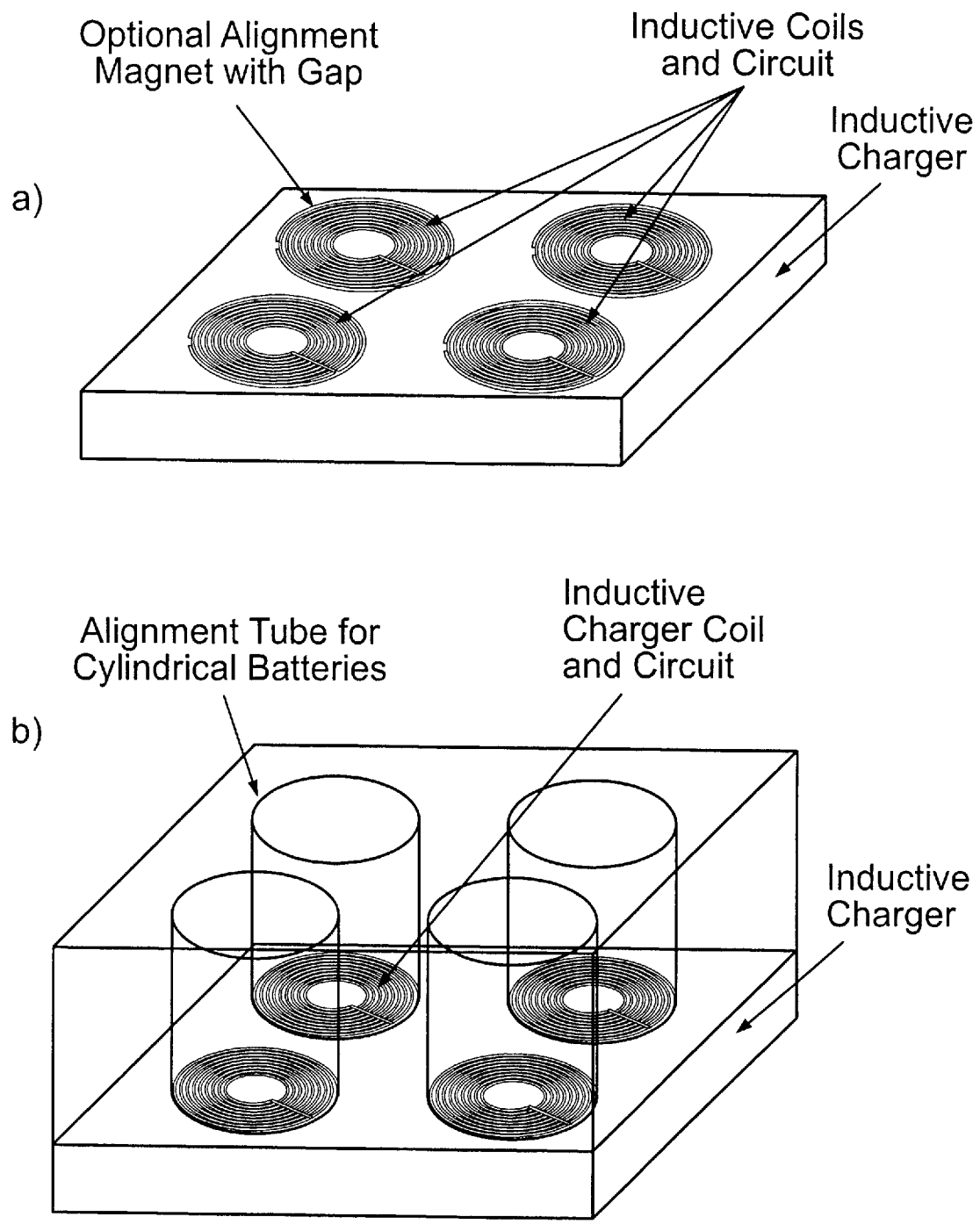
FIG. 25 is an illustration of another embodiment, in which the charger can include multiple coils for charging several batteries at the same time

As shown in FIG. 25, in accordance with an embodiment 460 the charger can include multiple coils for charging several batteries at the same time and may contain a variety of methods for alignment of batteries and the coils such as magnets (FIG. 25a) or mechanical methods such as slots or tubes for batteries to fit in (FIG. 25b) for alignment of charger coil and receiver coils of the battery.

Additional Uses and Implementations of Inductive Charging

In accordance with some embodiments described herein, a device is described by which the wireless charger and/or power supply is a device that is powered by a power source from another device such as the power available from the USB or PCMCIA port or similar from a laptop computer or a peripheral hub or consumer electronic or communication device such as a music player, TV, video player, stereo, or car stereo USB or other outlets which include power. The charger can also be incorporated directly into a battery so that a battery can charge another battery wirelessly. While most of the description below is based on the inductive method, the embodiments described here can be implemented with either the inductive method or the conductive method or the magnetic resonance method, optical, or other methods for power transfer some of which have been described above. Inductive methods of power transfer are described below as an example of the more general wireless power transfer.

Figure 26:
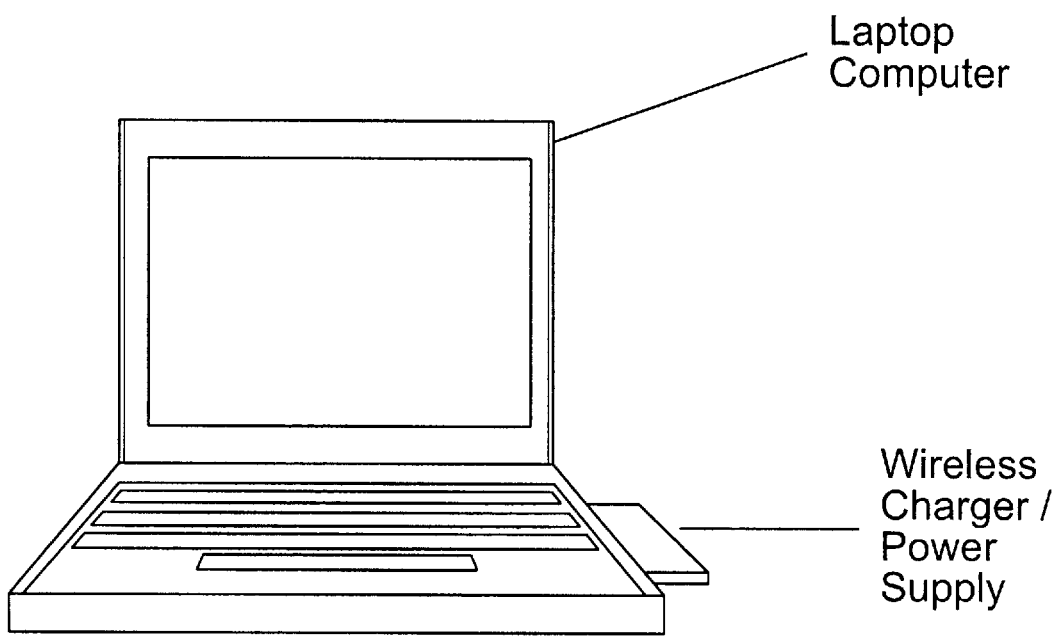
FIG. 26 is an illustration of another embodiment, including a wireless charger and/or power supply is in the form of a small device that includes a USB connector and directly connects to the side of a laptop to form a platform area where a phone, camera, or other mobile device or battery can be placed and can receive power to operate and/or charge.

In one embodiment 470 of this approach shown in FIG. 26, a wireless charger and/or power supply is in the form of a small device that includes a USB connector and directly connects to the side of a laptop to form a platform area where a phone, camera, or other mobile device or battery can be placed and can receive power to operate and/or charge.

In one implementation, in order to provide a compact device, the USB connector for the wireless charger and/or power supply can be folded into the device and can be unfolded during use for plugging into the power source. In another implementation, the source of the power is the PCMCIA slot in a computer or other device and the wireless charger has a connector that can slide into the PCMCIA slot and connect to provide power to the wireless charger or power supply.

In a further embodiment to any of the above implementations, the wireless charger and/or power supply further includes an internal battery so that while it is plugged into an external device for power, the internal battery is being charged. The wireless charger or power supply can simultaneously be able to charge or power a mobile device placed on or near its surface wirelessly. However, furthermore, the user can disconnect the device from the power from the device by for example disconnecting it from the USB connector of the laptop and use the wireless charger away from any power source by operating it from its own internal battery power. In this way, a self-powered portable, convenient wireless charger or power supply is implemented. In one embodiment for a PCMCIA port, the charger and/or power supply with its own internal battery is small and thin enough to fit into a PCMCIA slot and is generally stored and carried in the slot and when wireless charging or powering of a mobile device is needed, the wireless charger and/or power supply is ejected from the PCMCIA slot and the internal battery in the device is used to power the charger and/or power supply to charge a mobile device and/or battery. In another embodiment, a wireless charger is imbedded in a battery so that it can charge another battery wirelessly. The first battery may itself further include a wireless receiver so that it can be charged wirelessly. The second battery being charged may be of lower, similar or higher capacity than the first. In any of the embodiments described above, the charger and/or power supply can be designed to charge one or more devices simultaneously.

In a further embodiment, while a mobile device is placed on the wireless charger and/or power supply, the commencement of charging and or powering simultaneously starts a communication mechanism in the device powering the charger and/or power supply to exchange data/synchronize or communicate through a wireless method or through the port providing power to the charger and/or power supply. Examples of wireless methods of synchronization can include Bluetooth, WiFi, Wireless USB, Zigbee, optical methods, etc. For example, by placing a mobile phone on the wireless charger and/or power supply connected to a laptop's USB port, the wireless charger signals the laptop to begin synchronization and the synchronization program on the laptop launches and through a Bluetooth or WiFi connection with the phone, contact lists, calendars, photos, music, audio files, etc. are synchronized. In another example with a camera, the photos in the camera are automatically downloaded into the laptop.

The wireless charger and/or power supply system can also include means of communication through the wireless charger/power system. For example for inductive chargers or power supplies, communication of data through the power transfer coils can be enabled. In this case, data from and to the mobile device can transfer to the device providing power to the wireless charger and/or power supply through the inductive coils and then through the port interface such as USB, PCMCIA, etc. that is powering the charger and/or power supply. The files that are transferred can be user data such as photos, music, audio or video files or contact lists, calendars, programs, firmware updates, etc. but can also include information such as level of battery in the mobile device, diagnostic information, etc. For example, while a mobile phone or MP3 player is charging or being powered on a wireless charger and/or power supply pad connected to the USB port of a laptop, the degree of charge of the device and its amount of memory use, firmware version, etc. is shown on the laptop screen. In variations of wireless power systems, the communication method between the charger and the receiver for signaling and communication and control and/or regulation of power can be through a wireless, optical, or even a form of wired communication. In these cases, the same mechanism can be used for data transfer as described here.

Figure 27:
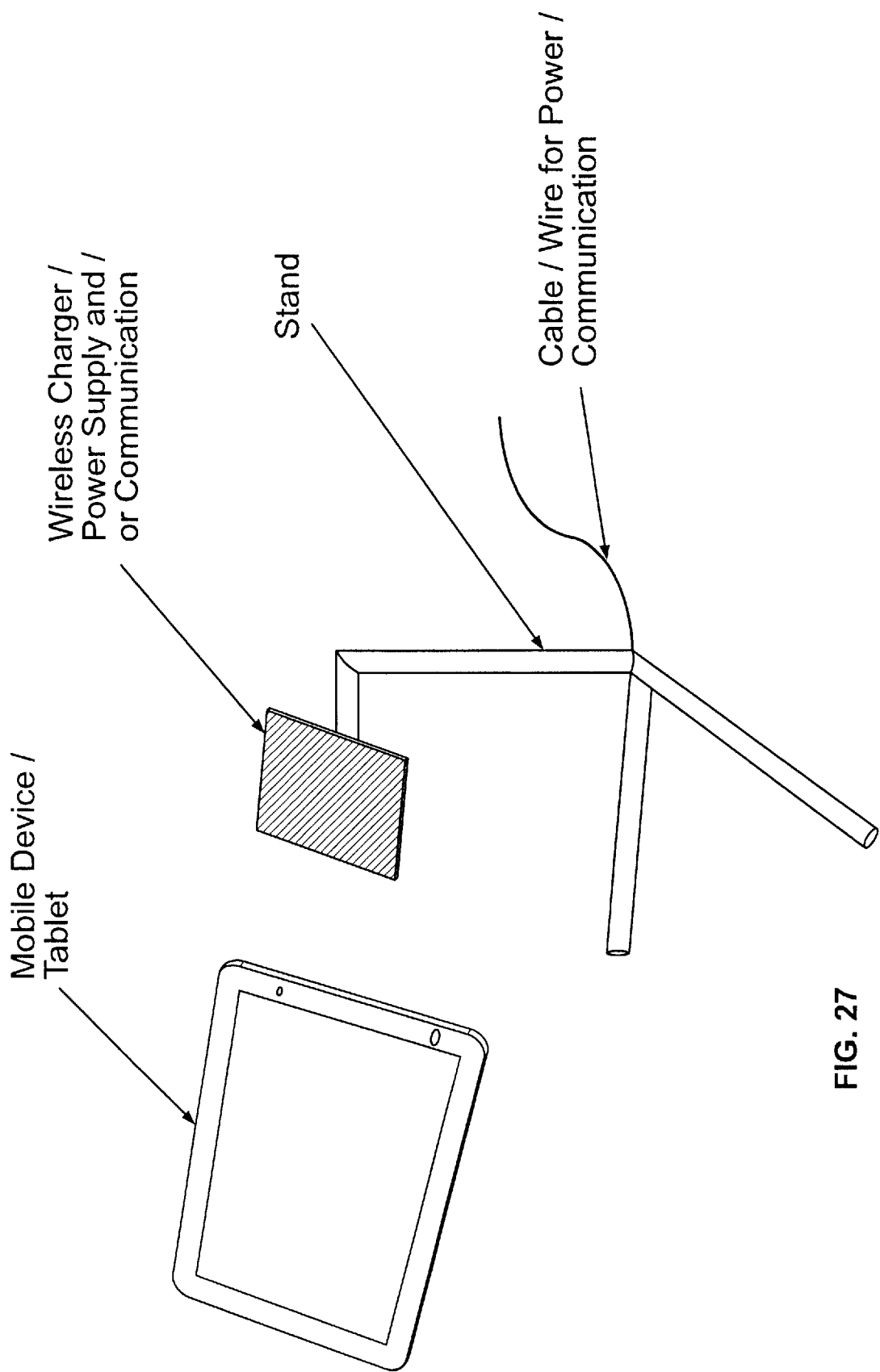
FIG. 27 illustrates an embodiment for mobile devices such as a mobile phone, MP3 or video player, game station, laptop, tablet computer, book reader, Computer or video or TV display, etc., a wireless charger and/or power supply is integrated into a stand or holder for such a mobile device so that the mobile device can be powered or charged when placed on the stand.

In an embodiment 480 shown in FIG. 27 for mobile devices such as a mobile phone, MP3 or video player, game station, laptop, tablet computer, book reader, computer or video or TV display, etc., a wireless charger and/or power supply is integrated into a stand or holder for such a mobile device so that the mobile device can be powered or charged when placed on the stand. A mechanical or magnetic mechanism for attachment or holding of the mobile device or display on such a stand would keep the parts in proximity and alignment for wireless charging. The Receiver for the wireless charger can be built into the device by the manufacturer, or integrated into a skin or case or a battery for the device.

To use a magnetic method for securing the device on the charger and/or power supply, one or more magnets can be placed in the charger and/or power supply and similar magnets or ferromagnetic material in the device, its skin, or case or battery can be used to provide an attractive force to align and hold the device in place.

An example of a type of magnet that can be used for this purpose is a ring or arc magnet that will provide minimal or no effect on performance of a wireless charger while providing secure and rotationally invariant alignment and holding power. To reduce or eliminate eddy currents in a ring magnet in inductive chargers and or power supplies, a break or cut in the circle prevents creation of circulating currents and is very beneficial. The ring is used here as an example and other geometries of thin magnets such as a square, rectangle, triangle, etc. shape can also be used.

In many situations, it would be beneficial for the mobile device and/or display to exchange data/information with the charger/power supply and or other devices such as mouse, keyboard, routers, modems, the internet, other displays, speakers, printers, storage devices, or USB hubs, etc. In these cases, a means for data exchange between the mobile device and the external devices through communication through the stand can be implemented. Such a communication can be through the wireless charger or other components such as WiFi, Bluetooth, Wireless USB, Powerline, or Zigbee communication, etc.

In addition, the wireless charging stand can provide additional functionalities to the user. For example, by placement of the mobile device on the charger and/or power supply, the device is automatically authenticated and connection to various peripherals and/or internet is enabled. In addition, the content of the mobile device is replicated on a larger display or the audio is routed to external speakers or speakers built into the stand. Depending on the orientation of the device on the display, the display on the mobile device and/or display can also rotate its orientation to appear in the correct orientation for the user.

Figure 28:
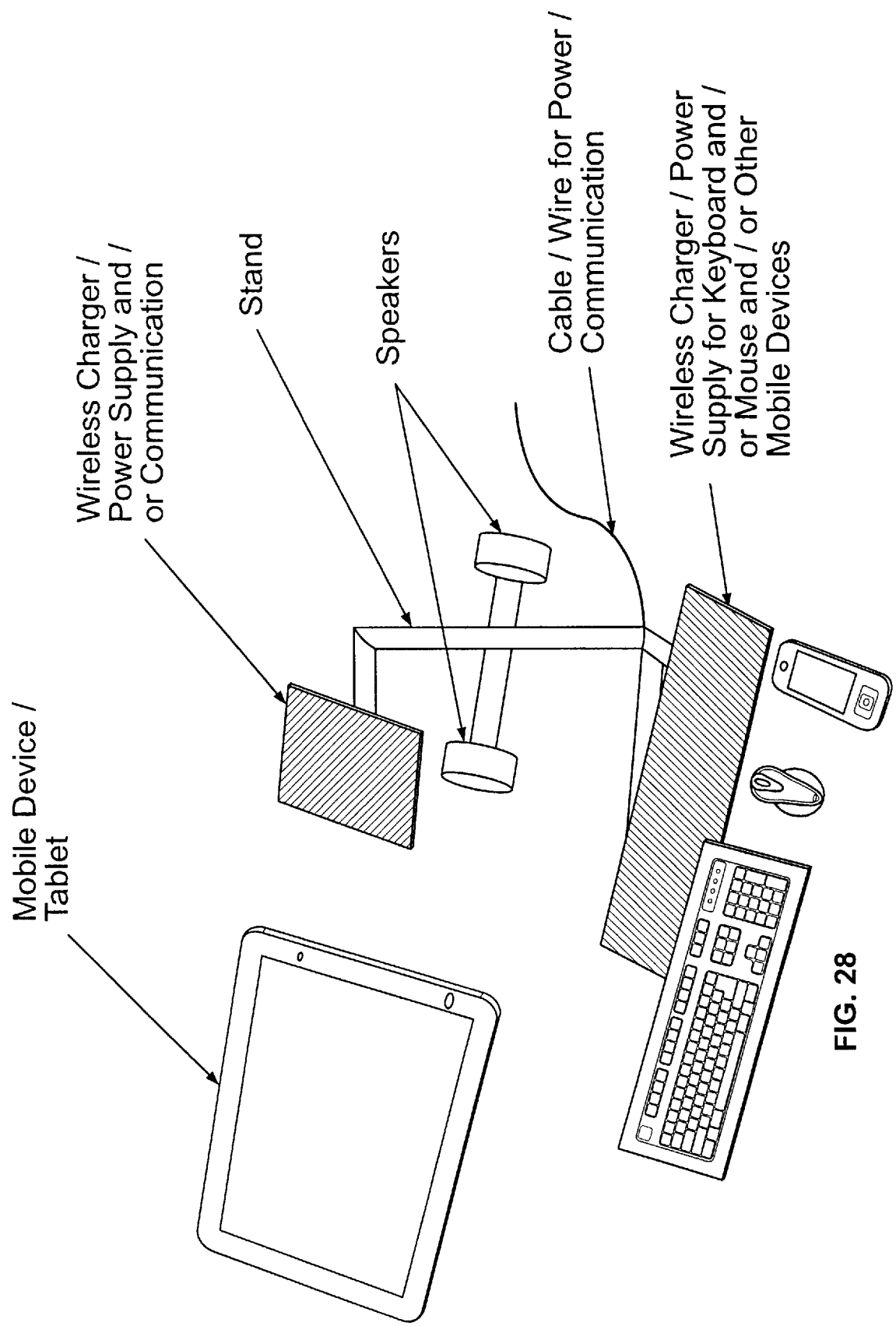
FIG. 28 illustrates a further embodiment of a charger/power stand which could in addition incorporate an area for charging/powering a keyboard and/or a mouse and/or joystick or remote control and/or other mobile devices such as mobile phone, MP3 player, camera, game player, remote control, battery.

For mobile device, Notepad, or tablet users, a keyboard would be of great use in combination with the stand discussed above. FIG. 28 shows a further embodiment 490 of a charger/power stand which could in addition incorporate an area for charging/powering a keyboard and/or a mouse and/or joystick or remote control and/or other mobile devices such as mobile phone, MP3 player, camera, game player, remote control, battery, etc. The keyboard and/or mouse can incorporate a rechargeable battery and the keyboard and/or mouse can be stored on the corresponding charger surface when not in use or even during use. Communication between the keyboard and/or the mouse and one or more of the mobile devices, notepad, tablet or display can be through one of the established methods such as WiFi, Bluetooth, Wireless USB, Zigbee, etc. or through a proprietary method. In addition, the stand can incorporate speakers so music or audio from one or more of the mobile devices can be played through them.

Figure 29:
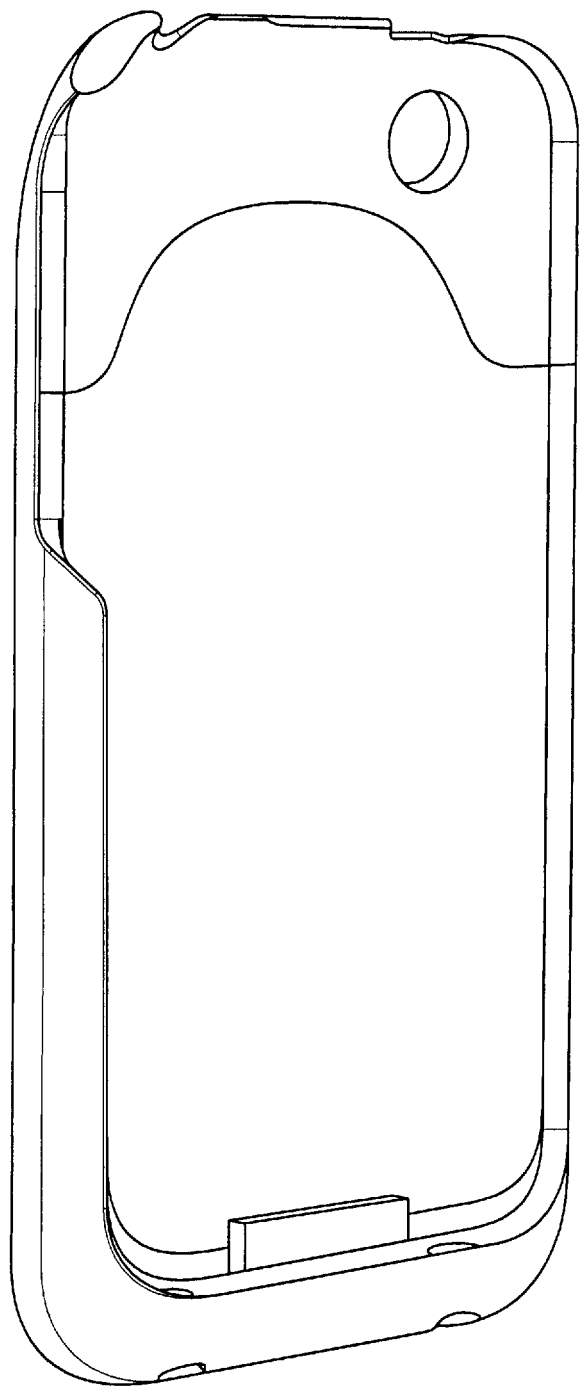
FIG. 29 illustrates embodiments wherein a skin or case for a mobile phone includes a rechargeable battery and connector for the mobile phone.
Figure 30:
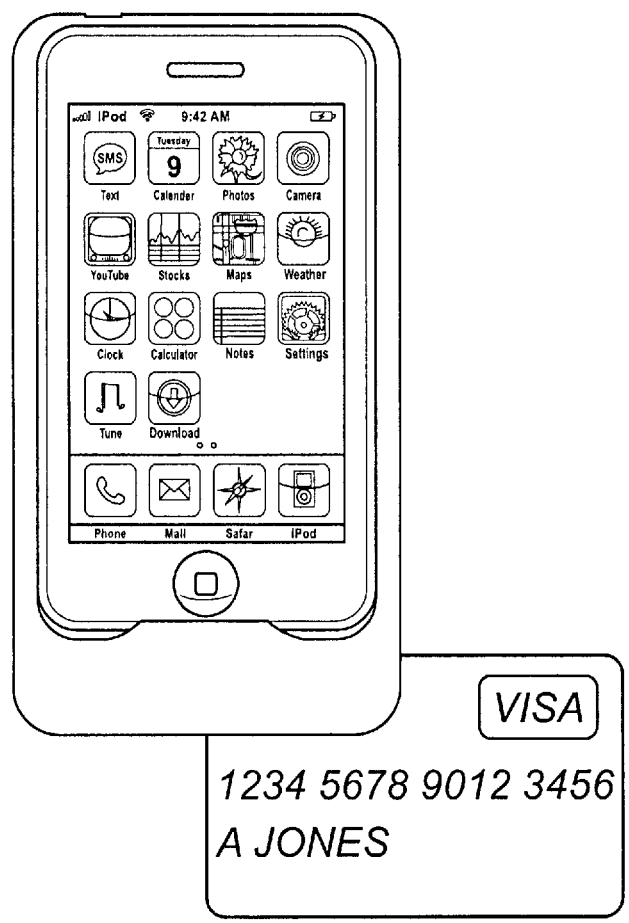
FIG. 30 illustrates a removable or fixed receiver coil and electronics that can fit into a slot to allow the notebook computer to be wirelessly charged from below the notebook computer, in accordance with an embodiment.
Figure 30:
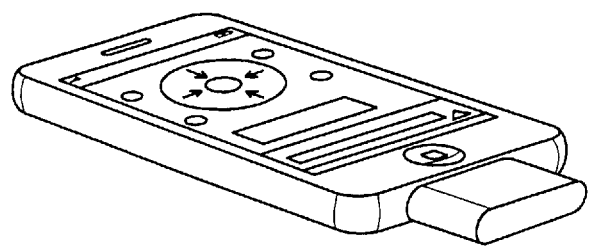

In another embodiment, the wireless receiver for the mobile device can include further functionalities that enhance the use of the mobile device. Some examples are given here. In one example, to enable a mobile device to receive power wirelessly, a case, battery door, or attachment to the mobile device includes a receiver for the mobile device and means of providing power to the battery in the mobile device but also includes a battery itself that is charged wirelessly simultaneously. When the mobile device and the receiver are not in the vicinity of the wireless charger and/or mobile device, the rechargeable battery included with the receiver is a secondary battery that powers the mobile device or charges the battery of the mobile device to extend the useful time of use of the mobile device. An example is shown (500, 510) in FIG. 29 and FIG. 30, where a skin or case for a mobile phone includes a rechargeable battery and connector for the mobile phone. When the skin/case is attached to the phone and the phone and case are placed on a wireless charger and/or power supply, the mobile phone is charged but also the battery within the case/skin is charged. Once the mobile phone and the case/skin is no longer in the vicinity of the wireless charger, the battery in the skin/case can operate the mobile phone prior to the internal battery powering the phone or the case/skin battery can provide power once the internal battery to the phone is exhausted thereby extending use time. The switch over between batteries can be automatic or through the intervention of the user by a physical switch or software on the mobile device. While a skin/case is shown here, the battery can also be integrated into a battery door for the mobile device or be connected to the power port of the mobile device through a cable or alike.

In any of the embodiments described here, alignment of coils in an inductive system is important to allow high efficiency and operation. Use of magnets in the wireless charger and the receiver can achieve this function without any physical features or alignment mechanisms. However, some of the mobile devices can have components such as electronic compasses that may be disturbed by the use of magnets in the charger and/or receiver. To reduce or eliminate such an undesired effect, it is important to shield the mobile device from the magnetic field. This can be achieved by incorporating faraday shields or one or more layers of shielding material such as Iron or Nickel or other Ferromagnetic sheets or ferrite material or special magnetic material such as mu-metal (an iron/nickel and other material alloy with very high permeability) or NETIC or Co-NETIC material (from magnetic shield corporation) or ceramic or nano materials for magnetic shielding into the receiver skin or case or the mobile device or battery so that the sensitive components are shielded from stray magnetic field. In the case of the receiver type shown in FIG. 29, such shielding material can be placed between the coil and the inner surface of the case. In addition, the AC magnetic field generated by the wireless charger may interfere with other device functionalities and can be shielded by incorporation or ferrite or nano magnetic material into the back of the receiver coil. Such a shield for AC magnetic field can be effective for shielding the DC magnetic field as well. Otherwise, it may be desirable to incorporate 2 or more different types of shield layers.

In another embodiment, the receiver is built into other devices that enhance the functionality of a mobile device. For example, external modules, skins, or cases for mobile phones that add TV watching or reception, Radio reception, magnetic reading, Bluetooth connectivity, Global Positioning System (GPS), Universal remote control, Near Field Communication (NFC) or extended storage or connectivity capabilities exist. Any of these cases or skins or modules that plug into the power and or connectivity of the mobile device or phone can include a wireless receiver so that the battery inside these modules and/or the mobile device or phone can be charged or powered wirelessly thereby greatly benefiting the user.

Additionally, currently, modules for extending the usefulness of a mobile device as stick on or attachments or integrated into mobile device skin or case or battery door that provide additional functionality exist. Some of these modules can include internal batteries that require charging. Examples include stick-on or mobile phone case circuitry and antenna that boost a mobile phone reception or stick-on circuits for mobile phones that includes Near Field Communication (NFC) circuitry and coil for mobile devices that do not have this capability built in. To communicate this information to the mobile device, the sticker can communicate the NFC data to the mobile device in another protocol such as Bluetooth or WiFi or Wireless USB, etc. thus translating between the protocols. The sticker can further include a rechargeable battery for powering the circuitry. In another implementation described here, the sticker described here can include a wireless charger receiver and its sticker's rechargeable battery can be charged or powered by a wireless charger remotely thus providing long operation life.

In another implementation, such a reception booster, or NFC reader/writer, their coil(s) and the WiFi or Bluetooth circuitry can be integrated into an aftermarket battery for mobile device that includes a wireless charging receiver. In this way, a mobile device such as a phone's battery can be replaced with such a battery to provide wireless charging receiver capability and extended range or reception and NFC capability together to a phone user thus providing much more functionality.

In some embodiments an aftermarket wireless charger or power supply receiver unit can be provided that includes all the necessary receiver coil and circuitry for receipt of power in a thin profile that can be placed on top of a mobile battery and connects to the battery connectors with wires, flexible circuit board, or connector cable so that an original battery is enabled to receive power wirelessly while simultaneously still operating in its original housing within the battery compartment of the mobile device. This method can provide wireless power charging for mobile devices without affecting other characteristics and size/shape of the device and would be greatly useful. Additional functionality such as NFC or NFC to Bluetooth or WiFi capability can also be incorporated into such a battery sticker to provide even more functionality and can draw power form the mobile device battery for its operation thereby eliminating the need for another battery to power the circuit.

Improvements in Charging Efficiency and Other Features

In accordance with some embodiments described herein, features can be provided to improve charging efficiency, usage, and other features.

For example, in the implementation shown above in FIG. 26, in order to provide a compact device, a wireless charger/power supply is implemented such that it can fit into an area in an electronic device such as a desktop or notebook computer or electronic book or similar. Such a charger and/or power supply can be powered internally by the electronic device. Extending the charger and/or power supply outward (similar to ejecting a caddy on a CD-ROM or DVD-ROM player or recorder, can start the operation of the charger and/or power supply and provide the user a surface for charging/powering a mobile device and/or battery. In one embodiment, such a charger and/or power supply can be built for the size and shape of existing available slots on desktop or notebook computers or other devices such as PCMCIA slots or storage devices such as optical drives such as CD-ROM or DVD players and recorders and use the existing power ports available in connectors for such devices or have one or more separate connectors specifically for its own operation. In such an embodiment, the charger and/or power supply can be integrated with the laptop or notebook computer software and/or hardware and perform more advanced functions. An example can be that when a mobile device such as a phone with an appropriate wireless receiver is placed on such a charger and/or power supply area, the charging and/or supply of power is started and in addition, the mobile phone is synchronized with the desktop or notebook computer and data such as contact lists, calendars, email, pictures, music, etc. are synchronized. Such a data communication can be implemented through data exchange in the charger link such as data communication through the coils in inductive charging or through another established data communication protocol such as Bluetooth or WiFi, Zigbee, or wireless USB, etc.

In another embodiment, the charger and/or power supply described above can be removable and/or retractable. As an example, many mobile devices such as desktop and notebook computers have slots for removable optical drives such as CD-ROM or DVD players or recorders. These components can be made removable so the user can leave them behind when not in use to save weight or they are constructed such that the slot can be used for multiple purposes. For example, a slot can be provided in a notebook computer where the slot can be used with a removable optical drive accessory or be used for an additional battery to extend the operating time of the notebook computer. Furthermore, the optical drive typically includes a caddy that is retractable and with a mechanical or software eject, can extend a caddy away from the notebook computer for the user to place a CD-ROM or DVD or similar media in the caddy. A similar mechanism can be implemented to extend the charger and/or power supply surface out from the notebook when in use and to retract into the notebook when not needed. For example, the device shown in FIG. 26 can include a wireless charger and/or power supply incorporated into an optical drive slot. Such slots typically have internal connections that provide connectivity between the accessory and internal data or power or battery lines of the notebook computer. Same connectors or other connectors can be provided for the removable wireless charger and/or power supply to operate. As described above, such a removable wireless charger and/or power supply can in addition provide data connectivity or trigger data connectivity with the desktop or notebook computer and the mobile device or battery being charged.

In a further implementation, such a wireless charger and/or power supply further includes internal batteries and/or data storage capability so that when the charger and/or power supply is plugged in or inserted into a desktop or notebook computer, the internal battery of the charger and/or power supply is charged and data from the internal storage device is synchronized. The user can also remove the part from the desktop or notebook computer and operate the part and charge or provide power to other mobile devices while operating the charger and/or power supply from its own internal battery without or with little assistance from other power sources. This would provide a highly useful portable device for providing power and/or charging to mobile devices in various situations.

Figure 31:
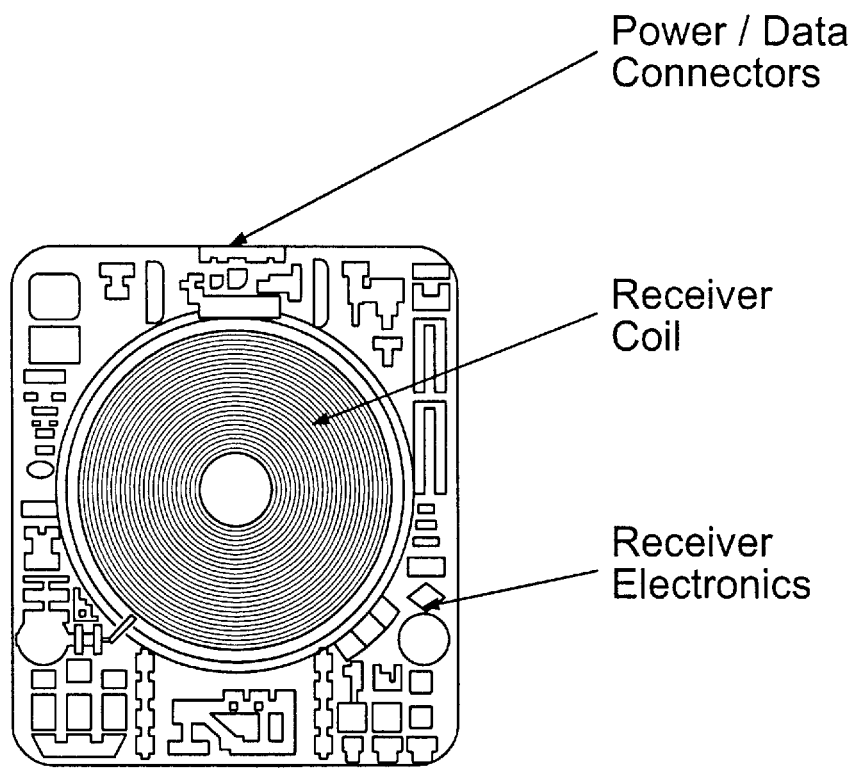
FIG. 31 illustrates a wireless charger and/or power supply, in accordance with an embodiment.
Figure 31:
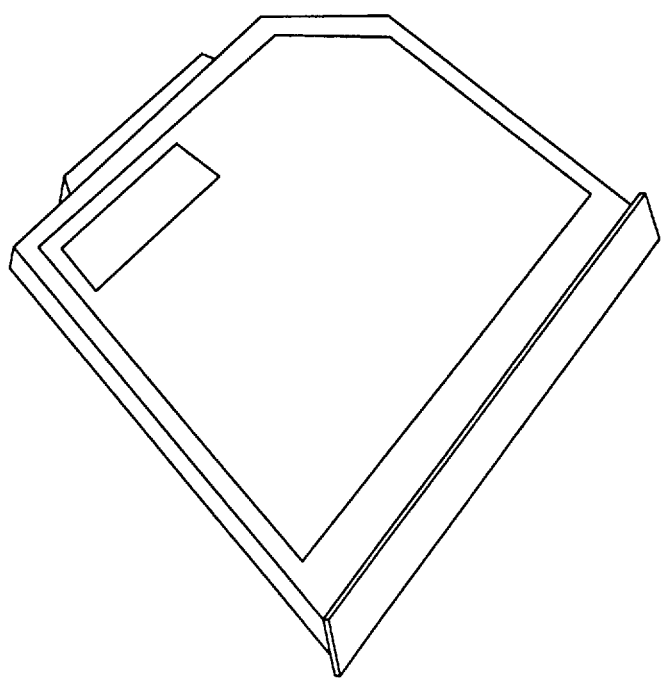

In some cases, it is highly desirable for mobile devices such as notebook computers, etc. to be chargeable wirelessly. To enable this, in one implementation, an accessory or charger and/or power supply device that fits into a slot or available space in a notebook computer or other mobile device is created such that the charger and/or power supply device includes a receiver coil and the appropriate receiver electronics to enable the charger and/or power supply to receive power wirelessly from a charger and/or power supply outside the device. As an example, for notebook computers, a receiver coil and receiver electronics can be built into a PCMCIA or optical drive size and shape so that in the case of a notebook computer with such a slot, the coil and receiver can be fit into the notebook and allow it to be charged or powered from a wireless charger and/or power supply pad or surface under the laptop. The receiver coil may include appropriate Electromagnetic shielding or thermal layers to reduce any effect of the electromagnetic field or heat on any internal components of the notebook computer. The connectivity between such a wireless charger and or power supply and the notebook can be provided by provisioned or existing connectors inside the notebook computer. An example of this can be a slot provided in a notebook computer that may serve one or more purposes of operation with an optical drive and/or extended use battery. A removable or fixed receiver coil and electronics that would fit into such a slot would allow the notebook computer to be wirelessly charged from below the notebook computer. Such a wireless charger and/or power supply is shown 520 in FIG. 31. In one embodiment, such a charger and/or power supply coil and receiver can be incorporated into a removable or built in optical drive so the same slot can provide 2 functions (charging/power receiver and optical drive). As discussed earlier, similarly, some removable batteries for such slots exist for some notebooks. The receiver coil and electronics can be integrated into such a battery to charge it directly or charge and/or power the notebook computer.

It is also possible to combine the wireless charger and/or power supply receiver and the wireless charger and/or power supply together in one embodiment so the same device can receive and/or transmit wireless power. As an example, a device that fits into an optical drive slot can receive power wirelessly from below but also have a caddy compartment that can be extended or ejected to allow for one or more mobile devices to be charged wirelessly while placed on or near such a charger and/or power supply.

In any of the embodiments described above, the wireless charger/power supply and/or the wireless receiver can include visual and/or audio or other means of notifying the user about commencement of charging/power, end of charging/power and/or degree of battery charge or other diagnostic information such as any faults, over-temperature, etc. This information can be presented on or near the wireless charger/power supply or receiver or displayed on the computer screen through the information being transmitted to the desktop or notebook computer or even transmitted to another location for display or processing.

In any of the embodiments described here, alignment of coils in an inductive system is important to allow high efficiency and power in operation. Use of one or more magnets in the wireless charger and the receiver can achieve this function without any physical features or alignment mechanisms. To use a magnetic method for securing the device on the charger and/or power supply, one or more magnets can be placed in the charger and/or power supply and similar magnets or ferromagnetic material in the device, its skin, or case or battery can be used to provide an attractive force to align and hold the device in place.

An example of a type of magnet that can be used for this purpose is a ring or arc magnet that will provide minimal or no effect on performance of a wireless charger while providing secure and rotationally invariant alignment and holding power. To reduce or eliminate eddy currents in a ring magnet in inductive chargers and or power supplies, a break or cut in the circle prevents creation of circulating currents and is very beneficial. The ring is used here as an example and other geometries of thin magnets such as a square, rectangle, triangle, etc. shape can also be used.

Figure 32:
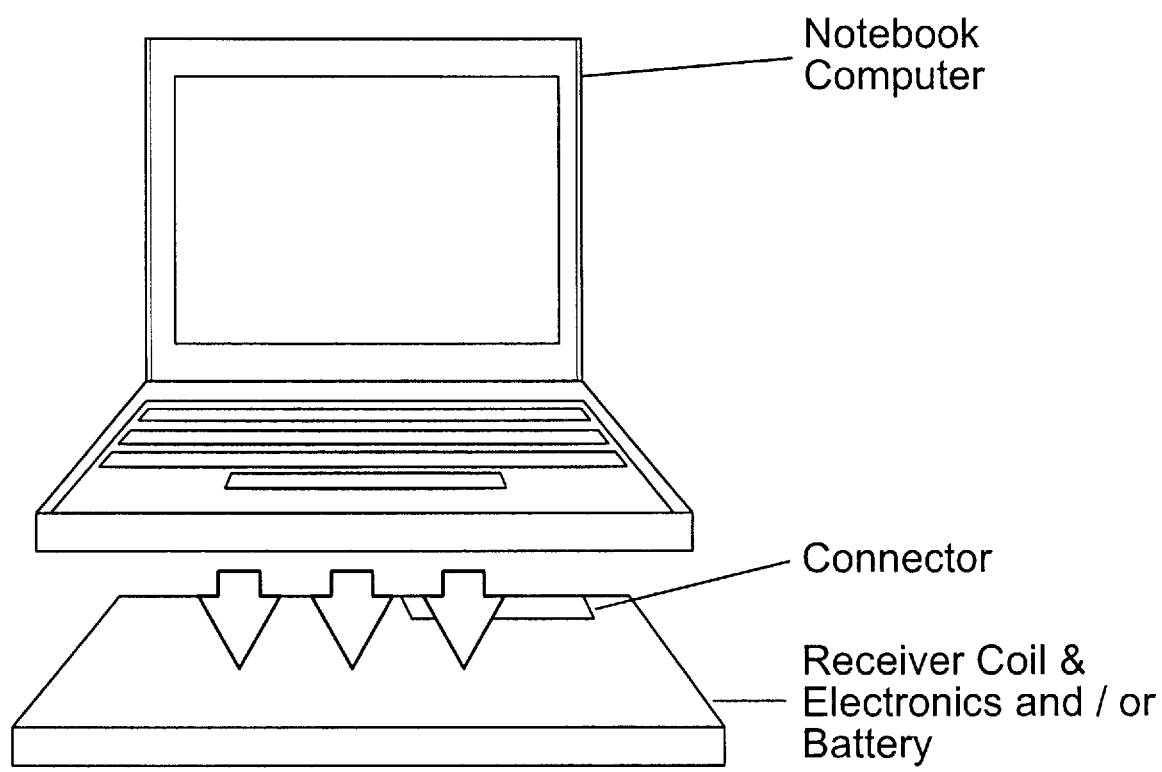
FIG. 32 illustrates another embodiment where the wireless receiver coil and/or electronics are housed in a device attached to the bottom of a notebook computer through a connector that exists in many laptops for docking.

FIG. 32 shows another embodiment 530 where the wireless receiver coil and/or electronics are housed in a device (shown as a flat part in this image) that is attached to the bottom of a notebook computer through a connector that exists in many laptops for docking. The connector can also be used to secure the receiver coil and/or part to the notebook computer. The combination of the notebook computer and the receiver (attached to each other), can be placed on a wireless charger surface or device and the received power is transferred to the notebook through the connector. The receiver part may also contain rechargeable batteries to increase the operational run time of the notebook. In addition, other features or functions such as an optical drive, additional communication capabilities, speakers, extra processors, means for cooling the notebook computer, etc. can be included in this part to provide even more functionality to the user.

Figure 33:
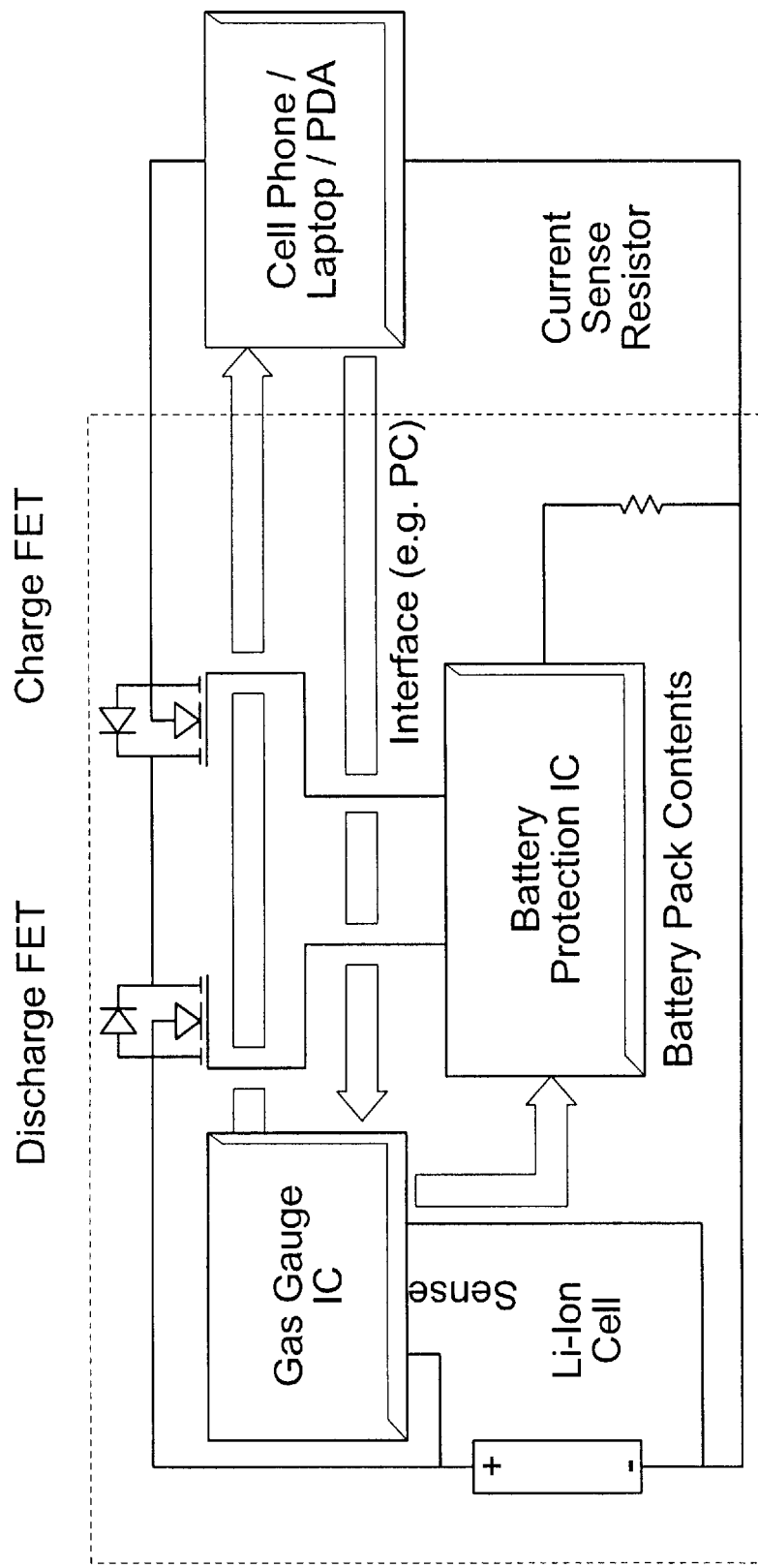
FIG. 33 illustrates a configuration for the circuitry which can be included in common Li-Ion batteries.

Another implementation for wireless charging in mobile device comprises incorporating a wireless receiver coil and associated receiver electronics into a rechargeable battery. This can be useful for mobile devices so that a device such as mobile phone, walkie-talkie, cordless phone, camera, MP3 player, notebook computer, or other electronic device user can replace the existing battery in a device with a similar battery with built in wireless receiver and be able to charge/power the mobile device wirelessly. It may be desirable for the battery to be able to continue the ability to charge through the internal charger of the device when the device is plugged into electricity as well. FIG. 33 shows a typical configuration 550 for the circuitry included in common Li-Ion batteries. A Li-Ion battery pack typically includes a battery protection circuit against over-current charge and discharge comprises typically two back to back FETs. In addition, circuitry to allow the mobile device such as mobile phone, laptop or notebook computer etc. to measure the amount of charge in the battery can be included. The battery is designed to work with the charging and "gas gauging" circuitry inside the mobile device to charge/discharge the battery appropriately and to accurately reflect the state of charge of the battery and remaining power. In addition, the circuitry inside the battery may contain means of measuring the battery temperature such as thermistors to ensure operation within a safe range. The circuitry may contain a microcontroller unit to measure and influence charging/discharging behavior.

Figure 34:
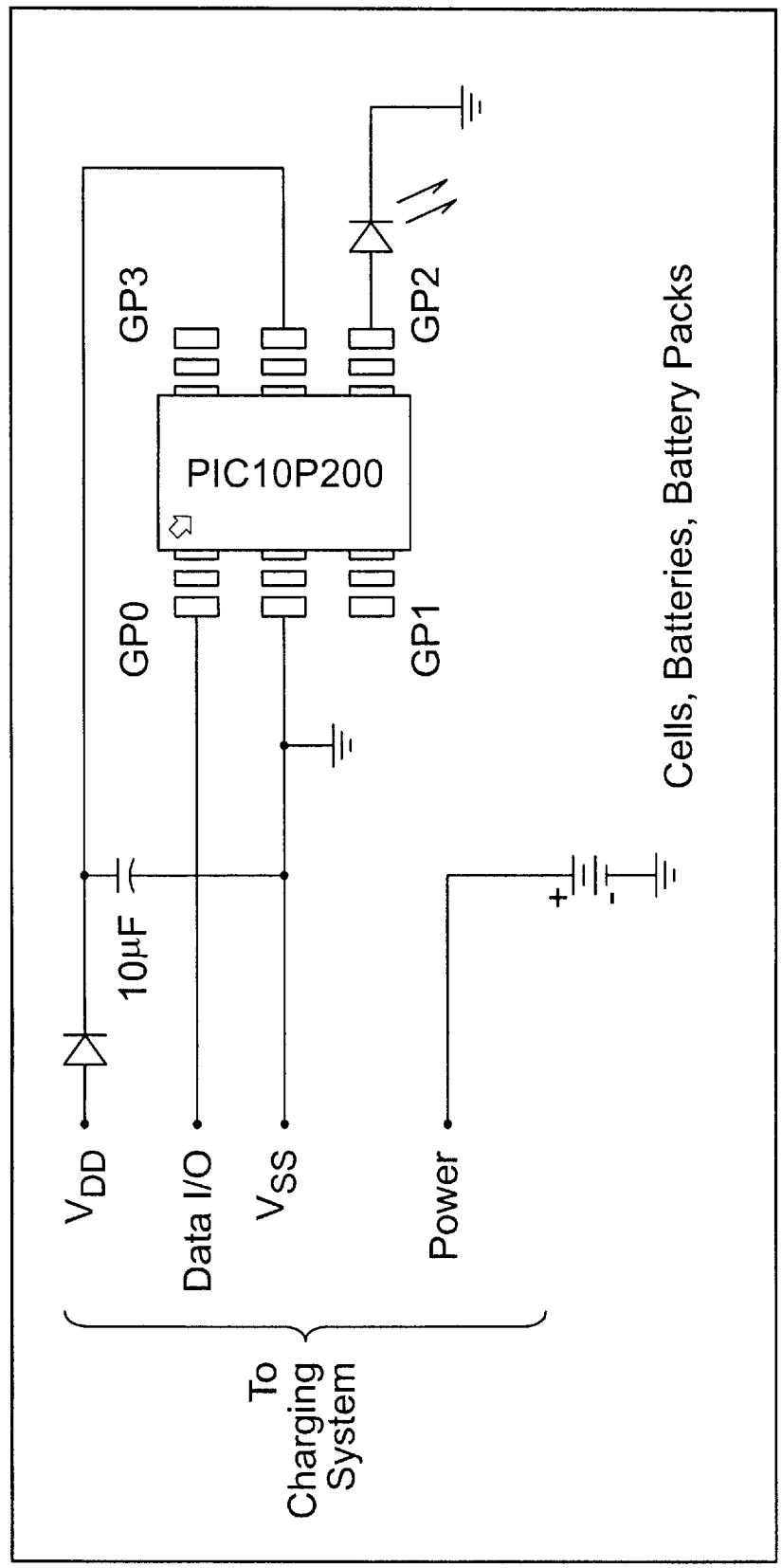
FIG. 34 illustrates a battery that may contain specialized circuitry to provide battery ID or authentication.

In some cases, a battery may contain specialized circuitry as shown 570 in FIG. 34 to provide battery ID or authentication. The microcontroller shown here is from Microchip Corporation. Data I/O line inside the battery pack is connected through battery contacts to the device and is queried by the device circuitry for authentication. This authentication can be implemented by device manufacturer to guarantee battery performance, quality or for commercial reasons to prevent counterfeiting, etc. A common way to authenticate a battery and ensure it is from a valid source is with a challenge/response system. Challenge/response authentication circuits, also known as identify friend or foe (IFF) circuits. The system is implemented so that one part of the system, the host (typically the mobile device), issues a challenge to the other part of the system, the token (e.g., battery), when the two components begin to communicate. After the challenge is received, the token calculates a response and transmits the results back to the host system. The direction of the challenge and response can be reversed or even transmitted in both directions. Additionally, either side of the system can randomly transmit the challenge and response at varying times to increase the security of the authentication process.

A battery may include protection IC and/or battery ID (authentication) and/or temperature sensor circuitry inside the battery pack.

Wireless charging can be used with mobile devices in several ways. To enable a mobile device to be charged wirelessly, the wireless charging module can be incorporated into a battery door or an external case or skin for a device and the wireless receiver can be designed to provide regulated power to the input power jack of the mobile device through a power connector integrated into the case or battery door. In this case, it may be necessary to allow the user to access the other features available through the same device connector. For example, a mobile phone may include a USB connector that is used for charging the mobile device and for data connectivity. A stand alone charger with a USB connector would use the power connectors of the USB to provide power to the device. But the user can also connect the phone to a notebook computer or other device with a USB cable and be able to exchange information/synchronize with the notebook computer and at the same time charge/power the mobile phone.

Figure 35:
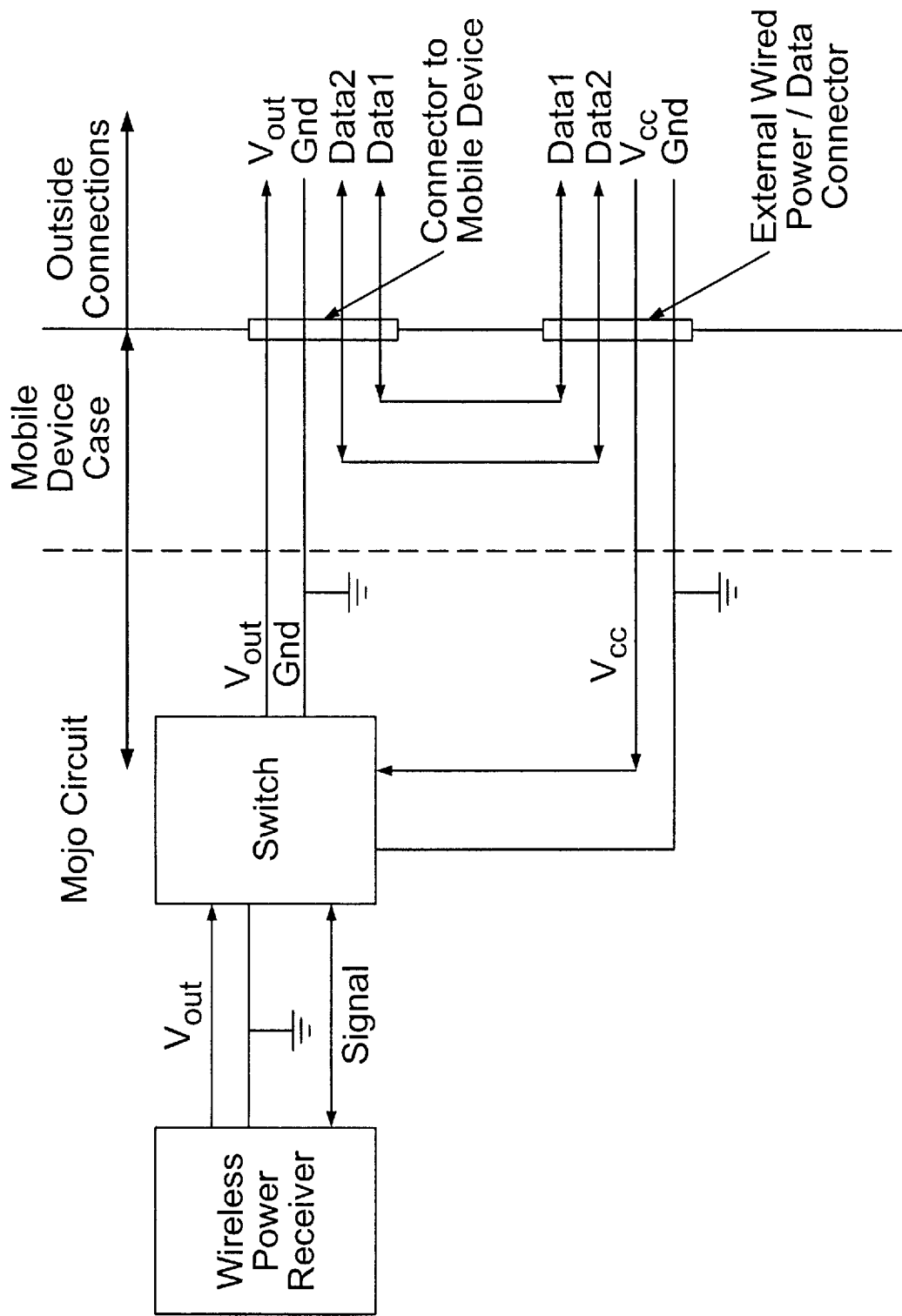
FIG. 35 illustrates a wireless charging receiver, in accordance with an embodiment.

To implement the wireless charger case or battery door as described above, it can be preferable to enable the user to be able to be able to charge the mobile device wirelessly through integration of receiver into the case but also allow the user to access the power/data connector on the mobile device for data transfer/synchronization or wired charging if desired. An implementation for this type of wireless charging receiver is shown 590 in FIG. 35.

In this implementation, the case or battery door includes a mobile device connector that mates with mobile devices connector and provides power and/or data to the mobile device through. The wireless power received by the wireless charger is regulated in the receiver and/or charger or a combination of the two and then routed to the power contacts of the mobile device through a switching mechanism. The wireless charger case or battery door can also include a wired connector that can allow the user to plug in a cable to connect the case to an external wired charger and/or cable for charging and data connectivity to other mobile device such as notebook computer. The power lines of this connector can be routed to the switching mechanism that routes the power to the output connector of the mobile device skin. The user may in this way be able to charge/power the mobile device in a wireless manner by placing the mobile device and the case or battery door on or near a wireless charger device. The Switch can be implemented such that it would provide charging/power priority to either the wired or wireless charger. For example, a user may place the mobile device and the case or battery door on a wireless charger/power supply and at the same time, plug the case or battery door into an external wired charger and/or wired charging/data device such as a notebook or desktop computer. In this case, it is necessary to provide a means to resolve the conflict between the two charging paths. The switching mechanism provides this by allowing one path to have priority over the other. For example, if the mobile device is placed on or near the wireless charger and at the same time, the wired charger/power path is connected to power, the switch can provide priority to the wired method and route that power to the connector the mobile device. At the same time, the switch may provide a signal to the wireless charger receiver to shut off wireless power through shutting down the wireless receiver and/or charger. For example, a signal can be sent by the switch to the wireless receiver and then to the wireless charger to shut down the charger until the wired charging power is no longer applied. Alternatively, the switch can be implemented to provide priority to the wireless charger so that even when both wired and wireless charging power are present at the switch, the wireless charger output is routed to the mobile device connector. Alternatively, priority can be given to either wireless or wired method after determining which one can provide higher current and therefore faster charging times or some other criteria.

In addition, the wired connector can also include data lines that can be routed directly or through a circuit to the mobile device connector integrated into the case. So that when the case is connected to external wired power and data, the data lines are routed to the correct data connections on the case connector. This would allow synchronization/data transfer between the mobile device and the device connected to the wired connector (such as notebook or desktop computer) to occur without the user needing to remove the mobile device from the case. In the case where the external wired power and data connector is a Universal Serial Bus (USB) connector, the data lines correspond to D+ and D− lines of the USB protocol.

Figure 36:
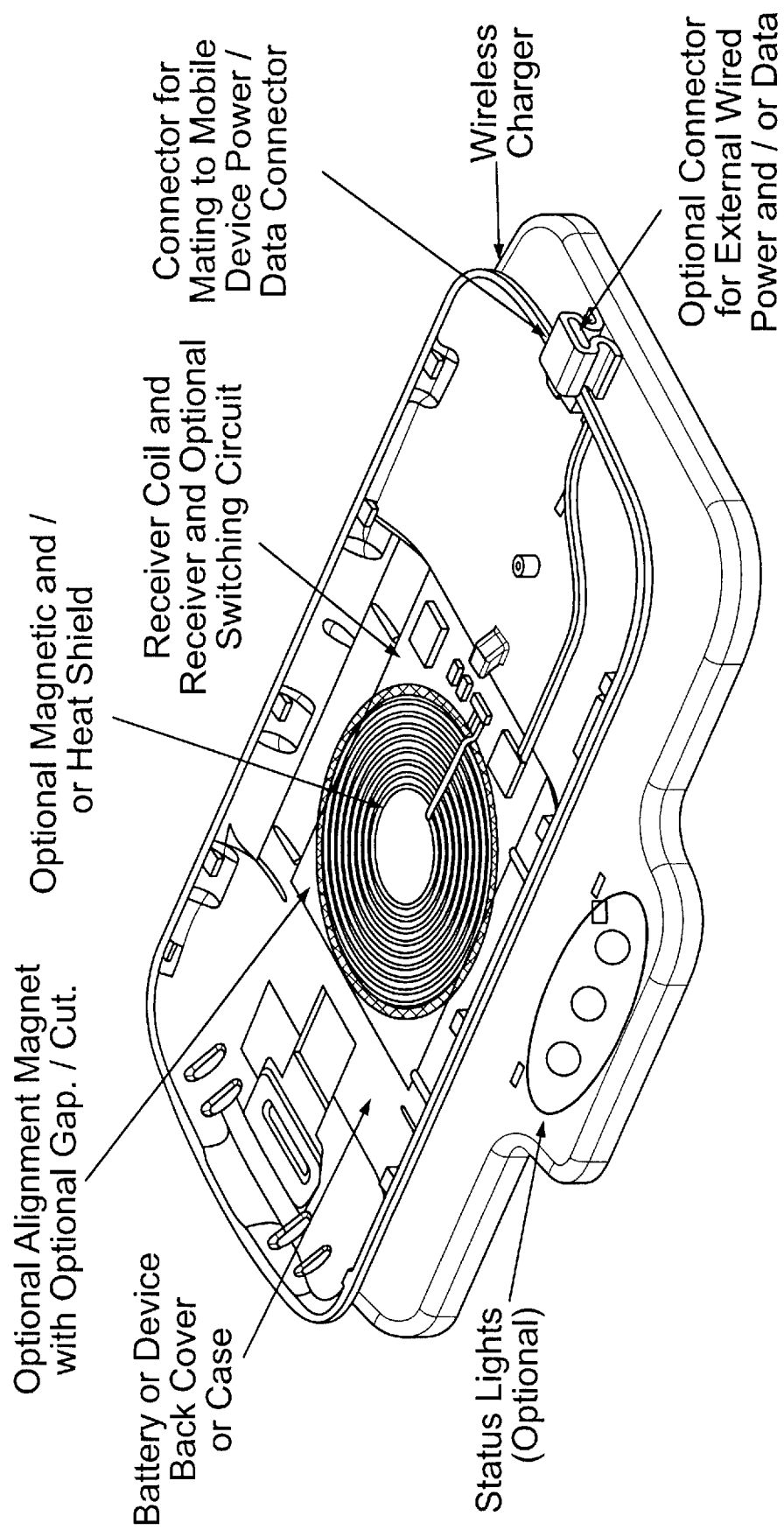
FIG. 36 illustrates an implementation of a case or battery door for a mobile device such as a mobile phone, in accordance with an embodiment.

FIG. 36 shows an implementation 610 of such a case or battery door for a mobile device such a mobile phone. The case or battery door includes a receiver coil and receiver and switching circuitry. The output of this circuitry is routed to the case or battery door connector to mate with the matching connectors on the mobile device. In this case, the connector is shown as a pass through that allows the user to connect a wired cable for power/data to the connector and the data lines can be routed to the appropriate connector lines on the opposite side where the connector mates with the mobile device. At the same time, the power lines of the wired power/data connector are routed to the mobile device connector through a switching circuit on the receiver circuit or inside the connector that will function as described above. Furthermore, the wireless charger case or battery door may incorporate alignment magnets to align the wireless receiver coil in the case or battery door with corresponding magnets in the charger. These magnets can be flat disks at the center of the coils or ring magnets in or around the coil or multiple magnets inside or outside the coil area. They may further include features to reduce any effect of a magnetic field. For example, for ring magnets, the circle can be disrupted by a cut in the circular shape so that current flow in a circular pattern due to a pulsing magnetic field (eddy currents) is disrupted. In addition, the case or battery door may include layers in the coil or behind it to provide shielding form the magnetic field or any generated heat to the mobile device or its battery. Examples can include metal layers incorporated into PCB coil backs, separate metal layers, ferrite layers, ferrite/plastic compounds, nanomaterials, or other materials designed for shielding purposes that can be tailored for this application. In addition, the receiver circuitry may include thermal sensors (such as thermistors) at various locations (coil, circuit, etc.) to monitor the temperature of the receiver and ensure safe operation. The information from the sensor can be used to shut down the wireless or wired charger, reduce the current output, and/or provide a warning or alarm to user or take other actions.

Another method for integration of wireless receivers into mobile devices is for device manufacturers to incorporate the methods described above into the mobile device during manufacture. In this manner, tighter integration of functionality with device operation and function can be achieved.

In another implementation, the wireless receiver coil and/or circuit can be incorporated into a rechargeable battery that can be charged directly on the wireless charger or when inserted to a mobile device when device is placed on or near wireless charger.

Figure 37:
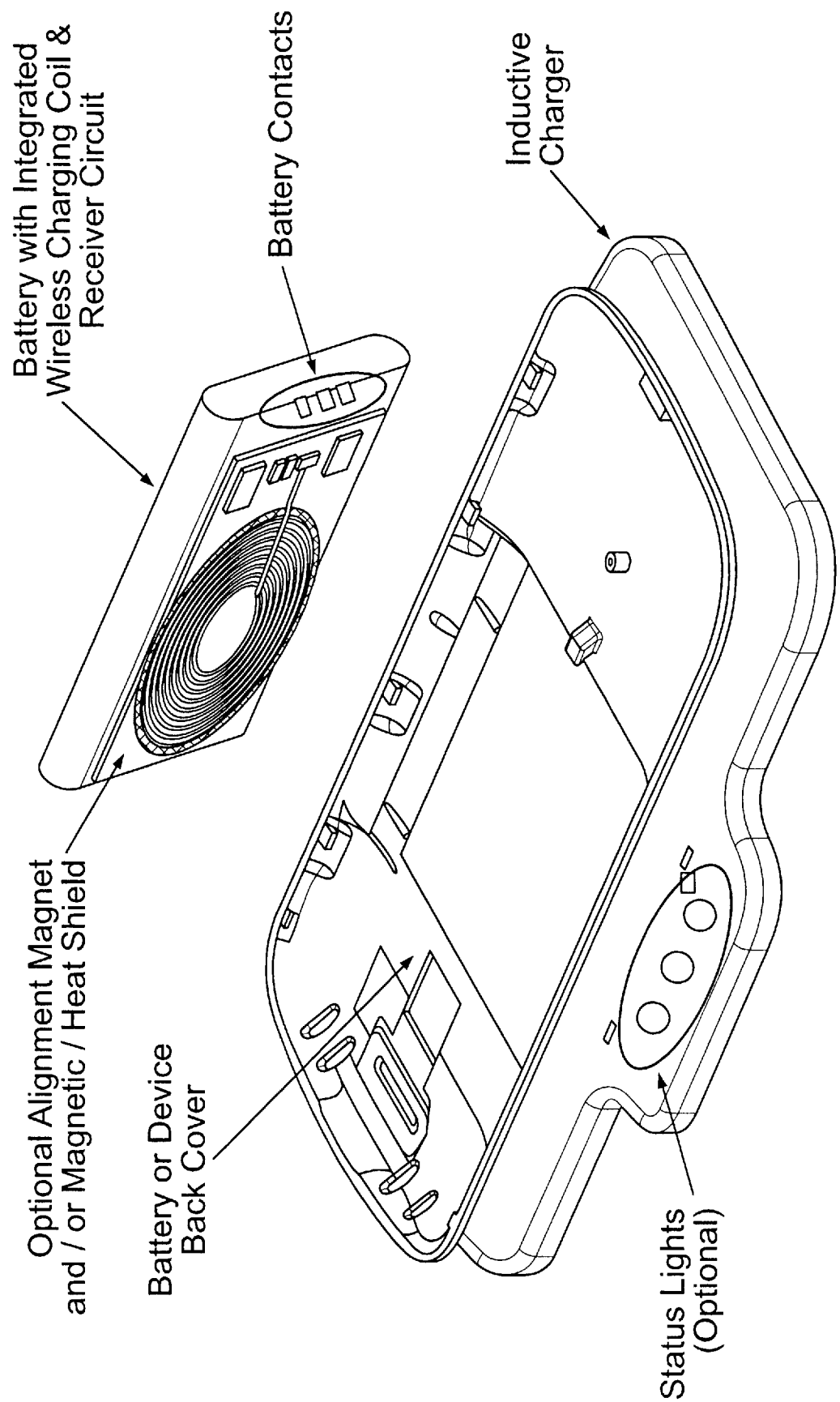
FIG. 37 illustrates a receiver coil and circuit integrated into a mobile phone battery, in accordance with an embodiment.

As an example 620, FIG. 37 shows the receiver coil and circuit integrated into a mobile phone battery. When the battery is inserted into a mobile device and the device is placed on a wired charger, the battery can receive power wirelessly from the charger. However, in many cases, it may be necessary to allow the user to continue charging and or powering the mobile device through wired methods as well. Similar to the mobile device case/battery door implementation discussed above, a method to allow both types of charging is necessary.

Figure 38:
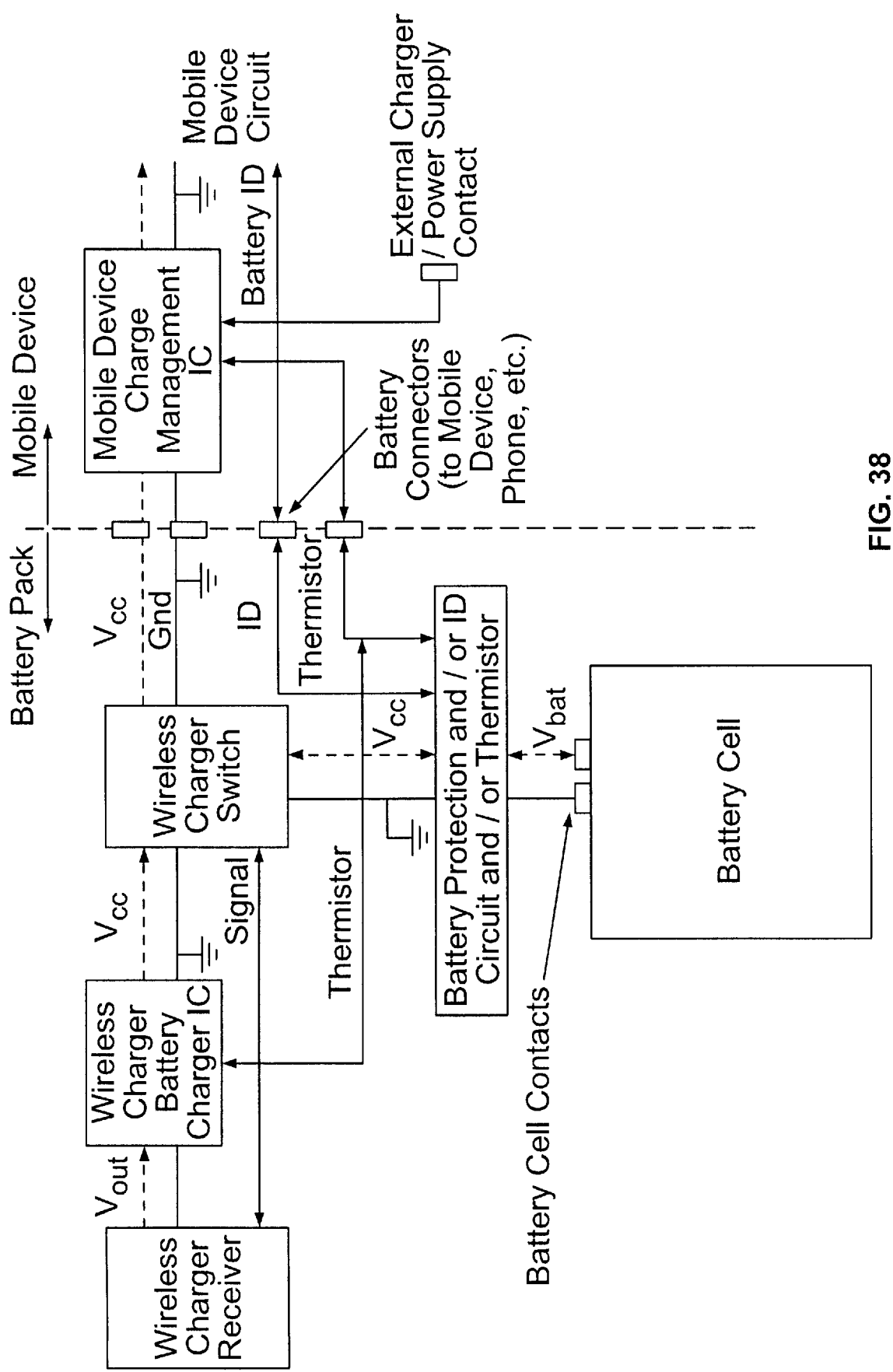
FIG. 38 is an illustration of a wirelessly chargeable battery pack that may include one or more battery cells, battery protection and/or ID circuit and/or temperature sensors such as thermistors, in accordance with an embodiment.

To integrate a wireless charger into a battery for a mobile device, it may be necessary to enable the battery to charge wirelessly through its integrated receiver coil and receiver circuit (including optional charger IC) or through the battery contacts by the external wired battery charger through mobile device contacts and optional internal charge management and/or charge measurement/gauge IC. FIG. 38 shows the block diagram of major components of such a system 630.

As shown in FIG. 38, the wirelessly chargeable battery pack may include one or more battery cells, battery protection and/or ID circuit and/or temperature sensors such as thermistors as described above, a wireless charger coil, wireless charger receiver circuit, optional battery charger IC (which incorporates an appropriate battery charging algorithm for the battery cell to provide the correct charging voltage and/or current during the entire charging cycle) and or possibly battery gas gauging (to estimate how much power remains in the battery) and/or appropriate thermal sensors/circuitry. In addition, the battery pack can include alignment magnets and/or magnetic and/or thermal shield layers as discussed above.

The path for wireless charging current when the battery is inserted into a mobile device and the device is placed on or near a wireless charger is shown in FIG. 38 with dashed lines. The wireless charger receiver circuit may provide power to the optional charger IC which is in turn connected to a switching circuit. Alternatively, the receiver circuit may include battery charging algorithm so that it can directly charge a battery or power the mobile device. The output of the switch is connected to the battery cell contacts through an optional battery protection circuit and/or battery ID circuit. Optionally, the output can be connected to directly power the mobile device which may include its own charge management and/or gas gauge and or battery ID circuit. The battery can be designed such that it would interact with the mobile device ID detection circuit to verify the battery and also interface properly with the mobile device charge management and/or gas gauge and/or temperature sense circuitry.

Figure 39:
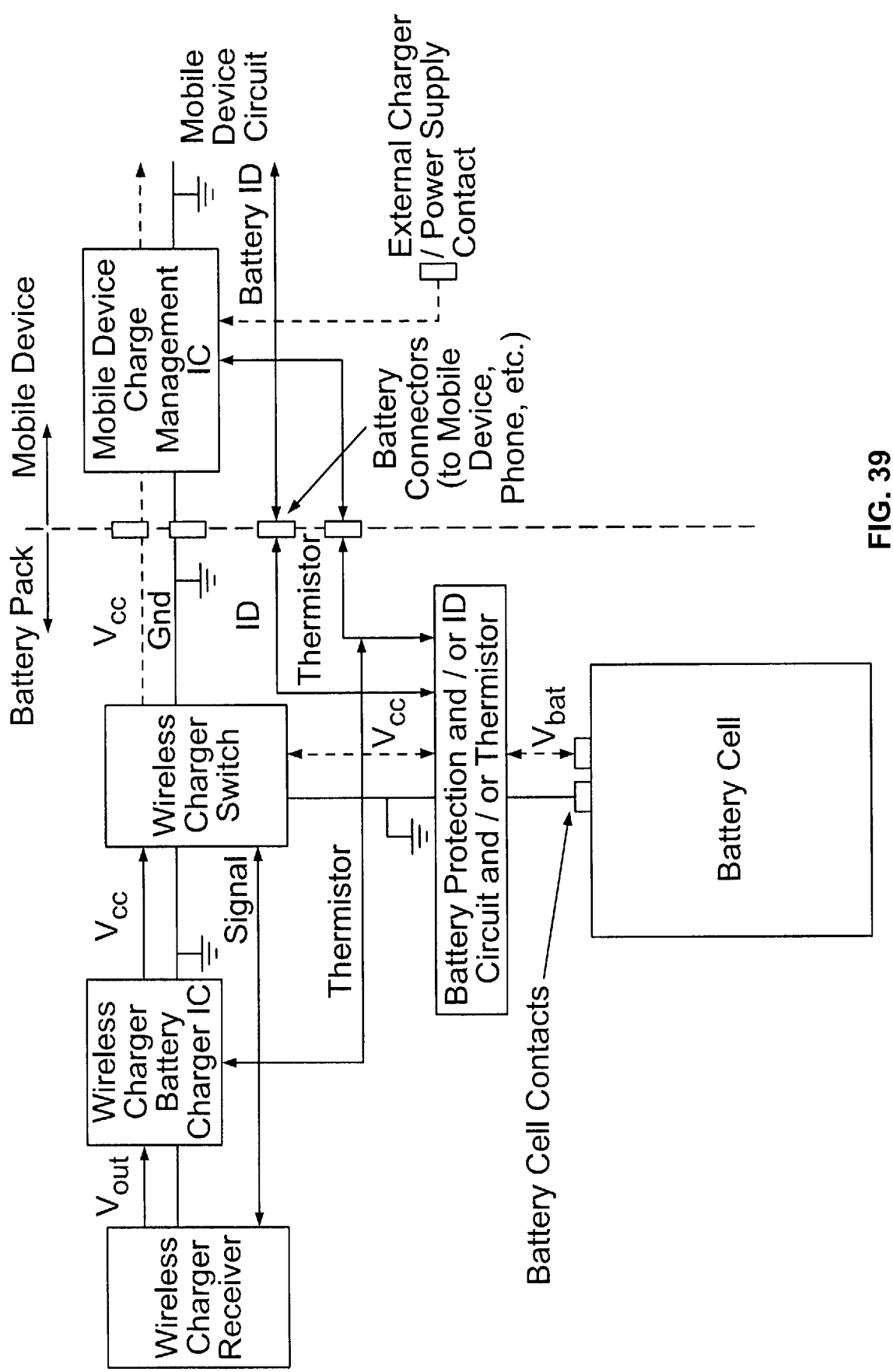
FIG. 39 illustrates the flow of current (in dashed lines) when the mobile device is plugged into an external wired charger and or charger/data cable and another device such as a notebook or desktop computer, in accordance with an embodiment.

FIG. 39 shows 650 the flow of current (in dashed lines) when the mobile device is plugged into an external wired charger and or charger/data cable and another device such as a notebook or desktop computer. The external charger/power supply can provide power to charge the battery and/or power the mobile device depending on the state of charge of the battery and/or the design of the internal charger circuitry of the mobile device. The mobile device charge management IC shown can include an algorithm and circuitry to charge the wirelessly chargeable battery through its contacts. In this case, the switch inside the battery can be designed to route the optional mobile device charger IC circuit output to charge the battery as shown. The battery may also contain appropriate circuitry for battery protection, thermal protection, battery ID, etc. In case of an over-temperature condition at the battery, the receiver can take action such as shut down wired or wireless charger, disconnect input power to the battery, reduce output current for charging the battery, provide a visual or audible or signal alarm, or other appropriate actions to ensure safe operation and charging of battery. The thermal sensor or sensors can be placed on or near the battery, the wireless charging coil, critical components of the circuitry, close to the mobile device interface, etc. or a combination of the above.

The switch in the battery can be designed to provide charging priority to the wired or wireless charging method. For example, if the mobile device and the wirelessly chargeable battery are placed on or near a wireless charger and the device is plugged in to a wired charger or wired data/power device such as a desktop or notebook computer, the switch can be configured to provide priority to the wired charger and shut off the wireless charger through a signal to the wireless receiver, charger, or both. In addition, the wireless charger receiver can signal the charger to shut off. Alternatively, priority can be given to wireless charger/power supply over the wired charger/power supply or priority can be given to either method after determining which one can provide higher current and therefore faster charging times or some other criteria.

Figure 40:
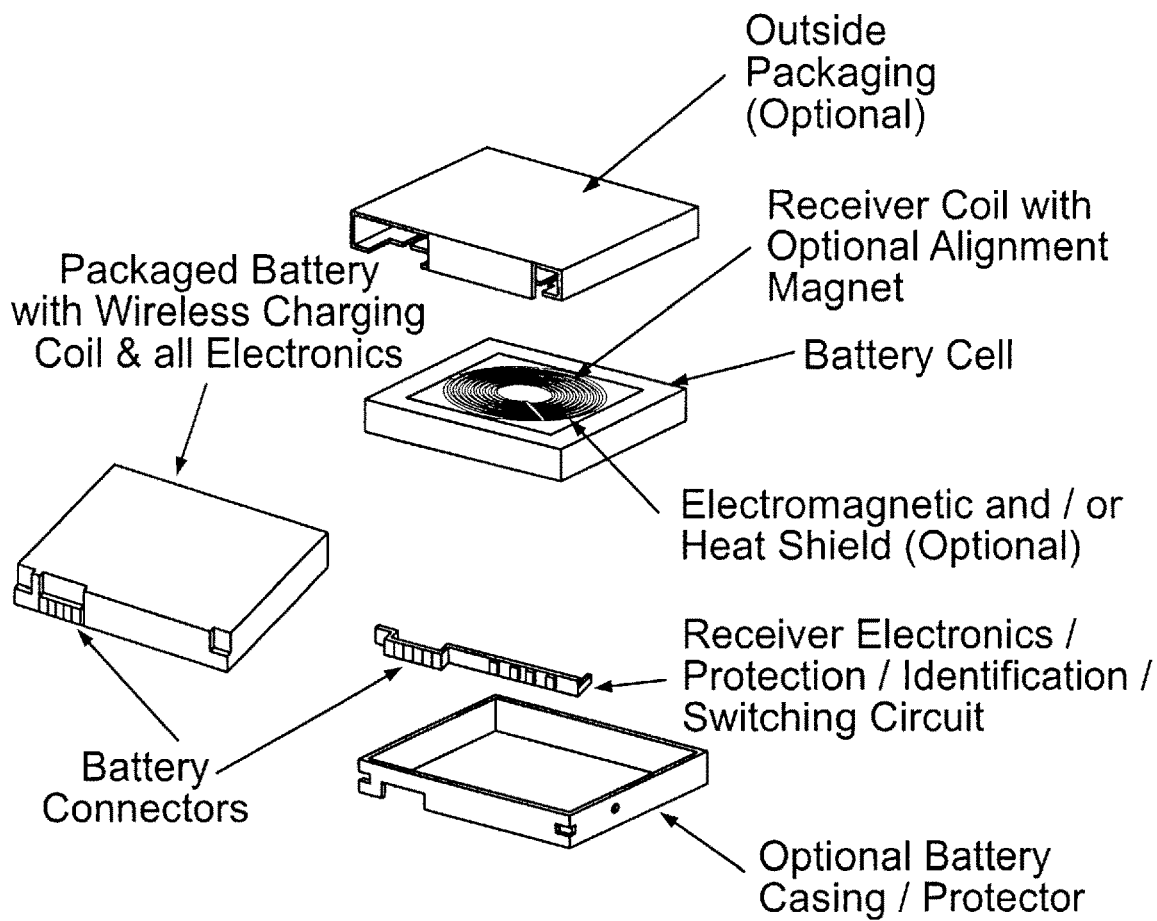
FIGS. 40 and 41 illustrate implementations of a wireless chargeable battery for mobile devices, in accordance with an embodiment.
Figure 41:
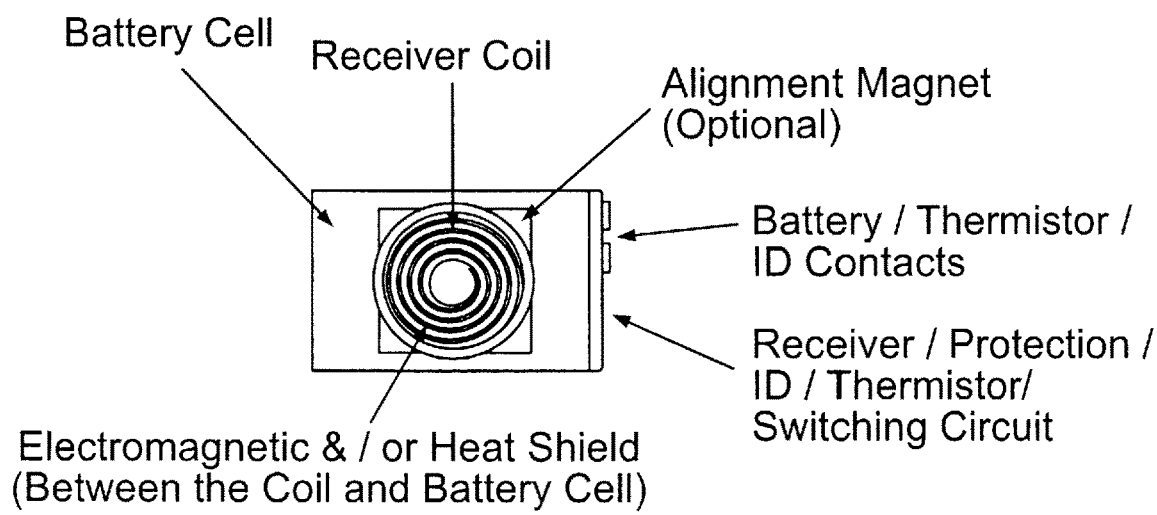

FIG. 40 and FIG. 41 show implementations 660, 670 of a wireless chargeable battery for mobile devices as described above. The battery may include a receiver coil on its top surface (close to wireless charger when device/battery is placed on or near a wireless charger), optional alignment magnet or magnets, electromagnetic and/or heat shield layers, and receiver and/or battery protection and/or battery ID, and/or switching circuitry. To minimize the effect on battery capacity of integration of the circuitry into it, the circuitry can be placed on the thin edge of a battery such as a mobile phone or other mobile device battery.

Figure 42:
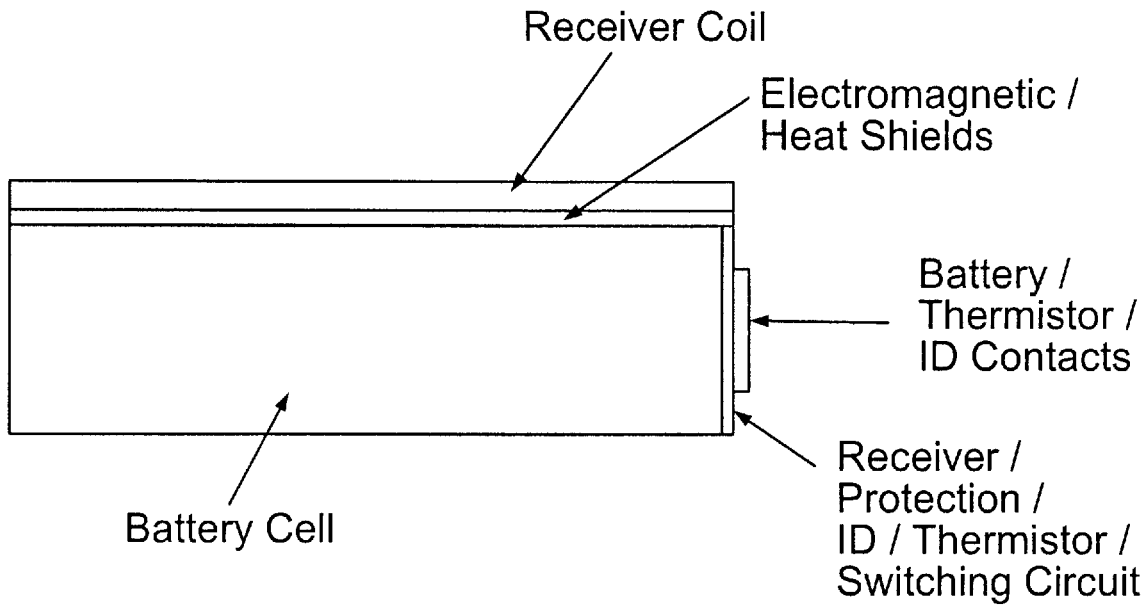
FIG. 42 illustrates a side view of the battery with various layers of the receiver coil, optional heat, electromagnetic shield and/or optional alignment magnet or magnets shown, in accordance with an embodiment.

FIG. 42 shows a side view 680 of the battery with various layers of the receiver coil, optional heat, electromagnetic shield and/or optional alignment magnet or magnets shown. To maximize impact of integration of wireless charging coil and receiver and other circuitry into the battery pack, it is important to keep the reduction in battery volume due to these parts to a minimum. It may be therefore important to use the thinnest receiver coil and electromagnetic/heat shields. PCB coils with thin base material (e.g., FR4) or flexible PCB (e.g., polyimide) or free-standing copper coil patterns or wires can be used. This thickness can be 0.2 mm or below. Metal and/or electromagnetic shielding material with thicknesses of 0.1 mm or lower may also be used. In addition, if one or more magnets are used, they may add to the overall thickness of the stack or they can be arranged such that their thickness does not add to the overall thickness.

Figure 43:
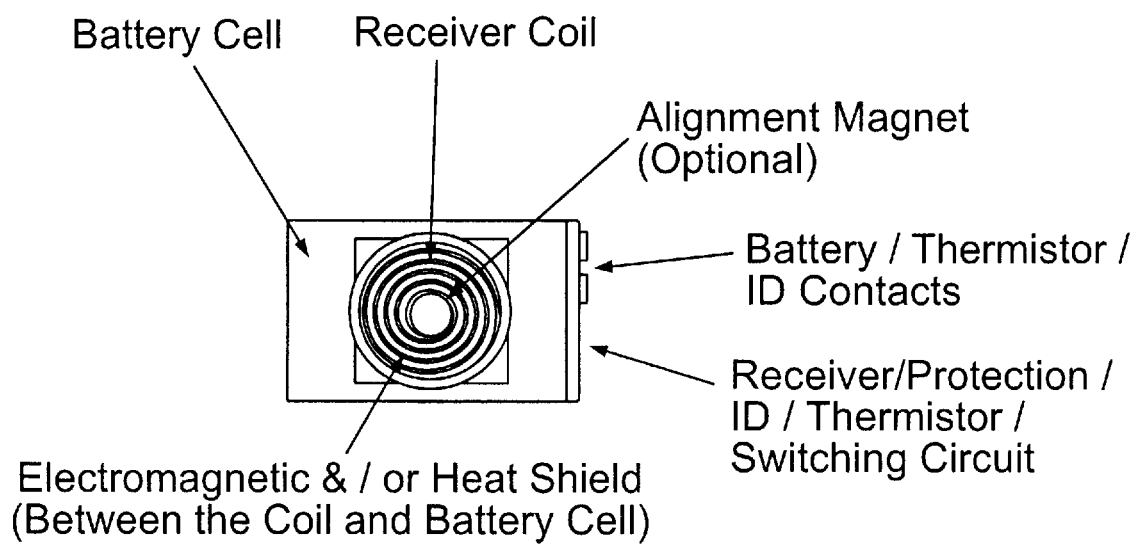
FIG. 43 is an illustration of a case where an alignment disk magnet is incorporated into the center of a coil in a manner not to increase the overall thickness of the receiver coil/shield layer/magnet stack, in accordance with an embodiment.

FIG. 43 shows 690 a case where an alignment disk magnet is incorporated into the center of a coil in a manner not to increase the overall thickness of the receiver coil/shield layer/magnet stack. In this case the wireless charging coil has an outer and inner radius and does not fill a whole circular shape. The coil and/or the shield material behind it may therefore be hollow at the center. It is therefore possible to place a disk or other shape magnet in the center of the coil so that the thickness of the magnet fills the void or takes up some of the space in this center without adding to the overall thickness of the stack. In an embodiment where the coil is a pcb coil, the center of the pcb may have a cut out area such as a circular hole or aperture where the magnet may be placed. The optional electromagnetic and/or heat shield behind the coil may also have a similar hole or aperture.

Figure 44:
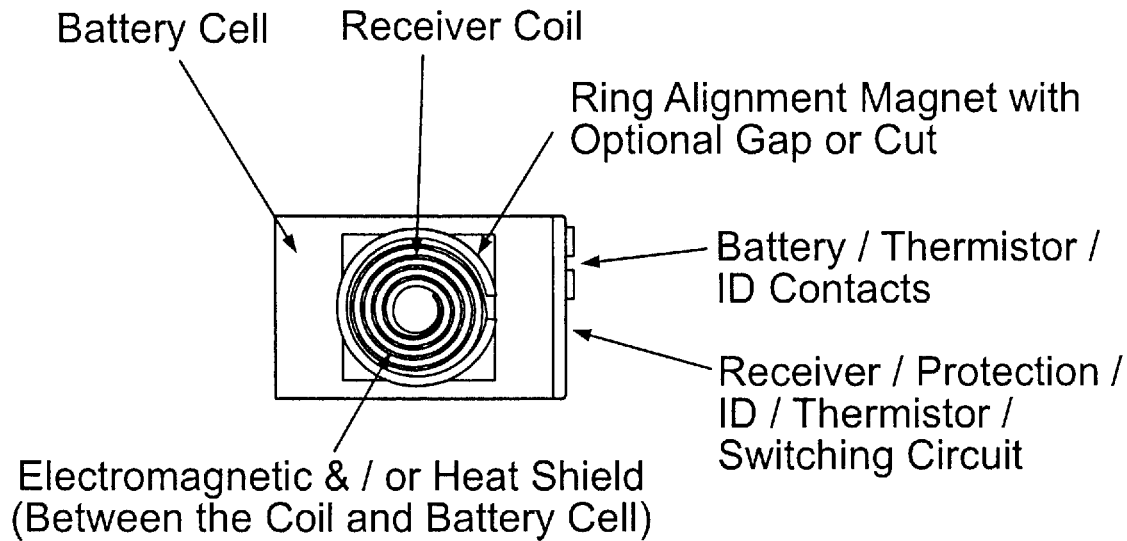
FIGS. 44 and 45 illustrate other implementations with annular or ring or arc alignment magnets whereby the magnet is on the outside of the receiver coil and the coil and/or the electromagnetic/heat shield layers can fit inside the ring or annular or arc magnets between the coil and the battery cell, in accordance with an embodiment.
Figure 45:
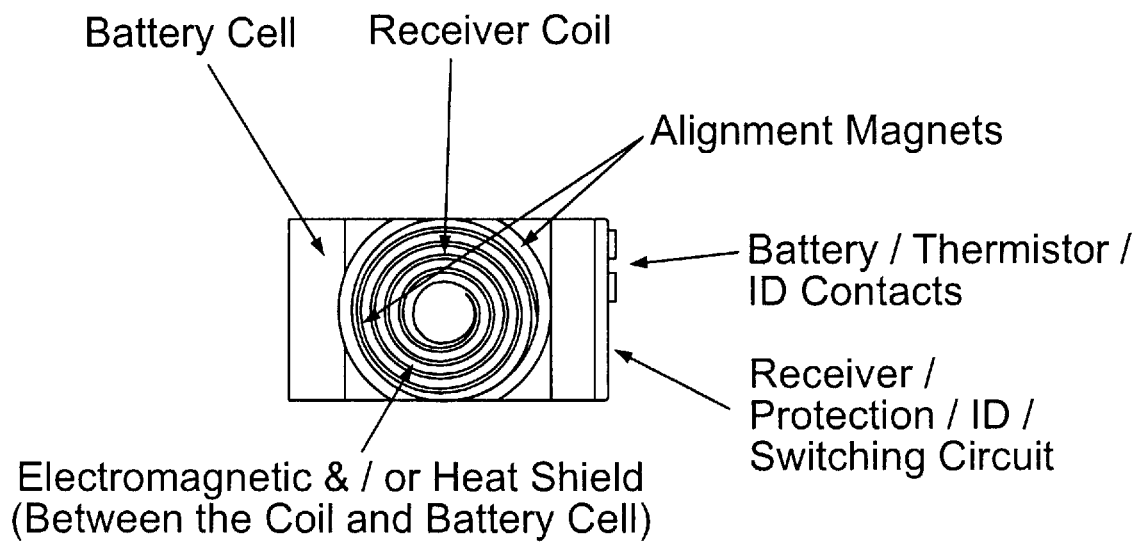

FIG. 44 and FIG. 45 show other implementations 700, 710 with annular or ring or arc alignment magnets whereby the magnet is on the outside of the receiver coil and the coil and/or the electromagnetic/heat shield layers can fit inside the ring or annular or arc magnets between the coil and the battery cell. In this way, the thickness of the various components on top of the battery do not add to each other and the overall stack thickness is given by coil plus the electromagnetic and/or heat shield layer or the magnet thickness whichever is greater. This would allow the battery to retain maximum capacity density for a given volume. The ring or annular or arc magnets have the advantage over the central magnet shown in FIG. 43 because they allow much more alignment tolerance and can exert an alignment pull force over a larger lateral area on a corresponding magnet or magnets in a wireless charger. In addition, by introducing a gap or cut in the circumference of a ring magnet so that it is not fully continuous or by use of one or more arc magnets, any potential eddy currents in the magnet induced due to the alternating magnetic field of the wireless charger are reduced or eliminated thereby greatly increasing the effectiveness of these types of magnets for coil alignment purposes. The corresponding alignment magnet in the charger can be a ring, cut ring, or arc magnet and can provide rotational invariance when the receiver magnet and the charger magnet are aligned. An arc magnet in the receiver can be used with a ring or cut ring magnet in the charger or vice versa and will allow full rotational positioning between the charger and receiver.

In any of the implementations above, management of the generated heat and thermal issues are important. To reduce the effect of heat generation from the coils, it may be desirable to increase the thickness of the copper layer used in a PCB or use thicker wires in wound coils. For the case of PCB coils, in addition, it is possible to create multi-layer PCB coils such that several layers of PCB coils are connected in parallel and produce a resistance that is lower than a single layer thus reducing resistive heating.

Figure 46:
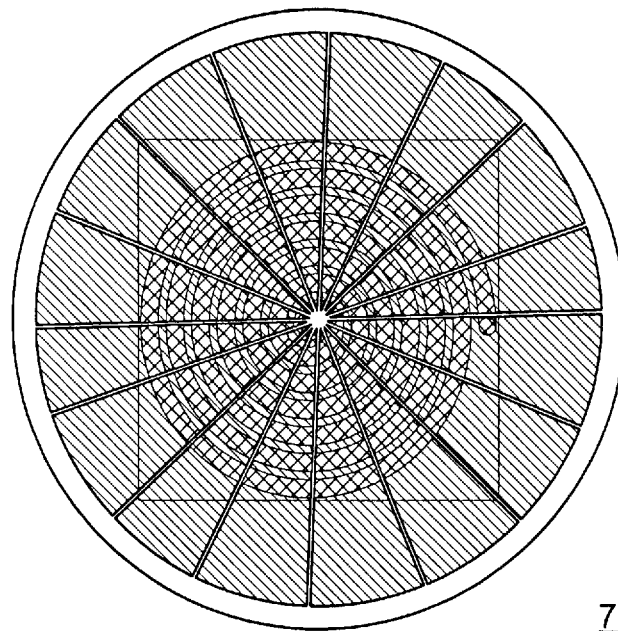
FIG. 46 illustrates an embodiment wherein a metal layer with discontinuous portions is placed behind and/or around the coil.

In addition, heat transfer layers can be incorporated to spread the heat generated. Such layers need to be designed not to interfere with the operation of the coils. Since alternating magnetic fields are generated and detected in an inductive system, use of a metal layer behind the coil would produce eddy currents and loss. One method for providing thermal conductivity with metal layers is shown 720 in FIG. 46 where a metal layer with discontinuous portions is placed behind and/or around the coil. In this case, the metal layer comprises rectangular slices that can conduct heat away from the center of a coil while due to discontinuity between the slices, the electrons cannot flow in a circular motion due to the alternating magnetic field. The pattern described here has a number of triangular slices but any other pattern which can provide heat transport but does not allow carriers to circulate in a rotational pattern due to the alternating magnetic field can be implemented. In FIG. 46, a coil with an inner radius of zero is shown. The coil may have a non-zero inner radius thus leaving a central portion that has no coil pattern. This may reduce thermal and/or eddy current effects on the coil and be preferable.

Figure 47:
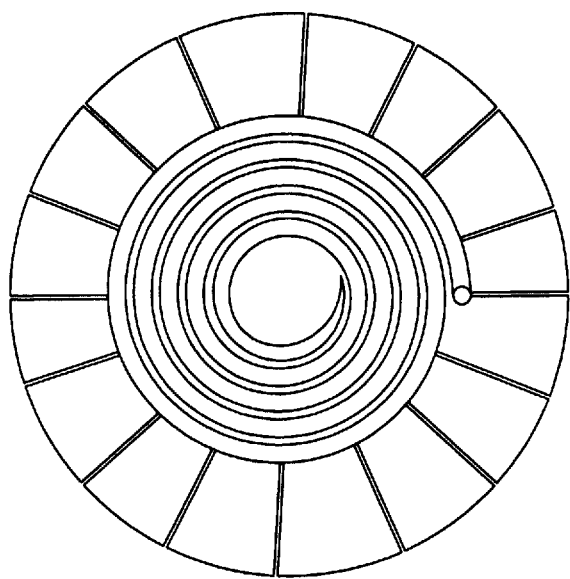
FIG. 47 is an illustration of an embodiment where the heat transfer layer is implemented on the same layer as the coil or is constructed not to overlap the coil structure.

FIG. 47 shows an implementation 730 where the heat transfer layer is implemented on the same layer as the coil or is constructed not to overlap the coil structure. This can be used in cases where each layer of a PCB contains a coil structure such as when a two or more layered PCB contains two or more layers of coils in parallel to reduce resistance or two coils are placed on the two sides of a PCB to provide a center-tapped coil pattern or other geometries or simply when a single sided PCB structure is used and a heat transfer layer on the same side is desired. In this case, the coil is terminated with an inner radius that allows a central portion without the coil for better heat transfer and/or lower eddy current effects. However, this inner radius can be zero as shown in FIG. 46 as well. In either case, in this implementation, any potential heat generated at the coil is distributed by the metallic pattern outside of the coil to surrounding areas without allowing generation of circular eddy currents due to the alternating inductive magnetic fields. The heat transfer pattern can be any pattern that reduces or eliminates the possibility of circular motion of carriers or electrons around the coil. The heat transfer layer is separated by a finite gap from the metal coil layer to avoid electrical contact but the gap should preferably be kept small to allow efficient heat transfer between the two sections. To improve transfer of heat across the gap, several additional techniques can be used. This includes a PCB base material with high thermal conductivity, an additional layer over the gap with high thermal conductivity (such as ceramic or high thermal conductivity plastic or thermal grease, etc.) or other similar methods can be used.

It will be apparent to the person knowledgeable in the art that several general embodiments are describe herein and the concepts can also be expanded to include other similar geometries. The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Some aspects of the present invention may be conveniently implemented using a conventional general purpose or a specialized digital computer, microprocessor, or electronic circuitry programmed according to the teachings of the present disclosure. Appropriate software coding can readily be prepared by skilled programmers and circuit designers based on the teachings of the present disclosure, as will be apparent to those skilled in the art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the systems and methods described above are described in the context of charging pads, it will be evident that the system and methods may be used with other types of chargers and/or power supplies. Similarly, while the embodiments described above are described in the context of charging mobile devices, other types of devices can be used. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An inductive charger for inductive power transfer to an electronic device using an alternating magnetic field at an operating frequency, the inductive charger comprising:
    a substantially planar inductive charging coil positioned substantially parallel to a top surface of the inductive charger that faces the electronic device for inductive power transfer;
    an electrically conductive shield layer comprising metal,
        wherein the shield layer is positioned proximate to and substantially parallel to the inductive charging coil to cover a surface of the inductive charging coil,
        wherein the shield layer comprises multiple substantially concentric metallic rings, with each of the metallic rings comprising multiple sections,
        wherein radially adjacent sections of the metallic rings are electrically isolated from one another, and
        wherein the sections of each of the metallic rings are separated by gaps such that each metallic ring is electrically discontinuous to impede eddy current generation in the metallic rings and the shield layer and to impede heating of the shield layer by the alternating magnetic field during inductive power transfer.

2. The inductive charger of claim 1, further comprising:
    an annular permanent magnet for creating a separable magnetic attachment between the inductive charger and the electronic device,
        wherein the permanent magnet surrounds an outer circumference of the inductive charging coil to align the inductive charging coil with an inductive receiver coil in the electronic device for inductive power transfer, and
        wherein the permanent magnet comprises one or more discontinuous arc-shaped sections assembled to form a full or partial ring shape that includes a gap.

3. The inductive charger of claim 2, further comprising a rechargeable battery configured to power the inductive charger, wherein the inductive charger and the rechargeable battery are incorporated into a mobile device.

4. The inductive charger of claim 1, wherein the shield layer comprises metal of thickness less than or equal to 100 micrometers.

5. The inductive charger of claim 1, further comprising a polymer layer in physical contact with the shield layer.

6. The inductive charger of claim 1, wherein the shield layer extends beyond an outer circumference of the inductive charging coil.

7. The inductive charger of claim 1, further comprising:
    a substantially planar Near Field Communication (NFC) coil separate from the inductive charging coil positioned substantially parallel to the top surface of the inductive charger; and
    a magnetic layer having a thickness between 0.2 mm and 1 mm positioned proximate the inductive charging coil and the NFC coil facing away from the top surface of the inductive charger to provide low-loss magnetic field guidance for the inductive charging coil at the operating frequency and the NFC coil at an operating frequency of the NFC coil.

8. The inductive charger of claim 1, further comprising an electrically conductive additional layer comprising metal, wherein the additional layer is positioned adjacent to the shield layer and separated from the shield layer at a distance from the shield layer by a dielectric layer,
  wherein the additional layer covers the inductive charging coil,
  wherein the additional layer comprises multiple substantially concentric metallic rings, with each of the metallic rings of the additional layer comprising multiple sections separated by gaps such that each concentric metallic ring of the additional layer is discontinuous,
    wherein adjacent sections of each metallic ring of the additional layer are electrically isolated from one another, and
  wherein the additional layer is positioned with respect to the shield layer such that at least one gap in the metallic rings of the shield layer is covered by a section of at least one of the metallic rings of the additional layer, with the distance between the additional layer and the shield layer being smaller than a size of the at least one gap in the shield layer.

9. The inductive charger of claim 1, wherein the shield layer is separated from the inductive charging coil by at least one of an electrically non-conducting gap or an electrically non-conducting material to avoid electrical contact between the shield layer and the inductive charging coil.

10. The inductive charger of claim 1, wherein the inductive charging coil has an annular spiral shape with an inner radius that is $5/16$ or more of an outer radius to reduce heat generation at the center of the inductive charging coil during inductive power transfer.

11. An electronic device for receiving inductive power transfer from an inductive charger using an alternating magnetic field at an operating frequency, the electronic device comprising:
  an inductive charging receiver comprising:
    a substantially planar inductive charging receiver coil positioned substantially parallel to a bottom surface of the electronic device that faces the inductive charger for inductive power transfer; and
    an electrically conductive shield layer comprising metal,
      wherein the shield layer is positioned proximate to the inductive charging receiver coil to cover a surface of the inductive charging receiver coil,
      wherein the shield layer comprises multiple substantially concentric metallic rings, with each of the metallic rings comprising multiple sections,
        wherein radially adjacent sections of the metallic rings are electrically isolated from one another, and
        wherein the sections of each of the metallic rings are separated by gaps such that each metallic ring is electrically discontinuous to impede eddy current generation in the metallic rings and the shield layer and to impede heating of the shield layer by the alternating magnetic field during inductive power transfer.

12. The electronic device of claim 11, further comprising:
an annular permanent magnet for creating a separable magnetic attachment between the electronic device and the inductive charger,
  wherein the permanent magnet surrounds an outer circumference of the inductive charging receiver coil to align the inductive charging receiver coil with an inductive charger coil in the inductive charger for inductive power transfer, and
  wherein the permanent magnet comprises one or more arc-shaped sections assembled to form a full or partial ring shape that includes a gap to impede eddy current generation in the permanent magnet and heating of the permanent magnet by the alternating magnetic field during inductive power transfer.

13. The electronic device of claim 12, further comprising:
a rechargeable battery; and
a second inductive charger coupled to the inductive charging receiver coil;
  wherein the electronic device is configured to operate in one of a first mode and a second mode, wherein, in the first mode, the electronic device receives inductive power from the inductive charger to charge the rechargeable battery, and, in the second mode, the electronic device uses the second inductive charger to inductively charge a mobile device.

14. The electronic device of claim 12, wherein the electronic device is configured to:
  receive power to charge a rechargeable battery inductively through the inductive charging receiver coil from an inductive charger;
  receive power to charge the rechargeable battery conductively from a wired power supply;
  switch between receiving power through the inductive charging receiver coil and receiving power from the wired power supply when power is available from both the inductive charger and the wired power supply based on an algorithm; and
  communicate with one of the inductive charger and the wired power supply to terminate transfer of power.

15. The electronic device of claim 11, wherein the shield layer comprises metal of thickness equal to or less than 100 micrometers.

16. The electronic device of claim 11, further comprising a polymer layer in physical contact with the shield layer.

17. The electronic device of claim 11, wherein the shield layer extends beyond an outer circumference of the inductive charging receiver coil.

18. The electronic device of claim 11, further comprising:
  a substantially planar Near Field Communication (NFC) coil separate from the inductive charging receiver coil positioned substantially parallel to the bottom surface of the electronic device; and
  a magnetic layer having a thickness between 0.2 mm and 1 mm positioned proximate the inductive charging receiver coil and the NFC coil facing away from the bottom surface of the electronic device to provide low-loss magnetic field guidance for the inductive charging receiver coil at the operating frequency and the NFC coil at an operating frequency of the NFC coil.

19. The electronic device of claim 18, wherein the inductive charging receiver further comprises:
  a substantially planar additional layer positioned proximate to the magnetic layer and substantially parallel to the inductive charging receiver coil facing away from the bottom surface of the electronic device; and
  a non-metallic heat transfer layer to spread heat generated during inductive power transfer;
    wherein the magnetic layer is a nano magnetic material.

20. The electronic device of claim 11, further comprising an electrically conductive additional layer comprising metal, wherein the additional layer is positioned adjacent to the shield layer and separated from the shield layer at a distance from the shield layer by a dielectric layer,
  wherein the additional layer covers the inductive charging receiver coil,
  wherein the additional layer comprises multiple substantially concentric metallic rings, with each of the metallic rings of the additional layer comprising multiple sections separated by gaps such that each concentric metallic ring is discontinuous,
wherein adjacent sections of each metallic ring of the additional layer are electrically isolated from one another, and
wherein the additional layer is positioned with respect to the shield layer such that at least one gap in the metallic rings of the shield layer is covered by a section of at least one of the metallic rings of the additional layer, with the distance between the additional layer and the shield layer being smaller than a size of the at least one gap in the shield layer.

21. The electronic device of claim 11, wherein the shield layer is separated from the inductive charging receiver coil by at least one of an electrically non-conducting gap or an electrically non-conducting material to avoid electrical contact between the shield layer and the inductive charging receiver coil.

22. The electronic device of claim 11, wherein the inductive charging receiver coil has an annular spiral shape wherein an inner radius of the inductive charging receiver coil is $5/16$ or more of an outer radius of the inductive charging receiver coil to reduce heat generation at the center of the inductive charging receiver coil during inductive power transfer.

23. An inductive charging system that uses an alternating magnetic field for inductive power transfer, the inductive charging system comprising:
a substantially planar inductive coil;
a substantially planar shielding means for reducing electromagnetic interference or heat distribution from the inductive coil during inductive power transfer,
wherein the shielding means is positioned proximate to and substantially parallel to the inductive coil to cover a surface of the inductive coil,
wherein the shielding means comprises electrically conductive metal;
wherein the shielding means comprises multiple substantially concentric metallic rings, with each of the metallic rings comprising multiple sections,
wherein radially adjacent sections of the metallic rings are electrically isolated from one another, and
wherein the sections of each of the metallic rings are separated by gaps such that each metallic ring is electrically discontinuous to impede eddy current generation in the metallic rings and the shielding means and to impede heating of the shielding means by the alternating magnetic field during inductive power transfer.

24. The inductive charging system of claim 23, further comprising:
a permanent magnet means for creating a separable magnetic attachment between the inductive charging system and an electronic device having an inductive charging system,
wherein the permanent magnet means surrounds an outer circumference of the inductive coil to align the inductive coil with an inductive coil in the external electronic device for inductive power transfer, and
wherein the permanent magnet means comprises one or more discontinuous arc-shaped sections assembled to form a full or partial ring shape that includes a gap to impede eddy current generation in the permanent magnet means and heating of the permanent magnet means by the alternating magnetic field during inductive power transfer.

25. The inductive charging system of claim 23, wherein the inductive charging system is incorporated in an electronic device including a rechargeable battery and is configured for receiving power through inductive power transfer to charge the rechargeable battery.

26. The inductive charging system of claim 23, wherein the inductive charging system is incorporated in an inductive charger and is configured for transmitting power through inductive power transfer.

27. The inductive charging system of claim 23, wherein the shielding means comprises metal of thickness less than or equal to 100 micrometers.

28. The inductive charger of claim 23, wherein the inductive coil has an annular spiral shape with an inner radius that is $5/16$ or more of an outer radius to reduce heat generation at the center of the inductive coil during inductive power transfer.

29. An inductive charging system that uses an alternating magnetic field for inductive power transfer, the inductive charging system comprising:
an inductive coil having an annular spiral shape with an inner radius that is $5/16$ or more of an outer radius;
a shielding means for reducing electromagnetic interference or heat distribution from the inductive coil during inductive power transfer, wherein the shielding means is positioned proximate to the inductive coil to cover a surface of the inductive coil,
wherein the shielding means comprises electrically conductive metal having a thickness of 100 micrometers or less, and
wherein the shielding means includes radially arranged electrical gaps to impede eddy current generation in the shielding means and to impede heating of the shielding means by the alternating magnetic field during inductive power transfer.

* * * * *

UNITED STATES PATENT AND TRADEMARK OFFICE
CERTIFICATE OF CORRECTION

PATENT NO. : 11,606,119 B2
APPLICATION NO. : 17/562268
DATED : March 14, 2023
INVENTOR(S) : Afshin Partovi It is certified that error appears in the above-identified patent and that said Letters Patent is hereby corrected as shown below:

In the Specification

Column 4, Line 1, replace "ring" with "rings".
Column 4, Line 36, replace "form" with "from".
Column 4, Line 44, replace "ring" with "rings".

In the Claims

Column 43, Lines 8-9 (Claim 8), delete "concentric".
Column 44, Line 52 (Claim 19), insert --metallic--.
Column 45, Lines 2-3 (Claim 20), delete "concentric".

Signed and Sealed this
Third Day of October, 2023

Katherine Kelly Vidal
*Director of the United States Patent and Trademark Office*